(12) United States Patent
Wohlert

(10) Patent No.: US 11,992,807 B2
(45) Date of Patent: May 28, 2024

(54) APPARATUS AND METHODS FOR SOLUTION PROCESSING

(71) Applicant: Solution Dynamics, LLC, Paoloa, KS (US)

(72) Inventor: Calvin Wohlert, Centennial, CO (US)

(73) Assignee: Solution Dynamics, LLC, Paola, KS (US)

( * ) Notice: Subject to any disclaimer, the term of this patent is extended or adjusted under 35 U.S.C. 154(b) by 0 days.

(21) Appl. No.: 17/695,240

(22) Filed: Mar. 15, 2022

(65) Prior Publication Data

US 2022/0203301 A1 Jun. 30, 2022

Related U.S. Application Data

(63) Continuation of application No. 16/277,139, filed on Feb. 15, 2019, now Pat. No. 11,298,658, which is a continuation of application No. 15/693,572, filed on Sep. 1, 2017, now Pat. No. 10,518,218, which is a continuation of application No. 14/492,571, filed on Sep. 22, 2014, now Pat. No. 9,751,045, which is a continuation of application No. 13/544,294, filed on Jul. 9, 2012, now Pat. No. 8,840,792, which is a continuation of application No. 12/455,998, filed on Jun. 9, 2009, now Pat. No. 8,216,473.

(60) Provisional application No. 61/131,947, filed on Jun. 13, 2008.

(51) Int. Cl.
*B01D 61/02* (2006.01)
*B01D 61/08* (2006.01)
*B01D 61/12* (2006.01)
*C02F 1/44* (2023.01)

(52) U.S. Cl.
CPC ......... *B01D 61/026* (2022.08); *B01D 61/025* (2013.01); *B01D 61/08* (2013.01); *B01D 61/12* (2013.01); *C02F 1/441* (2013.01); *B01D 2311/06* (2013.01); *B01D 2311/08* (2013.01); *B01D 2311/13* (2013.01); *B01D 2311/25* (2013.01); *B01D 2317/022* (2013.01); *B01D 2317/025* (2013.01)

(58) Field of Classification Search
None
See application file for complete search history.

(56) References Cited

U.S. PATENT DOCUMENTS

| | | |
|---|---|---|
| 3,472,766 A | 10/1969 | Rosebbaum |
| 3,475,331 A | 10/1969 | Mclain |
| 3,630,378 A | 12/1971 | Midland |
| 4,062,197 A | 12/1977 | Hester |
| 4,312,755 A | 1/1982 | Hwang |
| 4,358,377 A | 11/1982 | Clark |
| 4,478,719 A | 10/1984 | Michele et al. |
| 4,652,373 A | 3/1987 | Trimmer |

(Continued)

OTHER PUBLICATIONS

"A Low-Energy Water Purifier" Technology Review; Bruno, Lee, Jan. 8, 2009.

(Continued)

*Primary Examiner* — Krishnan S Menon
(74) *Attorney, Agent, or Firm* — Merchant & Gould P.C.

(57) ABSTRACT

Equipment, systems, processes and techniques for conducting processing of solutions are described. The techniques can be applied to provide diluted solution (i.e. purified solvent), concentrate solution or each. A variety of specific equipment, example systems and processes are depicted and described.

17 Claims, 20 Drawing Sheets

(56) References Cited

U.S. PATENT DOCUMENTS

| | | |
|---|---|---|
| 4,704,324 A | 11/1987 | Davis et al. |
| 4,765,897 A | 8/1988 | Cadotte et al. |
| 4,769,148 A | 9/1988 | Fibiger et al. |
| 4,797,187 A | 1/1989 | Davis et al. |
| 4,806,244 A | 2/1989 | Guilhem |
| 4,812,238 A | 3/1989 | Cadotte et al. |
| 4,824,574 A | 4/1989 | Cadotte et al. |
| 4,828,700 A | 5/1989 | Fibiger et al. |
| 4,839,203 A | 6/1989 | Davis et al. |
| 4,859,338 A | 8/1989 | Behr |
| 4,859,384 A | 8/1989 | Fibiger et al. |
| 4,909,943 A | 3/1990 | Fibiger et al. |
| 4,927,540 A | 5/1990 | Wessling et al. |
| 4,894,165 A | 6/1990 | Fibiger et al. |
| 4,941,972 A | 7/1990 | Kau et al. |
| 4,957,817 A | 9/1990 | Chau et al. |
| 4,959,237 A | 9/1990 | Walker |
| 4,980,063 A | 12/1990 | Mahoney et al. |
| 4,992,485 A | 2/1991 | Koo et al. |
| 5,096,590 A | 3/1992 | Watanabe et al. |
| 5,207,916 A | 5/1993 | Goheen et al. |
| 5,503,750 A | 4/1996 | Russo, Jr. |
| 5,670,053 A | 9/1997 | Collentro et al. |
| 5,873,260 A | 2/1999 | Linhardt et al. |
| 6,187,200 B1 | 2/2001 | Yamamura et al. |
| 6,190,558 B1 | 2/2001 | Robbins |
| 6,299,766 B1 | 10/2001 | Permar |
| 6,547,965 B1 | 4/2003 | Chancellor |
| 7,141,171 B2 | 11/2006 | Lightfoot et al. |
| 8,152,999 B2 | 4/2012 | Lightfoot et al. |
| 8,216,473 B2 | 7/2012 | Wohlert |
| 8,840,792 B2 | 9/2014 | Wohlert |
| 9,751,045 B2 | 9/2017 | Wohlert |
| 10,518,218 B2 | 12/2019 | Wohlert |
| 2006/0127550 A1 | 6/2006 | Kawana et al. |
| 2006/0144787 A1 | 7/2006 | Schmidt et al. |
| 2008/0023333 A1 | 1/2008 | Johnson |
| 2009/0173690 A1 | 7/2009 | Oklejas, Jr. |
| 2010/0132386 A1 | 6/2010 | Bahar |
| 2012/0145635 A1 | 6/2012 | Lucas, III et al. |

OTHER PUBLICATIONS

"Analysis of a Pressure Driven Absorption Refrigeration Cycle", Beasely, D.; Hester, Charles; International Journal of Energy Research, vol. 12, 175-184 (1988).

"Analysis of using centrifugal reverse osmosis in absorption refrigeration systems", Riffat, S.B., Su, Y H, Chartered Institute of Building Services Engineers (CIBSE—presented at 2001 conference.

"Forward Osmosis: A New Approach to Water Purification and Desalination" Miller, James; Evan, Lindsey; Sandia National Laboratories; Jul. 2006.

"Forward Osmosis", Wikipedia, Oct. 11, 2006; Electronic Source: http://en.wikipedia.org/wiki/Foward_osmosis.

"Landfill Leachate Treamtment"; Osmoteck, Inc. 2003, Electronic Source: http://www.rimnetics.com/osmotek.htm.

http://cwx.prenhall.com/bookbind/pubbooks/blb/chapter13/medialib/blb1305.html; 13.5 Colligative Properties dated Oct. 11, 2006.

Tzahi Y. Cath, Childress, Amy, Elimelech, Menacham "Forward osmosis: Principles, applications, and recent developments", Journal of Membrane Science, pp. 1-18, 2006.

Allowed Claims of U.S. Appl. No. 16/277,139 dated Mar. 25, 2022.

APPARATUS AND METHODS FOR SOLUTION PROCESSING

CROSS REFERENCE TO RELATED APPLICATIONS

The present application is a continuation application of U.S. Ser. No. 16/277,139, filed Feb. 15, 2019, which issued as U.S. Pat. No. 11,298,658. U.S. Ser. No. 16/277,139 is a continuation of U.S. Ser. No. 15/693,572, filed Sep. 1, 2017, which issued as U.S. Pat. No. 10,518,218. U.S. Ser. No. 15/693,572 is a continuation of Ser. No. 14/492,571, filed Sep. 22, 2014, which issued as U.S. Pat. No. 9,751,045. U.S. Ser. No. 14/492,571 is a continuation of U.S. Ser. No. 13/544,294, filed Jul. 9, 2012, which issued as U.S. Pat. No. 8,840,792. U.S. Ser. No. 13/544,294 is a continuation of U.S. Ser. No. 12/455,998, filed Jun. 9, 2009, which has issued as U.S. Pat. No. 8,216,473. The present application also includes the disclosure of, with edits, U.S. provisional application 61/131,947, filed Jun. 13, 2008. A claim of priority is made to each of U.S. Ser. Nos. 16/277,139; 15/693,572; 14/492,571; 13/544,294; 12/455,998 and 61/131,947 to the extent appropriate. Also, the complete disclosures of U.S. Ser. Nos. 16/277,139; 15/693,572; 14/492,571; 13/544,294; 12/455,998; and, 61/131,947 are incorporated herein by reference.

FIELD OF THE DISCLOSURE

The present disclosure relates to methods and equipment for solution processing. The methods and equipment are applicable to provide purified solvent (i.e. dilute solution) and/or to provide concentrated (solute) compositions. In certain examples, cascading reverse osmosis processes and systems are described. Some potential examples of use involve: brine, desiccant, or deicing fluid re-concentration; salt water, brackish water, ground water or sea water demineralization and/or desalinization; juice concentration; sugar solution concentration; pharmaceutical purification or concentration; liquid waste or waste water treatment; and, recovery of other selected (valuable) materials from solution. A unique reverse osmosis unit or module, configured for both high pressure side and low pressure side inlet feed and outlet flow is described.

BACKGROUND

The present disclosure relates to solution processing. The solution can be from a variety of sources and processing generally concerns providing one or the other, or both, of: (1) a dilute solution (or relatively purified solvent) stream; and, (2) a relatively concentrated solute stream (concentrate). The techniques described herein relate to unique and advantageous applications of reverse osmosis technology.

SUMMARY

Herein, a unique reverse osmosis unit is described. The reverse osmosis unit includes: a reverse osmosis membrane arrangement; a high pressure side feed inlet; a low pressure side feed inlet; a high pressure side outlet; and, a low pressure side outlet. The unit can be incorporated in a reverse osmosis system, according to the present disclosure.

Also, processes, techniques and equipment are described for conducting reverse osmosis processing of a solution. An example equipment arrangement, used in various applications of the techniques described herein, comprises a reverse osmosis unit or module, having both a high pressure side inlet and a low pressure side inlet, as well as a high pressure side (concentrate) outlet and a low pressure side (dilute solution) outlet. Such equipment can be applied in a variety of systems and arrangements, to achieve desirable reverse osmosis operation.

Some of the example techniques described herein include providing a reverse osmosis system having at least:

(a) a first, final, solvent or dilute solution outlet-generating reverse osmosis unit; and, (b) a first, final, concentrate outlet-generating reverse osmosis unit; and may also contain, (c) an intermediate reverse osmosis membrane unit system comprising at least one reverse osmosis unit.

Typically, at least one reverse osmosis unit in the intermediate reverse osmosis membrane unit system comprises a reverse osmosis unit or module having a high pressure side inlet and a low pressure side inlet, as well as a high pressure side (concentrate) outlet and a low pressure side (dilute) outlet.

Herein the term "original solution" is generally meant to refer to the solution directed, initially, into the system for processing. The original solution may comprise any of a wide variety of solutions designated for processing. Although not limited to these examples, example systems could include: brine, dessicant, or de-icing fluid reconcentration; saltwater, brackish water, groundwater or seawater desalinization; juice concentration; sugar solution concentration; pharmaceutical purification or concentration; and, liquid waste or waste water treatment.

A variety of example systems and applications are described, each in general accord with the above descriptions.

In some examples, the processing is conducted such that at least:

(a) concentrated solution (concentrate) from the first, final, dilute solution or solvent outlet-generating reverse osmosis unit is directed into the intermediate reverse osmosis membrane unit system, and therethrough to the first, final, concentrate outlet-generating reverse osmosis unit;

(b) dilute solution from the intermediate reverse osmosis membrane unit system is directed into the first, final, dilute solution or solvent outlet-generating reverse osmosis unit as at least part of a high pressure side inlet feed stream thereto; and, (c) concentrated solution (concentrate) from the intermediate reverse osmosis membrane unit system is directed into a first, final, concentrate outlet-generating reverse osmosis unit. Also typically:

(d) dilute solution from the first, final, concentrate outlet-generating reverse osmosis unit is directed into the intermediate reverse osmosis membrane unit system, and therethrough to the first final dilute solution outlet-generating reverse osmosis unit.

Typically, the processes are conducted such that each reverse osmosis unit in the intermediate reverse osmosis membrane system is conducted with both a high pressure side inlet feed and a low pressure side inlet feed. Further, the high pressure side inlet feed to each unit, in the intermediate reverse osmosis membrane unit system, typically does not differ from the low pressure side inlet feed to the same unit by more than 20% in solute concentration, usually no more than 15% in solute concentration; and, often no more than 10% in solute concentration.

Indeed in some processing systems according to the techniques described herein, for at least one selected reverse osmosis unit, of the intermediate reverse osmosis unit membrane system, the inlet feed to the high pressure inlet side and the inlet feed to the low pressure inlet side, are the same in solute concentration (but differ in pressure and perhaps flow rate). Also, in at least one system and process described herein, each reverse osmosis unit of the intermediate reverse osmosis membrane unit system, has a high pressure inlet feed and low pressure inlet feed which, for that selected unit, is the same in solute concentration. By this, it is not meant to be characterized that the feed for each reverse osmosis unit of the intermediate reverse osmosis membrane unit system is the same as every other reverse osmosis unit of the intermediate reverse osmosis membrane unit system, with respect to solute concentration or flow rate; rather, it is meant that for each chosen unit, for that chosen unit, the high pressure side inlet feed and low pressure side inlet feed is the same in solute concentration. This will be apparent from a review of the example processes and systems characterized in the drawings.

A variety of specific examples, systems and techniques are described. It is noted that a reverse osmosis process, and corresponding equipment system, can be practiced without all of the specific features and techniques characterized herein, while still obtaining some benefit according to techniques of the present disclosure.

DETAILED DESCRIPTION

I. Reverse Osmosis, Generally

A. General Principles

Figure 1:
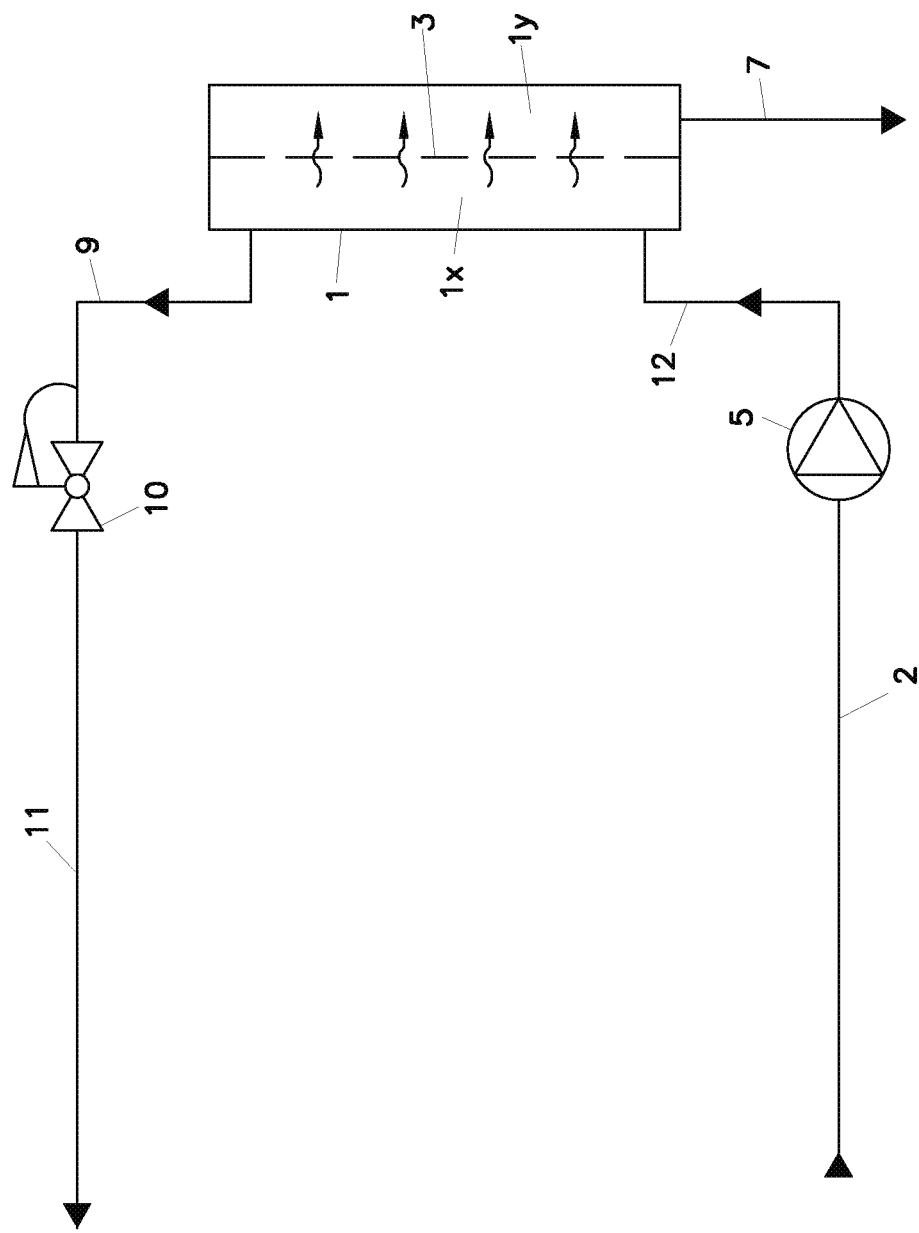
FIG. 1 is a schematic view of a typical, prior art, liquid/solute processing system, using a reverse osmosis unit.

An osmotic membrane can be any semi-permeable barrier which allows smaller molecules, such as solvent molecules, to pass through while blocking the passage of relatively larger molecules or ions, such as those of a solute dissolved in the solvent. Osmotic membranes are found in nature. Man-made osmotic membranes are also in use. A common, classic, example for human applications, concerns a liquid/solute mixture (solution) of salt, minerals and water. In nature, osmotic pressure is partially responsible for the transport of water, relative to sugars, and other nutrients in plants.

The term "solution" as used herein, and variants thereof, is simply meant to refer to a solvent/solute mixture; and, more is not meant unless otherwise specified. The term "original solution" is often used herein, to refer to an initial feed mixture to a reverse osmosis process and system for processing, in accord with the present disclosure.

In general terms, osmosis is a physical phenomenon considered to be one the colligative properties, concerning the behavior of solutions. Osmosis is a process whereby a solvent will naturally pass through an osmotic (semi-permeable) membrane into a solution of a relatively higher concentration of solute, thereby diluting the higher concentration solute in an attempt to reach concentration equilibrium on both sides of the osmotic membrane. The force per unit area which drives this process is described as the osmotic pressure. Once concentration equilibrium is achieved, net transport stops and the osmotic pressure differential across the osmotic membrane is zero. Osmotic pressure is generally proportional to a difference in solute concentration between the liquids on either side of the osmotic membrane; concentration typically being expressed in terms of the molarity of the solution.

Reverse osmosis is a process of applying pressure to an osmotic membrane side, typically containing a higher concentration of solute, which serves to drive the osmotic process in reverse, i.e. drives solvent through the osmotic membrane from the higher pressure (typically higher solute concentration) side. An incoming solution stream to the osmotic membrane is referred to as the "feed" stream; and, an outgoing fresh, purified, or relatively low concentration stream which has passed through the membrane is commonly referred to as the "permeate." An outlet stream which has an increased concentration of solute, from the high pressure upstream side of the membrane unit, is commonly referred to as the "concentrate" stream. An outlet stream which has a decreased concentration of solute, from the low pressure upstream side of the membrane unit (for example as a result of mixing the permeate which has passed through the membrane with other solution), is referred to herein as a "dilute" stream. The term "dilute" stream, and variants thereof, is also sometimes used to refer to low pressure side outlet flow that only comprises permeate.

Reverse osmosis has been used in a variety of applications for purifying solvent, for example to purify water. Nearly pure solvent (in many cases water) can be derived by forcing the solvent molecules through a selectively permeable osmotic membrane. The pressure required to achieve such a separation, and therefore purification, must be greater than the natural osmotic pressure tending to drive the process in the opposite direction. Because osmotic pressure is a function of the difference in the solute concentration between the liquids on the each side of the osmotic membrane, increasingly higher pressures are required to obtain separation (and thus solvent purification) from increasingly higher solute concentrations.

Typically, use of osmosis is inherently limited by the pressure required to overcome the resulting natural osmotic pressure as solute concentrations elevate. This is a major source of product loss/inefficiency, and limits the useful range of typical reverse osmosis configurations. For example, normal sea water has a typical salt concentration of about 3.5%. The osmotic pressure of sea water of this concentration is approximately 25.5 atmospheres. As fresh water is extracted from the sea water stream, the salinity will rise in the concentrate, since the salt stays behind and the fresh water is removed. Achieving a 40% water recovery from salt water would require an increase the salt concentration in the concentrate (i.e. on the high pressure or upstream side of the membrane) to just under 6%. The pressure required to achieve an effective recovery ratio of fresh water has to be higher than the maximum salt concentration of the discharge end of the process, so that the flow can progress from the sea water side to the fresh water side of the osmotic membrane. The pressure required to drive the process must be higher than the osmotic pressure at the discharge end of the process. Assuming a 40% recovery rate, which implies an approximate 6% salt concentration discharge, the required pressure to be applied must be greater than approximately 45 atmospheres, or approximately 660 pounds per square inch (psi). That is, a minimum of 45 atmospheres of pressure must be applied continuously, to hold the process steady. In practice even more pressure than this theoretical minimum is typically required to overcome the pressure drop due to flow through the membrane and other various components.

A typical, commercially available, osmotic membrane is designed to withstand a continuous reverse osmosis driving pressure of up to approximately 690 psi. Such membranes, for example, are available from GE Water and Process Technologies, Watertown office, Watertown, MA 02472. An example of such a reverse osmosis unit is a spiral-wound reverse osmosis membrane consisting of tightly packed filter material sandwiched between mesh spacers and wrapped in a small diameter tube.

From the above, it should be apparent that an ever increasing driving pressure is required to increase the total extraction or concentration, for concentrates above a relatively small solute (in the example, salt) percentage.

To achieve separation of solution concentrations higher than can be achieved with typical reverse osmosis systems, past practice has been to use techniques such as: distillation; mechanical vapor recompression; thermal vapor recompression; and/or single or multi-stage evaporators. These are typically all relatively energy intensive by comparison to a reverse osmosis process. However, due to operational pressure limitations of many available osmotic membranes, these methods often present themselves as the most practical, despite the larger energy consumption. Another common disadvantage to these non-osmosis techniques is the thermal destruction or stripping out of various aromatic or flavor compounds, when the technique is being used to process materials relating to consumables, for example tomato juice, coffee, or various fruit juices.

B. Typical Osmonic Membrane Configurations and Use

Numerous patents have been issued relating to osmotic membrane construction and use. Example membranes are described in the following patents: U.S. Pat. Nos. 4,992,485; 4,980,063; 4,957,817; 4,941,972; 4,927,540; 4,909,943; 4,894,165; 4,859,384; 4,859,338; 4,839,203; 4,828,700; 4,824,574; 4,812,238; 4,806,244; 4,797,187; 4,769,148; 4,765,897; 4,704,324; 4,652,373; 4,358,377; 3,630,378; 3,475,331; and 3,472,766. Membranes described in these references, incorporated herein by reference, can be utilized processes and equipment according to the present disclosure.

Commercially available membrane units can be used in the techniques described herein, if modified as described below. Examples include the GE Water and Process Technologies Unit characterized above.

Attention is now directed to FIG. 1, in which a typical reverse osmosis unit, configured for a typical, non-cascading process, is shown, schematically. Referring to FIG. 1, reference numeral 1 indicates the reverse osmosis unit. In accord with a typical conventional practice, original solution to be processed is shown directed into the system at line 2, with pressure for driving solvent across a reverse osmosis membrane 3 of the reverse osmosis membrane unit 1 being applied by the reverse osmosis pump 5.

Permeate is shown being removed from the reverse osmosis membrane unit 1, at line 7. The permeate, again, comprises the solvent which has passed through the reverse osmosis membrane 3. The term "permeate", then, for a given the reverse osmosis system, generally refers to a process off stream from the reverse osmosis membrane unit 1 which has passed through the osmosis membrane 3 within the unit 1, and thus which is increased in solvent concentration and reduced in solute concentration, relative to the inlet feed.

Concentrate is shown being removed from the reverse osmosis membrane unit at line 9. Concentrate in line 9 is original solution that has been concentrated with respect to the solute, as a result of the solvent transfer through the reverse osmosis membrane 3 within the unit 1.

At 10 a pressure reduction device such as: a valve system, a regulator system or a regenerative pressure letdown turbine, is depicted in the line for the concentrate solution 9.

Thus at 11 a concentrate line is depicted, having a line pressure reduced from the reverse osmosis system or unit pressure.

In FIG. 1, the reverse osmosis membrane unit 1 is depicted as it would be when used in a typical reverse osmosis operation, generally involving a single step.

Herein, line 12 will sometimes be referred to as the reverse osmosis high pressure inlet (or feed) line. This is because line 12 is generally the feed inlet to the reverse osmosis unit 1, under the pressure applied by the reverse osmosis pump 5. Side 1x of reverse osmosis membrane 3 is sometimes referred to as the high pressure side of the reverse osmosis membrane or unit 1, since it is the side of the membrane unit 1 receiving inlet feed (line 12) under the pressure of the reverse osmosis membrane pump 5. Line 9, the concentrate line from the reverse osmosis unit 1, is sometimes referred to as a high pressure side outlet line, or by similar terms.

Still referring to FIG. 1, line 7 is sometimes referred to as the low pressure side outlet line, as it provides for flow of solvent from a low pressure side 1y of the reverse osmosis membrane 3 or unit 1.

Figure 2:
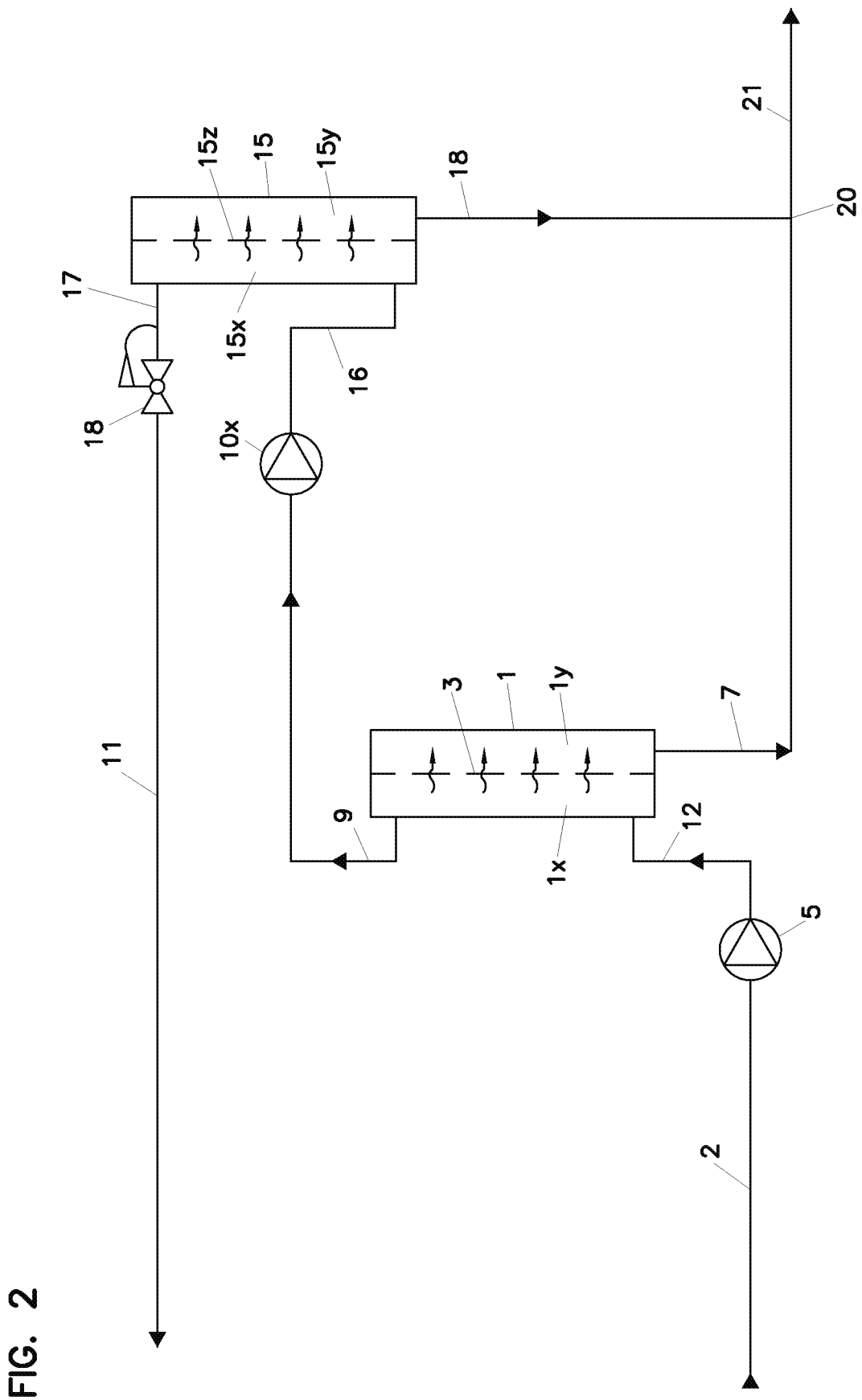
FIG. 2 is a schematic view of a typical prior art liquid/solute processing system, using two reverse osmosis units.

In some instances, reverse osmosis units of the type described in FIG. 1, have been applied in multi-stage (series, non-cascading) operations. An example of this is indicated in FIG. 2. Here, concentrate line 9 from a system in accord with FIG. 1 is directed through a reverse osmosis pump 10x for introduction into a high pressure side 15x of a second stage reverse osmosis unit 15, via a line 16. Line 16, then, is a high pressure side inlet line for reverse osmosis unit 15. At 17, a concentrate line (or high pressure outlet line) from a high pressure side 15x of reverse osmosis unit 15 is shown, directed through pressure reduction apparatus 18 to provide a concentrate line 11. At 19 a low pressure side outlet line from low pressure side 15y, of unit osmotic membrane 15z, is shown removing permeate which is then combined with the permeate of line 7 at 20, providing a combined permeate line 21 from the process.

In general, it is common in reverse osmosis systems to use multiple stages, whereby concentrate discharged from a first stage membrane unit is directed and re-pressurized to feed through a second membrane, to achieve increased solvent extraction efficiencies. The concentrate discharge from the second membrane, i.e., line 17, is typically too highly concentrated to be treated any further by reverse osmosis, since the operating pressures necessary would typically be too high for a typical membrane.

Figure 2A:
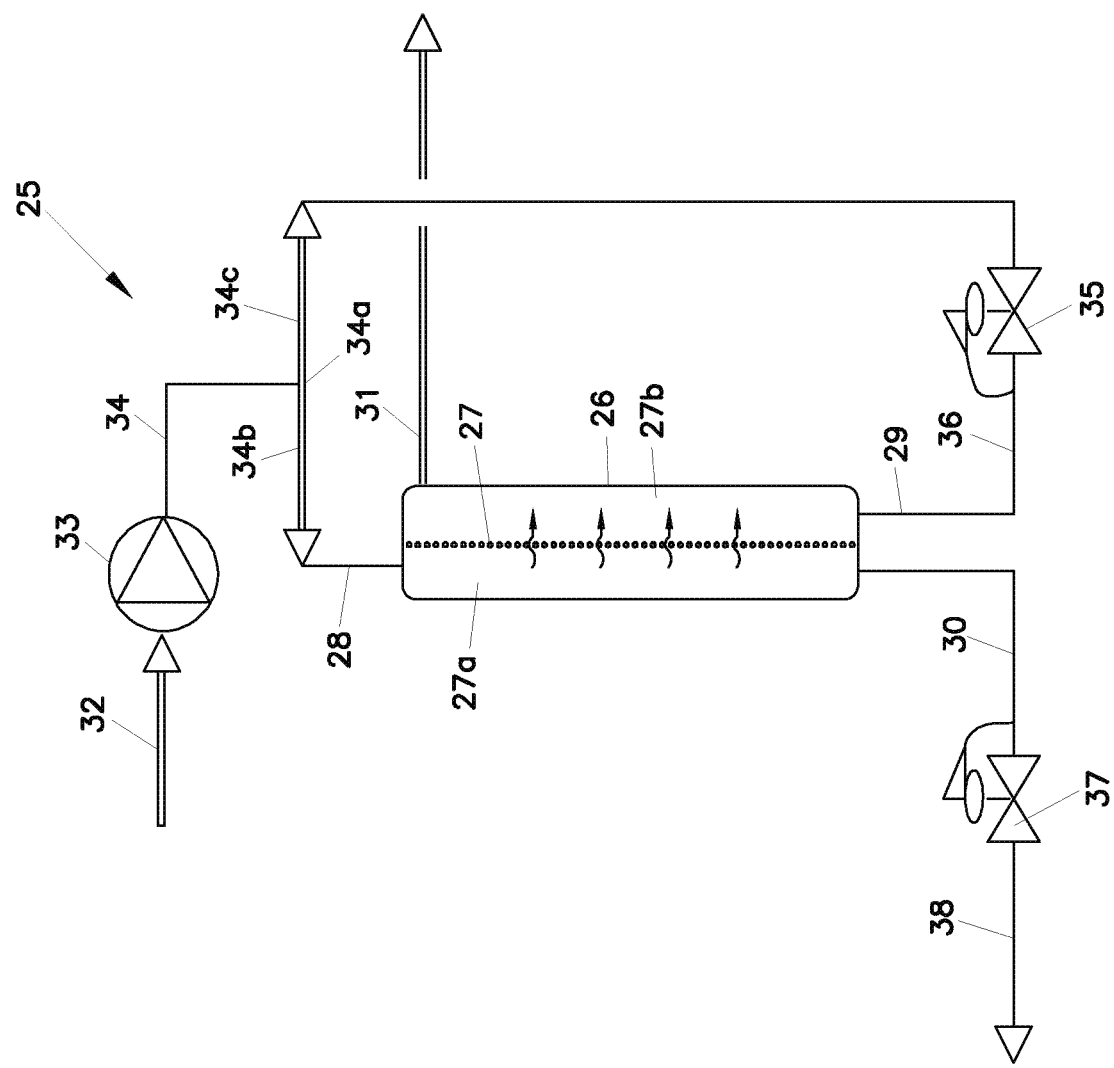
FIG. 2A is a schematic depiction of an example reverse osmosis unit provided according to the present disclosure with both a high pressure side inlet flow and low pressure side inlet flow, as well as high pressure side (concentrate) outlet flow and low pressure side (dilute solution) outlet flow; the unit of FIG. 2A being depicted in a counter current flow configuration.

II. Improved Reverse Osmosis Membrane Unit and Reverse Osmosis Techniques; FIG. 2A In FIG. 2A, a schematic depiction is provided for an improved reverse osmosis unit, for use with a system and techniques, in a solution separation process. Referring to FIG. 2A, reference numeral 25 indicates, generally, the system and process. System 25 includes therein a reverse osmosis membrane unit 26, modified in accord with the present disclosure. More specifically, membrane unit 26 comprises membrane arrangement or membrane 27 defining a high pressure side 27a and a low pressure side 27b. Reverse osmosis unit 26 includes a high pressure side inlet line 28 and a low pressure side inlet line 29, a high pressure side (concentrate or concentrated solution) outlet 30 and a low pressure side (dilute solution) outlet 31.

Reverse osmosis membrane unit 26, then, has been modified from reverse osmosis unit 1, 15, FIGS. 1 and 2, in that the reverse osmosis unit 26 is provided with an inlet line to both the high pressure side 27a and the low pressure side 27b. Thus, the reverse osmosis process conducted within the unit 26 is conducted between solutions on opposite sides of the membrane, 27, provided through inlet feed. Typically, disregarding pressure differential, the inlet feed to the high pressure side 27a at line 28 will differ from the inlet feed of the low pressure side 27b at line 29 by no more than 20% solute concentration, typically no more than 15% solute concentration; and, usually no more than 10% solute concentration. Indeed in some applications and techniques described herein, the concentration of solute in both the inlet feed to the high pressure side at 27a and the inlet feed 29 to the low pressure side 27b will be the same solution (solute) concentration, but for pressure difference and possible flow rate difference.

Stated in more general terms, the concentration differential between the solutions on the high pressure side and low pressure side cannot be at a level which is greater than a combination of typical pressure differentials for operation of the unit, without damage to the unit. The maximum concentration differences as referenced above will be typical.

Examples of use of the reverse osmosis unit 26 are described herein below, in connection with other figures. Before turning to those general techniques, further description of system 25, FIG. 2A is provided.

Referring to FIG. 2A, the original solution is shown directed into the system 25 through inlet line 32. The solution of line 32 is pressurized at pump 33 to provide an inlet line 34 of pressurized original solution. Line 34 is directed to joint 34a, where it is split into a first line 34b and a second line 34c. The first line 34b is directed to the high pressure side inlet line 28 for unit 26. Line 34c is directed through pressure reducer 35 to provide a line 36 directed into inlet line 29 to the low pressure side 27b.

Thus, for the particular, example, reverse osmosis process depicted as conducted in unit 26, high pressure side inlet feed 28 comprises the same solution, with respect to solute concentration (disregarding pressure differential and possible flow rate) as the inlet feed at line 29 to the low pressure side 27b.

The concentrate outlet previously identified as being in line 30, is shown directed through pressure reducer 37 to provide concentrate out flow 38 from the system 25. It is noted that schematic depiction of unit 26 provided in FIG. 2A, flow with respect to high pressure side inlet feed 28 and low pressure side inlet feed 29 are depicted as counter current through the unit 26. While this may be typical and preferred, alternate approaches are possible. By the term "counter current" and variants thereof, in this context, it is meant that the inlet flow feed to the high pressure side is generally at or near an opposite end of the membrane unit, from an end of the membrane unit at or near which the low pressure side inlet feed is provided.

In addition, as referenced above, for the particular example system 25 depicted, the unit 26 is shown operated with inlet feed line 28 to the high pressure side that is the same, in solute concentration disregarding pressure differences, as the inlet feed line 29 to the low pressure side 27b. In some applications and techniques described herein, as will apparent from descriptions below in connection with other figures, one or other, or both, of the inlet feeds (28, 29) can be modified. However, in general even if modified, typical practices according to the present disclosure, with units in accord with unit 26 (having both a high pressure side inlet feed and a low pressure side inlet feed) are conducted such that the two inlet feeds do not differ from one another by more than 20% in solute concentration, usually no more than 15% solute concentration; and, typically 10% solute concentration or less.

The reverse osmosis unit is generally in accord with unit 26 can be constructed by using a conventional reverse osmosis unit, and providing for the appropriate feed lines thereto. For example, a spiral wound reverse osmosis membrane obtained from GE Water and Process Technologies, as previously described, can be modified such that a small diameter inner tube in which the permeate flows can be equipped with both an inlet and outlet port, rather than only an outlet port. Alternate reverse osmosis membrane units and modules can be analogously modified or constructed.

III. Some Example Variations, FIGS. 2B-2F

In FIG. 2, an example system 1100 is depicted. Here a single reverse osmosis unit 26 is depicted, comprising a membrane arrangement or membrane 27 defining a high pressure side 27a and a low pressure side 27b. Solution into the system is shown at 32. At joint 32x, the inlet solution is split into lines 32a, 32b. At pump 33, line 32a is pressurized and directed into inlet feed 28, for the high pressure side 27a of unit 26. At 33x, a low pressure pump for line 32b is shown, providing a low pressure inlet feed at line 29, to low pressure side 27b of unit 26. As with the system of FIG. 2A, at line 31, dilute solution out is provided. At line 30, a concentrate (solution) out is provided, directed through pressure reducer 37, to provide a final concentrate out line 38.

Figure 2B:
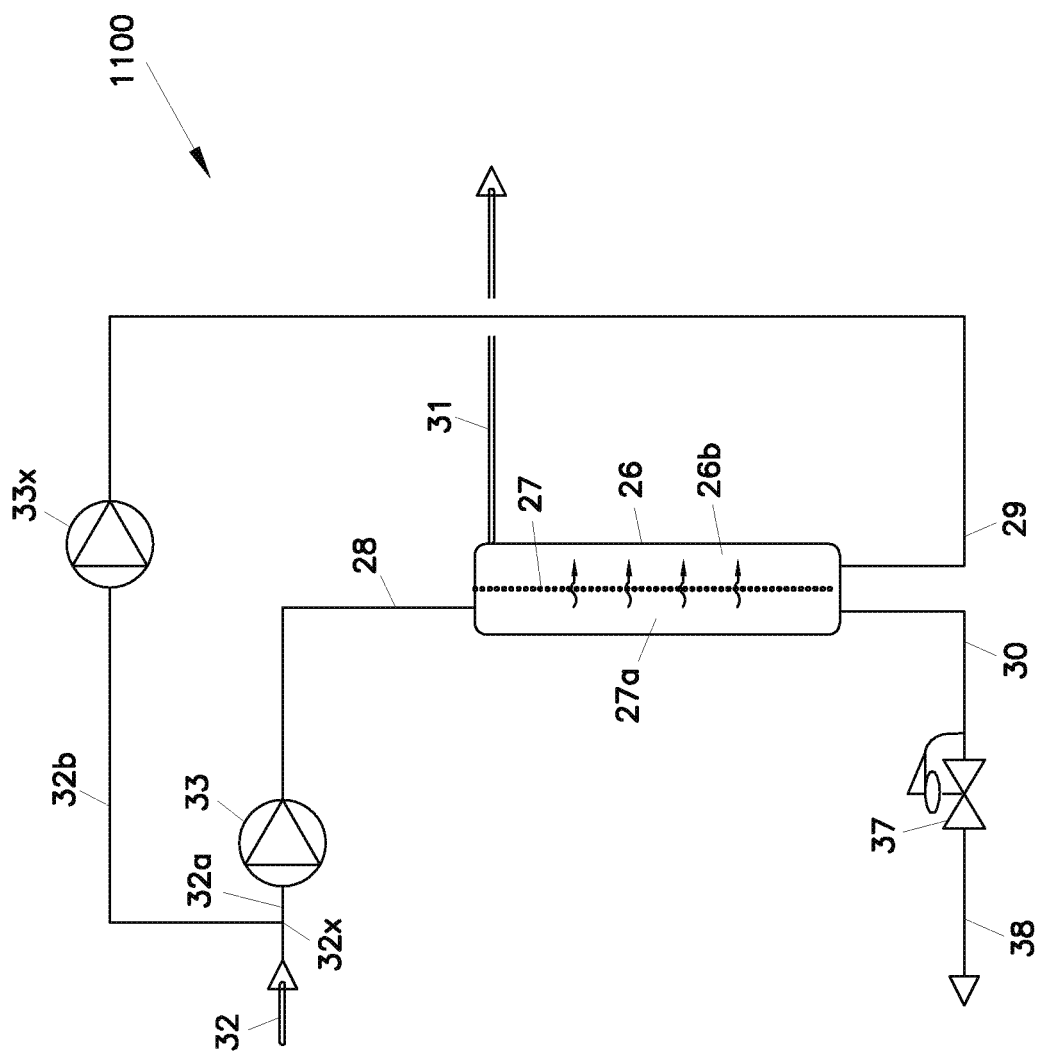
FIG. 2B is a schematic depiction of a second example reverse osmosis unit provided according to the present disclosure with both a high pressure side inlet flow and a low pressure side inlet flow; the system being analogous to FIG. 2A, but depicting an alternate pump system.

Comparing FIGS. 2A and 2B, then, in FIG. 2B the variation relates to when in the process, a split forming two feeds is provided. In each case the same feed, but for concentration and possibly flow rate, is provided to both the upstream and downstream sides of the reverse osmosis unit involved, i.e. unit 26.

Figure 2C:
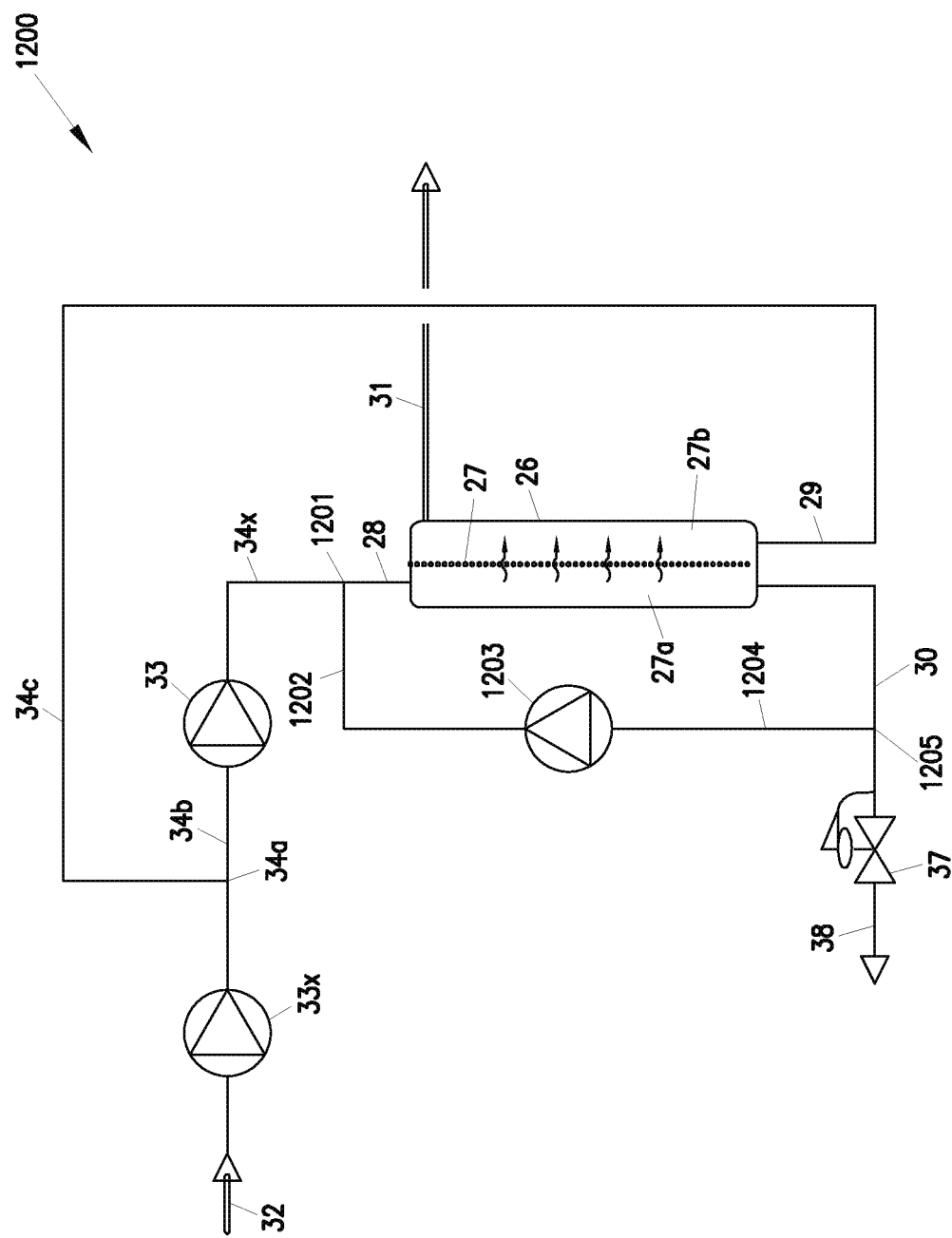
FIG. 2C is a schematic depiction of a third system analogous to FIG. 2A, but configured with a membrane sweeping pump therein, and an alternative pumping arrangement for original solution to be processed.

In FIG. 2C, another variation is provided, again using a single reverse osmosis unit 26 comprising membrane arrangement 27 having a high pressure side 27a and a low pressure side 27b. At line 32, original solution feed into the system, designated generally at 1200 is provided. Pump 33x provides for pressurization of the inlet feed. At joint 34a, the feed is separated at a line 34b and line 34c. Typically, pump 33x will be a low pressure pump. Thus, it provides the appropriate pressure in line 34c, for the low pressure side feed. At 33, a high pressure pump is provided, providing a line 34x of high pressure. At joint 1201, the material in line 34x is directed into an inlet side feed 28, from the high pressure side of unit 26. Also, at joint 1201, an optional feed from line 1202, directed from a membrane sweeping pump 1203 is provided. In particular, at line 1204, a portion of high pressure side outlet at line 30, directed from joint 1205 into line 1204 and membrane sweeping pump 1203. Thus, it is directed via line 1202 to joint 1201 and back into reverse osmosis unit 26. At line 29, a low pressure side inlet feed is provided. At line 31, dilute solution out is provided. At 37 a pressure reducer is provided, providing for a final concentrate outlet line at 38.

Thus, the system of FIG. 2C is generally analogous to the system of 2B, except for: using low pressure pump 33x upstream of joint 34a; and, using a membrane sweeping pump 1203 and a bleed circuit from outlet line 30 back into inlet line 28.

One common problem associated with processing higher and higher solution concentrations in a reverse osmosis system is the phenomenon of solution concentration gradients very near the membrane. This occurs as solvent is forced out of the solution directly adjacent to the membrane wall, while portions of the solution stream farther away from the membrane while still within the reverse osmosis membrane unit do not experience as high of a concentration. As this thin layer of high concentration forms near the membrane wall it has the net effect of increasing the osmotic pressure across the membrane due to the increased solution concentration being directly exposed to the membrane. This increasing of osmotic pressure pushes back on the driving reverse osmosis pressure being applied to achieve a separation thereby reducing flux through the membrane for an overall applied driving pressure. This increase in-turn reduces the overall membrane effectiveness and/or increases pumping energy consumption to achieve the desired separation.

This localized area of high concentration near the membrane wall is also prone to reaching solution concentrations high enough to cause precipitates to form as the upper solubility limit of the solute is reached for a given solution. If precipitate formation is occurring, these precipitates can quickly clog the minute pores of the RO (reverse osmosis) membrane reducing its effectiveness. In addition other process solution contaminates that may be in the solution stream being processed will have a tendency to build up on the membrane further reducing flux through the membrane. To address these problems the traditional method for large scale RO units is to conduct periodic cleaning as a way of removing much of the materials clogging the micro pores in the membrane. This is often done by flushing the membrane with high velocity purges and/or chemical based cleaning techniques.

To mitigate these problems a membrane sweeping pump could be utilized to generate an increased rate of re-circulated flow across the membrane's upstream high pressure side, which is tangential to the membrane wall thereby sweeping precipitates and other potential contaminates along and thus reducing the likelihood of them clogging or otherwise fouling the membrane, as illustrated in FIG. 2C. This tangential sweeping action would also serve to breakdown the concentration gradient boundary layer phenomena described herein thereby potentially improving overall system performance, increasing membrane life, and/or increasing the time intervals between required periodic membrane cleanings.

Figure 2D:
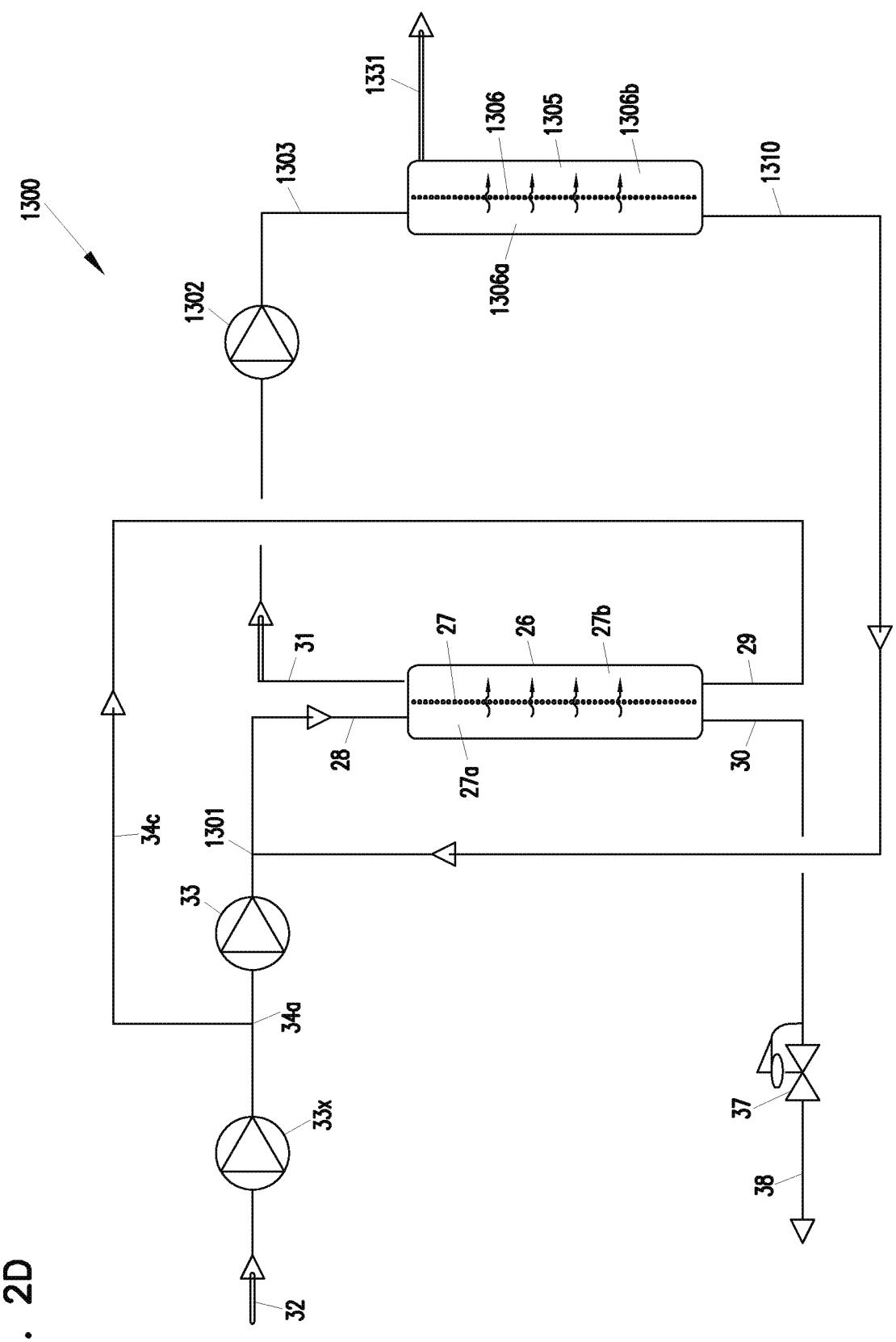
FIG. 2D is a schematic depiction of a fourth reverse osmosis unit system including two reverse osmosis units therein.

In FIG. 2D, a system using two reverse osmosis units is provided. A first unit 26 generally is analogous to the previous units 26 described, and comprises a membrane arrangement or membrane 27 having a high pressure side 27a and a low pressure side 27b. Inlet line 32 is directed into low pressure pump 33x. At joint 34a, line 34c comprises a low pressure line, directed to inlet line 29 for reverse osmosis unit 26. At 33, a high pressure pump is provided, increasing the inlet pressure of the original solution from joint 34a. This solution is directed past joint 1301, to high pressure side inlet line 28. At 30, a high pressure side outlet is shown removed from unit 26, directed to pressure reducer 37, to provide a concentrate outlet at 38. At 31, a low pressure side outlet flow from unit 26 is shown directed through pump 1302, to provide a high pressure side inlet feed at line 1303, to unit 1305. Reverse osmosis unit reverse osmosis 1305 includes a membrane arrangement or membrane 1306 having a high pressure side 1306a and a low pressure side 1306b. The particular unit 1305 depicted, does not include a low pressure side inlet feed. At 1310, a high pressure side outlet from unit 1305 is shown, directed into joint 1301. At 1331, a final dilute solution outlet, from system 1300 is provided.

The unit of FIG. 2D, then, provides a second, polishing, reverse osmosis unit 1305 to capture some solute and direct it back into a high pressure side of unit 26, while at the same time providing a polished, most dilute, system outflow at line 1331.

Figure 2E:
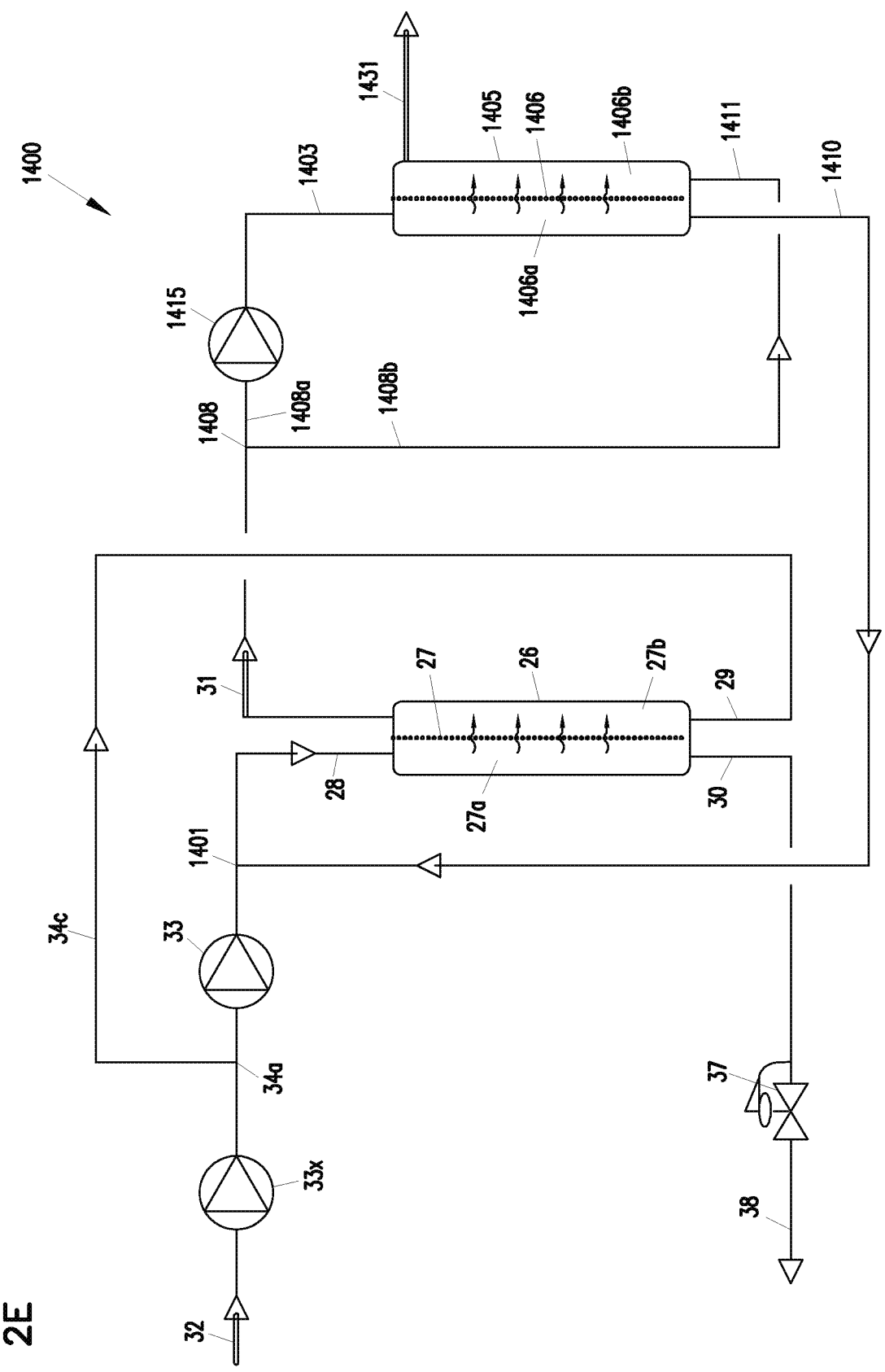
FIG. 2E is a fifth schematic depiction of a reverse osmosis unit system, having two reverse osmosis units therein.

In FIG. 2E, a variation in the system of FIG. 2D, is depicted generally at 1400. Referring to FIG. 2E, unit 26, as previously characterized, with a reverse osmosis membrane arrangement 27 having a high pressure side 27a and a low pressure side 27b. A second unit 1405, however, differs from FIG. 2D, in that unit 1405 not only has a high pressure side inlet 1403, a high pressure side outlet 1410, but it also includes a low pressure side inlet 1411. Thus, unit 1405 includes a membrane arrangement 1406 having a high pressure side 1406a and a low pressure side 1406b, and both the high pressure side inlet 1403 and a low pressure side inlet 1411. At 1431, a final dilute solution, outlet from system 1400 is depicted.

Referring to FIG. 2E, original solution enters at 32. At 33x, a low pressure pump is provided. At joint 34a, the low pressurized solution is split into a low pressure line 34c, and a line directed to line to high pressure pump 33. The pressurized solution from pump 33 is directed past joint 1401, to high pressure side inlet line 28 for reverse osmosis unit 26. At 30, a high pressure side concentrate outlet from unit 26 is shown, directed to pressure reducer 37 to provide a concentrate outlet line 38. At line 29, the low pressure solution line 34c is directed as low pressure side inlet solution to unit 26. At 31, the low pressure side, dilute solution, outlet from unit 26 is shown. This is directed to joint 1408, where it split into line 1408a and 1408b. Line 1408a is directed through high pressure pump 1415 and into line 1403, the high pressure side inlet line for unit 1405. Line 1408b, directed to inlet line 1411 from the low pressure side of unit 1405.

Figure 2F:
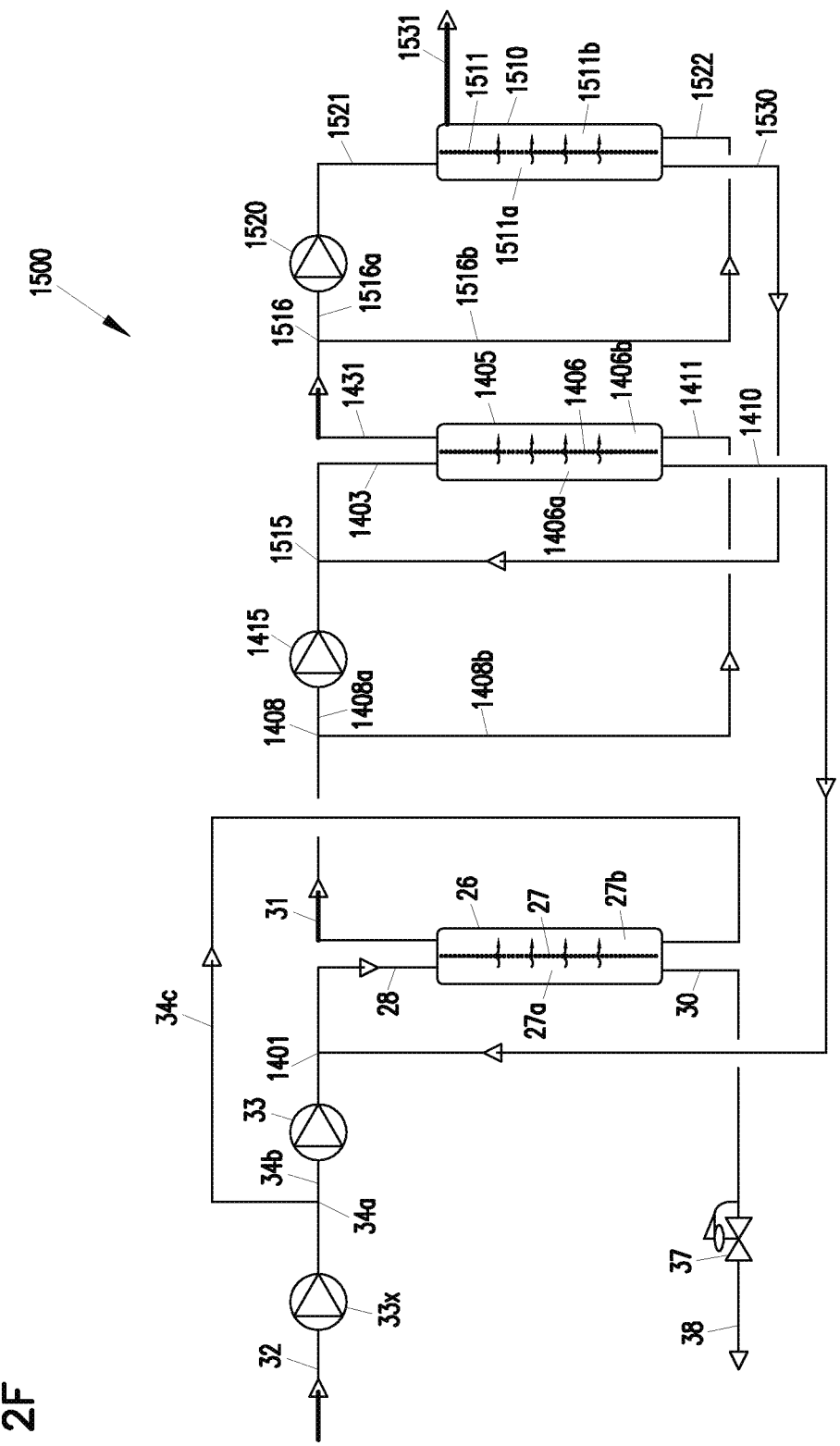
FIG. 2F is a schematic depiction of a sixth reverse osmosis unit system having three reverse osmosis unit systems therein.

Attention is now directed to FIG. 2F, which depicts the addition of a third reverse osmosis unit, to system 1400, for forming system 1500. Referring to FIG. 2F, the third unit is indicated generally at 1510, comprising a reverse osmosis membrane arrangement or membrane 1511 having a high pressure side 1511a and a low pressure side 1511b. Referring to FIG. 2F, at 32, original solution is shown directed into system 1500. At 33x, a low pressure pump is provided, directing the solution to joint 34a, where it is split into lines 34c and 34b. At pump 33, a high pressure treatment is provided, to the material line 34b. It is directed through joint 1401, to inlet line 28 for reverse osmosis unit 26; unit 26 comprising a membrane arrangement 27 having a high pressure side 27a and a low pressure side 27b. At 30, a high pressure side (concentrate) outlet line from unit 26 is depicting, directing concentrate through reducer 37 to provide a concentrate out line 38. At 31, low pressure side outlet is directed to joint 1408. Here, it is split into line 1408a and 1408b. Line 1408a is directed through high pressure pump 1415 past joint 1515, to provide an inlet line 1403 for unit 1405; unit 1405 comprising a membrane arrangement 1406 with a high pressure side 1406a and a low pressure side 1406b. At line 1410, a high pressure side, concentrate, outlet is shown directing concentrate from unit 1405 to joint 1401. At 1431, a low pressure side outlet, is shown directing liquid to joint 1516. It is noted that unit 1405 includes a low pressure side inlet stream at 1411, comprising the feed in line 1408b.

Referring to joint 1516, the liquid is split into lines 1516a and 1516b. At line 1516a, is directed through high pressure pump 1520, to provide high pressure side inlet feed at 1521, to reverse osmosis unit 1510. Line 1516b is directed to low pressure side inlet feed 1522 to reverse osmosis unit 1510. At 1530, a high pressure side, concentrate, outlet line from unit 1510 is shown, directing concentrate back to joint 1515. At 1531, a final, dilute solution outlet from system 1500 is depicted.

IV. Other Reverse Osmosis Systems and Processes

A. General Principles

Herein, certain unique, progressively, cascading configurations of reverse osmosis membrane units are described for use with an entire range of solution concentrations, which would otherwise require reverse osmosis pressures typically in excess of those readily withstood by typical osmotic membranes.

Cascading reverse osmosis techniques described herein are made possible, in part, through selected use of a reverse osmosis membrane unit analogous to unit 26 in FIG. 2A (whether counter current flow or otherwise).

A feature of many cascading reverse osmosis system or process in accord with the disclosures herein, is that the system at least includes:

(i) a first, final, concentrated solution generating reverse osmosis unit; and, (ii) a first, final, dilute solution or solvent-generating reverse osmosis unit.

A feature of many cascading reverse osmosis system or process in accord with the disclosures herein, is that the system may also include:

(iii) an intermediate reverse osmosis membrane unit system, comprising one or more reverse osmosis units.

The term "final concentrate-generating reverse osmosis unit", and variants thereof is meant to refer to a reverse osmosis unit in the system, which provides the final, polished concentrate outlet flow from the system. In many systems there will be only one such unit, referred to herein as a "first" unit. However, in one system described herein, FIG. 5, there are two (i.e. first and second) final concentrate-generating reverse osmosis units.

The term "final, solvent-generating reverse osmosis unit" and variants thereof, as used herein, is meant to refer to the reverse osmosis unit from which the final solvent stream (i.e. purified solvent or reduced solute solvent) leaves the reverse osmosis membrane system characterized herein. Typically, there is only one "final solvent-generating reverse osmosis unit". However, principles characterized herein can be applied with more that one such units, for example in parallel. The term is not meant to indicate whether the solvent is pure, or reduced in solute content but not pure.

In general, the intermediate reverse osmosis membrane unit system comprises one or more reverse osmosis units positioned generally in flow series between: a final reduced-solute dilute solution or solvent-generating reverse osmosis unit; and, a final concentrate-generating reverse osmosis unit, as characterized above. That is, low pressure side outlet flow from the final concentrate-generating reverse osmosis unit(s) is generally directed into the intermediate system; low pressure side outlet flow from the intermediate reverse osmosis system is generally directed into the final dilute solution generating reverse osmosis unit(s); concentrate from the final dilute solution or solvent-generating reverse osmosis unit(s) is generally directed into the intermediate system; and, concentrate from the intermediate system is generally directed into the final concentrate-generating reverse osmosis membrane unit(s). Within the intermediate system, the flow maybe in series, but other configurations are possible.

A number of examples are described herein, including ones that have two or more reverse osmosis membrane units, in the intermediate system. In some examples described herein, there are five reverse osmosis membrane units, in the intermediate system.

From the example systems described herein, general principles for application of the techniques described herein in a wide variety of systems can be understood.

The term "cascading" as used herein, generally refers to the fact that when the system is operated, concentrate from the final reduced-solute solvent-generating unit(s) is passed through the intermediate reverse osmosis unit system in flow-direction to the final concentrate-generating unit(s); and, low pressure side outlet flow from the final concentrate-generating reverse osmosis unit(s) is typically directed through the intermediate reverse osmosis unit system to the final solvent-generating reverse osmosis unit(s).

Of course, an original solution feed stream is directed into the system. It can be directed into one or more of: the final solvent-generating reverse osmosis unit(s); the intermediate reverse osmosis unit system; and, the final concentrate-generating reverse osmosis unit(s), depending on the system, and preference for operation.

Another typical characteristic of many systems and applications according to the present disclosure, is that at least each unit in the intermediate reverse osmosis unit system is operated with both a high pressure side inlet feed and a low pressure side inlet feed. Also, in some instances the first, final, concentrated solution-generating reverse osmosis unit is operated with both a high pressure side inlet feed and a low pressure side inlet feed.

Further, for each selected unit having both a high pressure side inlet feed and a low pressure side inlet feed, within the intermediate reverse osmosis membrane unit system, the solute concentration of the high pressure side inlet stream and the low pressure side inlet stream typically differs (if at all) by no more than 20%, usually no more than 15%; and, often 10% or less. Indeed in some instances, the same inlet feed is provided to each of the high pressure side and the low pressure side of one or more selected reverse osmosis membrane units, in the intermediate reverse osmosis unit system. By this latter, it is not meant that every reverse osmosis unit in the intermediate reverse osmosis membrane unit system necessarily has the same inlet and outlet feed as every other unit in the intermediate reverse osmosis membrane unit system. Rather, it is simply meant that each selected unit has the same solute concentration in the high pressure side inlet feed and the low pressure side inlet feed thereof.

It is also noted that a similar operation of the first, final, concentrated solution-generating reverse osmosis unit is sometimes practiced, i.e., where the solute concentration of the high pressure side inlet stream and the low pressure side inlet stream typically differs (if at all) by no more than 20%, usually no more than 15%, and often 10% or less. Again, in some instances the concentration in each of these two streams, for the first, final, concentrated solution-generating reverse osmosis unit may be the same.

B. An Example System, FIG. 3.

Figure 3:
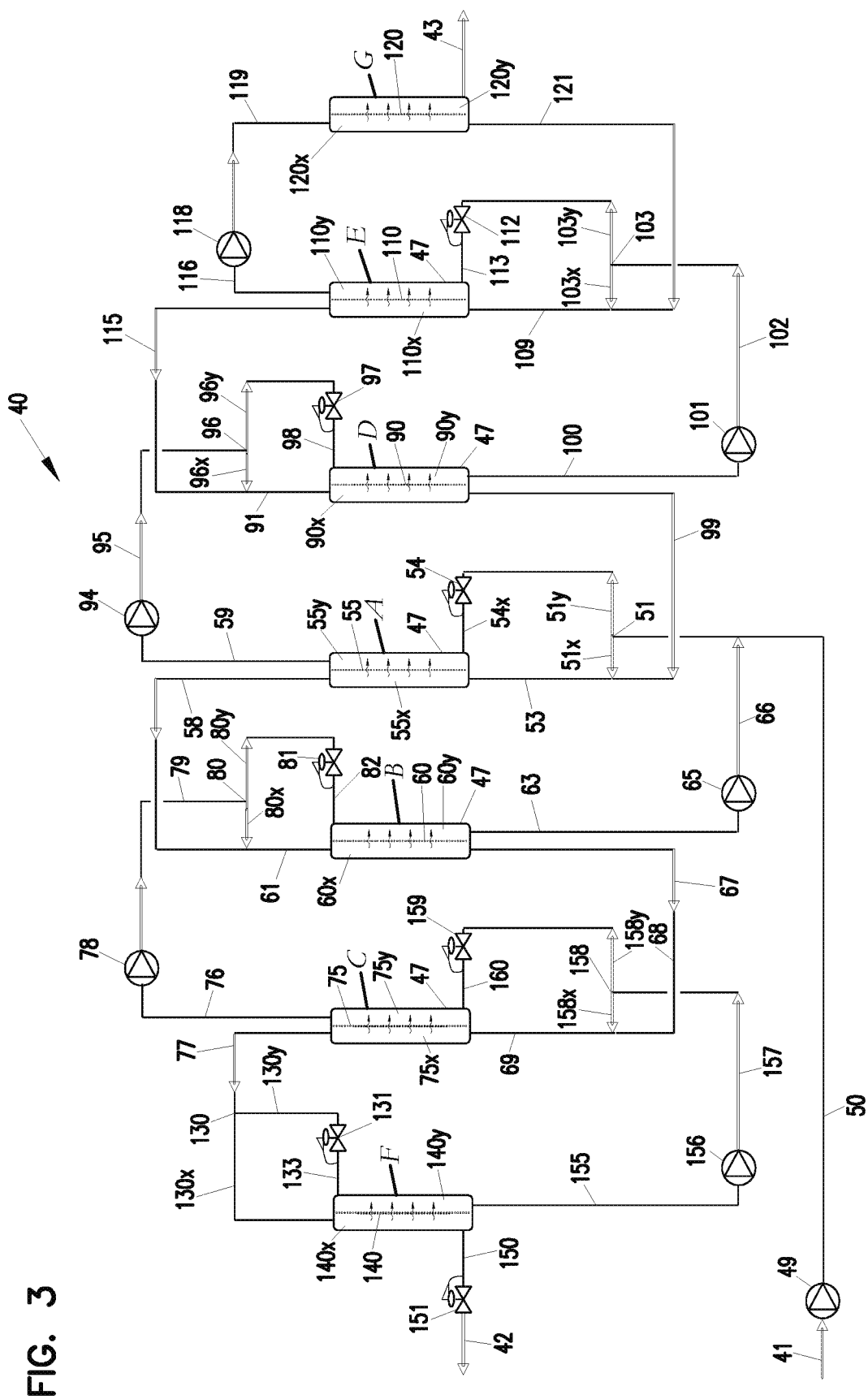
FIG. 3 is a schematic depiction of a seventh example system configured for operating a reverse osmosis process according to the present disclosure.

In FIG. 3, at 40 an example cascading reverse osmosis system 40 is schematically depicted. Referring to FIG. 3, the system 40 includes, at 41 a feed source of original solution to be processed. At 42, a first process stream comprising a concentrated solute solution (concentrate) is shown being removed from the system 40. At 43 a final solvent process stream, of relatively low concentrate (i.e. relatively pure or reduced-solute) solvent (sometimes called dilute solution) is shown as a second process stream from the system 40.

In general terms, the cascading reverse osmosis system 40 comprises a plurality of reverse osmosis units 47. In typical application, the reverse osmosis units 47 can be made from modifying commercially available units, and be generally identical to one another. Units such as described above for unit 26, FIG. 2A can be used for those units having both a high pressure side inlet feed and a low pressure side inlet feed. For any unit that does not have both a high pressure side inlet feed and a low pressure side inlet feed, a conventional, commercially available unit can be used. It is noted that the system 40 depicted in FIG. 3, selected units having both a high pressure side inlet feed and a low pressure side inlet feed are not shown with a counter current flow, but the techniques described can be implemented with a counter current flow through such units, if desired.

In many applications of techniques described herein, a cascading system 40 will include at least two (2) reverse osmosis units, typically at least four (4), and for the particular configuration of FIG. 3 usually at least five (5) units although the number can be varied. The example system 40 depicted, includes seven (7) reverse osmosis units 47, labeled A, B, C, D, E, F and G respectively.

In the terms used above, unit G is the first, final, dilute solution (or solvent)-generating reverse osmosis unit, since it is the first unit which generates relatively purified solvent for process stream 43. Unit F is the first, final, concentrate-generating reverse osmosis unit, since it is the final unit that generates the concentrate stream 42. Units A, B, C, D and E, collectively, comprise the intermediate reverse osmosis membrane unit system.

Referring to FIG. 3, reverse osmosis unit A is the unit of the intermediate reverse osmosis unit system (units A-E, collectively) into which the feed solution of line 41 is first directed. Referring to FIG. 3, original solution in the inlet line 41 is pressurized and conveyed, by reverse osmosis pump 49, into pressurized inlet line 50. At joint 51, the pressurized solution of line 50 is split, with a portion directed by line 51x into high pressure side inlet line 53 for unit A, and with a portion directed by line 51y through pressure reducer 54 into a low pressure side inlet line 54x, of reverse osmosis unit A.

From the above, an initial specific difference from the systems of FIGS. 1 and 2 should be apparent. For the system of FIG. 3, reverse osmosis unit A is generally in accord with unit 26, FIG. 2A and has an inlet feed to both a high pressure side 55x and a low pressure side 55y of membrane arrangement 55. (Again, it is noted that unit A is not depicted in the figures in counter current flow, as is unit 26, FIG. 2A, however it could). For the systems of FIGS. 1 and 2, there was no inlet line to the low pressure side of the reverse osmosis membrane units (1, 15) involved.

Within reverse osmosis unit A is provided an osmotic membrane arrangement or membrane 55, with a high pressure side 55x and a low pressure side 55y. It can be seen that within unit A, a reverse osmosis process is conducted with a portion of the mixture from line 50 provided to opposite sides of the membrane 55.

As will be understood from the descriptions below, typically the inlet feed to the high pressure side 55x, is modified from a content of line 50, as inlet feed is fed into the unit A. Typically concentration of solute within the inlet feed to opposite sides of membrane 55, does not differ by more than 20%, usually not more than 15%, and typically differs by only about 10% or less. This is discussed further below. It is again noted that this characteristic level of differences, in concentration of feed to opposite sides of the membrane 55 in unit A, is a typical characteristic feature of various membrane units in the example, (A-E) used in an intermediate reverse osmosis membrane unit system in the example cascading reverse osmosis process 40 according to the present disclosure.

At 58 a high pressure side outlet (concentrate) line from osmosis unit A is depicted. The line 58 would include concentrate from first osmosis unit A. For the system 40 depicted, this concentrate is directed into reverse osmosis unit B.

The reverse osmosis unit B includes reverse osmosis membrane arrangement 60 with a high pressure side 60x and a, low pressure side 60y. Concentrate 58 from the high pressure side 55x of reverse osmosis unit A is directed into high pressure side inlet line 61 for reverse osmosis membrane unit B. If desired, pressure modification equipment (pump to increase pressure or pressure reduction system) can be included in line 61, to modify the pressure.

Within reverse osmosis unit B, a reverse osmosis process is conducted on a high pressure side inlet liquid containing at least in part concentrate from line 58. In a typical application of a process in accord with system 40, inlet feed in line 61 is modified from concentrate line 58, before it is introduced into first reverse osmosis unit B.

At line 63 a low pressure side outlet (reduced-solute fraction) stream from the osmosis membrane unit B is depicted. The low pressure side outlet (dilute) stream 63 is shown pressurized by pump 65 and directed into a pressurized solution stream 66. That is, stream 66 includes low pressure side outlet solution (reduced-solute fraction solvent) from reverse osmosis unit B, pressurized via pump 65. The stream 66 is directed into line 50, and is thus mixed with the original solution 41, before that mixture is directed to joint 51 for splitting. Thus, relatively purified solvent from unit B is directed, as part of the cascading process, into the inlet solution for both sides (high and low pressure) of the membrane 55 in reverse osmosis unit A.

Still referring to FIG. 3, at 67 a high pressure side outlet stream, comprising relatively concentrated solute, from reverse osmosis membrane unit B is shown. The relatively concentrated solution or concentrate (line 67) from reverse osmosis unit B, for system 40, is shown directed via line 68 into the high pressure side inlet line 69 for reverse osmosis unit C. Typically, for a process in accord with FIG. 3, the feed in line 69, to reverse osmosis unit C, will be modified from the content of line 68 before it is introduced into the reverse osmosis unit C. This is discussed further below.

Still referring to FIG. 3, the reverse osmosis unit C comprises a reverse osmosis membrane arrangement or membrane 75 with a high pressure side 75x; and, a low pressure side 75y. The solution directed into membrane unit C via line 69 is processed, with a low pressure side dilute solution leaving the low pressure side 75y via low pressure side outlet line 76.

Low pressure side dilute solution outlet flow (relatively pure solvent compared to the inlet solution to the reverse osmosis membrane unit i.e. reduced-solute fraction solvent solution) from reverse osmosis membrane unit C is shown directed via line 76, with pressurization provided by reverse osmosis pump 78, into pressurized line 79. The pressurized line 79 is directed to joint 80, where it is split, with a first stream 80x directed into inlet line 61 and thus into the high pressure inlet side 60x of reverse osmosis unit B. The second split stream is directed by line 80y into pressure reducer 81, and then into low pressure inlet line 82 for reverse osmosis unit B. In general terms, then, the reverse osmosis process conducted in unit B is conducted with a liquid feed, to the high pressure side 60x, comprising a combination of: high pressure side outlet flow (concentrate) from unit A and low pressure side outlet flow (dilute solution) from unit C; and, with a feed stream to a low pressure side 60y comprising dilute solution from unit C. Typically, the reverse osmosis unit B will be operated such that a concentration difference, in solute, between inlet flow to the high pressure side and inlet flow to the low pressure side of unit B is not greater than 20%, typically no greater than 15%, and is usually 10% or less.

Still referring to FIG. 3, attention is now directed to reverse osmosis unit D. Reverse osmosis unit D includes a reverse osmosis membrane arrangement or membrane 90 with a high pressure side 90x and low pressure side 90y. At 91 a high pressure side inlet (feed) line for reverse osmosis unit D is depicted.

For the particular process conducted in FIG. 3, at 59 a low pressure side (reduced-solute solvent) outlet flow from reverse osmosis membrane A is depicted. This outlet flow is pressurized at pump 94 and is directed via pressurized line 95, to joint 96. Here low pressure side outlet flow from unit A, having been pressurized at pump 94, is split into a first line 96x, which directs a portion of the flow from line 59 to a high pressure side inlet line 91 of reverse osmosis unit D. At line 96y, a portion of the low pressure side outlet flow from reverse osmosis unit A, pressurized by pump 94, is directed through pressure reducer 97 into low pressure side inlet line 98, for reverse osmosis unit D.

From the above, it will be understood that in reverse osmosis unit D, a reverse osmosis process is conducted between a high pressure side solution comprising a low pressure side outlet flow from unit A, and a low pressure side liquid feed also comprising low pressure side outlet flow from unit A. Typically, the high pressure side inlet feed unit D will have been modified by addition thereto, of a further liquid mixture. However, typically the reverse osmosis process in unit D will be conducted between initial high pressure side and low pressure side inlet feed solutions differing in solute concentration by no more than about 20%, typically no more than 15%, and usually 10% or less.

At 99, a high pressure side outlet, or concentrate steam, from reverse osmosis unit D is depicted. Concentrate line 99 from the high pressure side 90x of reverse osmosis membrane 90, in unit D, is shown directing concentrate from reverse osmosis unit D into the inlet line 53 for reverse osmosis unit A. Thus, the inlet composition to reverse osmosis unit A includes: the original solution mixture from line 41; the low pressure side outlet flow in line 66 from reverse osmosis unit B; and, the concentrate line 99 from reverse osmosis unit D. Further, the low pressure side inlet feed to reverse osmosis unit A includes: original solution from line 41; and, a portion of the low pressure side outlet flow in line 66 from reverse osmosis unit B.

Again, in general, the high pressure inlet feed to reverse osmosis unit A, via line 53, and the low pressure side inlet feed to reverse osmosis unit A, via line 55, are provided in a manner such that the difference in solute concentration between the two is preferably no greater than 20%, usually no greater than 15%, and often 10% or less, with a higher solute concentration being in the high pressure side inlet feed.

Referring again to reverse osmosis unit D, line 100 comprises a low pressure side outlet line i.e. reduced-solute (dilute solution) solvent line, from reverse osmosis unit D. Within line 100, then, is contained a relatively low concentration solute mixture (i.e. a relatively high purity solvent).

The solution in line 100, from a low pressure side 90y of reverse osmosis unit D, is pressurized via pump 101 and is directed into line 102. The pressurized solution of line 102 is directed to joint 103 where the liquid is split. A first line 103x directs a portion of the liquid in line 102 into high pressure side inlet line 109 for reverse osmosis unit E.

Reverse osmosis unit E comprises a reverse osmosis membrane or membrane arrangement 110 having a high pressure side 110x and a low pressure side 110y. Line 109, then, is an inlet feed line for a high pressure side 110x.

Also at joint 103, line 103y provides a portion of the pressurized dilute solution from line 102, after passage through pressure reducer 112 into low pressure side inlet line 113, for reverse osmosis unit E.

At 115, a concentrate line, or high pressure side outlet line, from reverse osmosis unit E is shown. Within line 115 would be included concentrate, from a reverse osmosis process conducted in reverse osmosis unit E. For the particular example system 40 depicted, the concentrate in line 115 is directed into high pressure side inlet line 91 for unit D. Thus, for the example system 40 shown, a reverse osmosis process conducted in unit D is conducted with a high pressure side inlet feed comprising a combination of: pressurized low pressure side outlet flow from reverse osmosis unit A; and, pressurized concentrate from reverse osmosis unit E. The low pressure side of unit D is provided with an inlet liquid comprising low pressure side outlet flow from unit A. The difference, then, in the solutions on opposite sides of the membrane 90 in unit D, where the reverse osmosis process is conducted, is a difference provided by the inclusion of the concentrate from unit E within the high pressure side inlet line 91.

In a typical process according to FIG. 3, the reverse osmosis unit D is operated with a concentration difference between the high pressure side inlet feed and the low pressure side inlet feed, with respect to solute concentration, of no greater than 20%, usually no greater than 15%, and often 10% or less, with a higher solute concentration being on the high pressure side of the reverse osmosis membrane unit D.

Still referring to FIG. 3, and process 40, at 116 a low pressure side outlet line 116, from unit E, is depicted. Alternately stated, within line 116 is provided low pressure side dilute solution from the reverse osmosis unit E. The solution would comprise relatively purified solvent (a relatively low concentrate, i.e. dilute, solute) from the unit E.

For the particular system 40 and process depicted, flow from line 116, i.e., low pressure side outlet flow from unit E, is further polished. This is conducted with pressurization at pump 118, directing the pressurized flow via line 119 into reverse osmosis unit G, used as a polishing unit. The reverse osmosis unit G has a reverse osmosis membrane or membrane arrangement 120, with a high pressure side 120x and a low pressure side 120y. Line 119 serves as a high pressure inlet line to unit G. At 43, a polished, low pressure side, solvent or low pressure side outlet flow is depicted. At 121, high pressure side concentrate outlet line 121 is depicted. The process conducted in the example unit G, then, does not involve an inlet feed to the low pressure side 120y. For the particular example process of FIG. 3, the concentrate line 121, from unit G, is included within the inlet solution at line 109 for the high pressure side 110x of reverse osmosis unit E.

The operation conducted (in the example depicted) in reverse osmosis unit E is a reverse osmosis operation across the membrane 110 between high pressure side inlet feed solution of a mixture of: concentrate from unit G; and, low pressure side outlet flow from unit D; and, a low pressure side inlet at 113 comprising low pressure side outlet flow from unit D.

In a typical operation, the reverse osmosis unit E is conducted with a solute concentration difference, between the high pressure side and the low pressure side, of no greater than about 20%; typically no greater than 15%, and preferably 10% or less, with a solute concentration being greater on the high pressure side.

For the particular process depicted in FIG. 3, a final concentrating step is also conducted on a portion of the concentrate from reverse osmosis unit C. The concentrate from unit C is depicted leaving unit C via line 77. This concentrate is shown split at joint 130 into a first pressurized inlet line 130x for reverse osmosis unit F; and, a second line 130y, shown directing a portion of the concentrate from line 77 to pressure reducer 131, and ultimately to inlet line 133, a low pressure side inlet line, for reverse osmosis unit F.

Reverse osmosis unit F includes the reverse osmosis membrane or membrane arrangement 140 having a high pressure side 140x and a low pressure side 140y. Concentrate is shown leaving the high pressure side reverse osmosis unit F, via high pressure side outlet line 150. This concentrate is reduced in pressure at reduction unit 151, and comprises the concentrate out of process 40 via line 42.

At 155, a low pressure side outlet line from reverse osmosis unit F is depicted. Within line 155 would be low pressure side flow (dilute solution), from reverse osmosis unit F. This flow (dilute solution) is shown pressurized at pump 156 and then directed into pressurized line 157 to joint 158. At joint 158 low pressure side outlet flow from reverse osmosis unit F is split to a first line 158x, which directs a portion of the flow into the high pressure side inlet line 69 for reverse osmosis unit C. Second line 158y, from joint 158, directs a portion of the flow from line 157 to pressure reducer 159 and ultimately into low pressure side inlet line 160 for reverse osmosis membrane unit C. Thus, the reverse osmosis operation conducted in unit C is between a high pressure side liquid comprising: a mixture of low pressure side outlet flow from unit F and concentrate from unit B; and, low pressure side liquid comprising low pressure side outlet flow from unit F.

In a typical arrangement, the first osmosis unit C is operated with a concentration difference, in solute, between the high pressure side inlet feed and the low pressure side inlet feed, of no greater than 20%, usually no greater than 15%; and typically and preferably no greater than 10%. The (relatively) higher solute concentration typically is provided on the high pressure side.

To summarize the process conducted in the system depicted in FIG. 3, an original liquid/solute feed solution to be processed enters the system 41, and is conveyed and pressurized in reverse osmosis pump 49 to conduit 50.

In general terms, it can be seen that system 40 includes:

(a) concentrate flow from the first, final, dilute solution-generating unit G into an intermediate reverse osmosis membrane unit system (the example comprising units A-E);

(b) concentrate flow from the intermediate reverse osmosis membrane unit system (the example, comprising units A-E) into the first, final, concentrate-generating reverse osmosis membrane unit F;

(c) low pressure side outlet flow (reduced-solute solvent or dilute solution) from the first, final, concentrate-generating reverse osmosis membrane unit F into the intermediate reverse osmosis membrane unit system (the example units E, D, A, B and C); and, (d) low pressure side outlet flow (reduced-solute solvent or dilute solution) from the intermediate reverse osmosis membrane unit system (in the system 40 comprising units A-E) to the final dilute solution (or solution)-generating reverse osmosis unit G.

More specifically, the system 40 according to FIG. 3, includes: first, final, solvent (or dilute solution)-generating reverse osmosis unit G; first, final, concentrate-generating reverse osmosis unit F; and, an intermediate reverse osmosis unit system comprising one or more reverse osmosis units, typically at least two, sometimes at least three; and, in this example specifically, five units. In the system of FIG. 40, the five units (A-E) of the intermediate reverse osmosis unit system are arranged is series flow order with respect to: concentrate flow from the final solvent or dilute solution-generating reverse osmosis unit G ultimately to the final concentrate-generating reverse osmosis unit F (the series being E-D-A-B-C); and, low pressure side outlet flow, (reduced-solute solvent or dilute solution flow) from the final concentrate-generating reverse osmosis unit F ultimately to the final solvent or dilute solution-generating reverse osmosis unit G (the series being C-B-A-D-E).

For the particular example system 40 depicted, the intermediate reverse osmosis membrane unit system, (for the example shown comprising units A-E) can be further characterized as including: a most permeate flow-direction reverse osmosis unit, unit E; a most concentrate flow-direction reverse osmosis unit, unit C; and, at least one central unit, the example including depicted three central units (A, B and D).

For the example system depicted, the original inlet solution is directed into a central unit (one of the units A, B and D) of the intermediate reverse osmosis unit system (units A-E). For the specific example, this inlet direction is into central unit A.

The cascading effect, then, is readily viewable. Cascading solvent purification (solute reduction) occurs in flow from the first, final, concentrate-generating reverse osmosis unit (F) to the first, final, dilute solution (or solvent)-generating reverse osmosis unit G. Solute concentration (concentrate) occurs in flow from the first, final, dilute solution or solvent-generating reverse osmosis unit G to the first, final, concentrate-generating reverse osmosis unit F. The inlet feed (line 41) is directed into system 40 at a selected location where it can join this cascading process, desirably. Alternative locations of original solution introduction are possible.

It is noted that herein, in some instances unit B will be referred to as the next most permeate flow-direction reverse osmosis unit, to reverse osmosis unit C; reverse osmosis A will be referred to as the second next permeate flow-direction reverse osmosis unit, to reverse osmosis unit C; and, reverse osmosis unit D will be referred to as a third next permeate flow-direction reverse osmosis unit, to reverse osmosis unit C. Analogously, reverse osmosis unit D may be referred to as the first next concentrate flow-direction reverse osmosis unit, to reverse osmosis unit E; reverse osmosis unit A may be referred to as the second next concentrate flow-direction reverse osmosis unit, to reverse osmosis unit E; and, reverse osmosis unit B may be referred to as a third next concentrate flow-direction reverse osmosis unit, to reverse osmosis unit E. (Herein, these terms are meant to refer to schematic flow directions, not physical location).

In some instances, herein flow may be referred to as "ultimate" or by variants thereof. For example concentrate flow from unit G may be characterized as ultimately directed to unit F. By this (and without more) it is meant that the concentrate from unit G is either directed directly into unit F, or ultimately therethrough by passage through other units. When the term "directly" is used herein, with respect to characterizing flow, it is meant that flow from one unit is directed to another unit, without passage through an intermediate unit.

In system 40, FIG. 3, a variety of pumps, pressure reducers, and joint locations are shown. It should be understood that alternatives from these specifics can be used, in accord with applications of the techniques described in FIG. 3.

It is noted that in FIG. 3, a number of phantom arrowheads are designated by the reference "r". These indicate that under some processing conditions, the flow in the identified line may be in the direction indicated by the arrowhead "r". This will depend, of course, upon the overall operating conditions for the system.

C. Another Example System, FIG. 4

Figure 4:
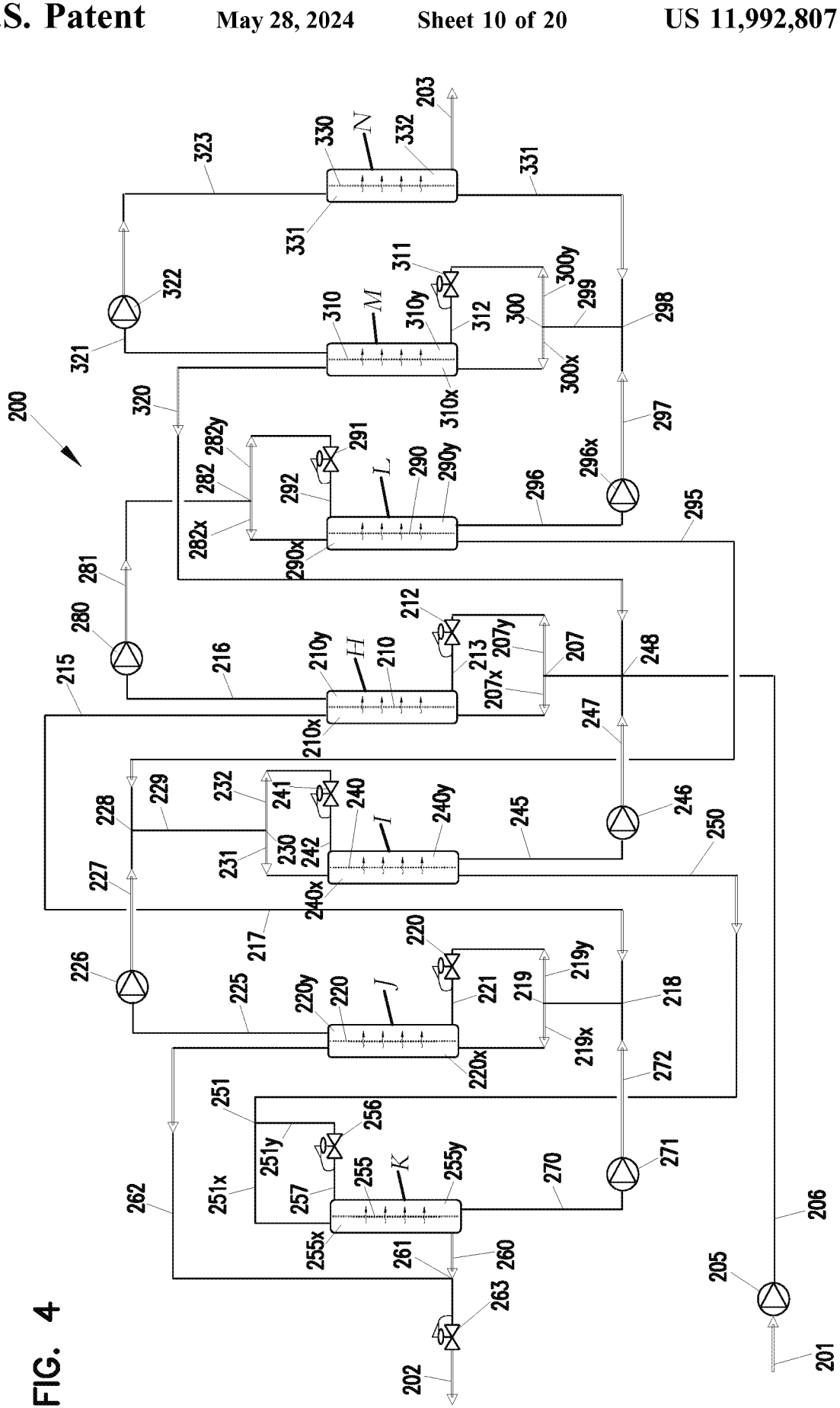
FIG. 4 is a schematic depiction of an eighth example system for reverse osmosis process conduction according to the present disclosure.

Attention is now directed to FIG. 4, in which another example system is depicted, at 200. Referring to FIG. 4, original solution is shown entering the system at 201, with a concentrate line out at 202 and a (dilute solution) solvent outlet line out 203. The system of FIG. 4, is operated with seven reverse osmosis units indicated at H, I, J, K, L, M, and N, respectively. Reverse osmosis system 200 is operated, in some ways, analogously to system 40, FIG. 3. However, modifications in line direction and splitting are made for convenient and efficient operation, in certain applications.

Referring to FIG. 4, the original solution feed mixture at line 201 is directed to pump arrangement 205, and into pressurized inlet line 206. Line 206 is directed to joint 207 where the inlet feed is split into line 207x and 207y. Inlet line 207x is directed into osmosis unit H, under pressure. In particular, reverse osmosis unit H comprises a reverse osmosis membrane arrangement or membrane 210 having a high pressure side 210x and a low pressure side 210y. High pressure side inlet 207x is directed to the high pressure side 210x. Line 207y is directed through pressure reducer 212, and then to inlet line 213 for low pressure side 210y. A reverse osmosis operation conducted in unit H, provides for a high pressure side concentrate outlet flow at line 215 and low pressure side dilute solvent outlet flow at line at 216. The concentrate outlet flow at line 215, is the high pressure side outlet flow from unit H. It is directed via line 217 through joint 218 to joint 219. At joint 219, it is split into lines 219x and 219y. Line 219x is a high pressure side inlet line for unit J. Line 219y is directed through pressure reducer 220 to provide low pressure side inlet line 221 for reverse osmosis unit J.

Reverse osmosis unit J comprises a reverse osmosis membrane arrangement or membrane arrangement 220 having a high pressure side 220x and a low pressure side 220y.

From the low pressure side 220y, dilute solution outlet line 225 is depicted, directed through reverse osmosis pump 226 to provide a high pressure line 227 of low pressure side outlet flow (dilute solution) from reverse osmosis unit J. The flow of line 227 is directed to joint 228 and then into line 229 to joint 230, where it is split into two lines, 231 and 232, while being directed to reverse osmosis unit I.

Reverse osmosis unit I includes reverse osmosis membrane or membrane arrangement 240 having a high pressure side 240x and a low pressure side 240y. Line 231 is directed as an inlet, to high pressure side 240x. Line 232 is directed through pressure reducer 241, to provide an inlet line 242 to low pressure side 240y of reverse osmosis unit I.

At 245, a low pressure side outlet solution is shown leaving low pressure side 240y of reverse osmosis unit I. The flow 245 is directed through reverse osmosis pump 246, providing a high pressure stream 247 of low pressure side outlet from reverse osmosis unit I. This outlet or solution is directed to joint 248, a joint with line 206, where the solution of line 247 is combined with at least the original solution in line 206, to then be directed to joint 207, to split into lines 207x, 207y as previously described.

Thus, from the above, it can be seen that reverse osmosis unit H is conducted with a liquid line to each of the high pressure and low pressure sides, each of which at least includes: original feed solution from line 206, and, low pressure side outlet flow from another reverse osmosis unit in the system 200, in this instance reverse osmosis unit I. As will be seen from the discussion below, an additional modifying input is provided to joint 207.

Still referring to FIG. 4, in the system 200, at 250, a high pressure side (concentrate) outlet line from reverse osmosis unit I is shown. Line 250 directs the concentrate from reverse osmosis unit I to joint 251, where it is split into lines 251x and 251y. Line 251x is directed as a high pressure side inlet stream, to reverse osmosis unit K. Reverse osmosis unit K comprises a reverse osmosis membrane or membrane arrangement 255 having a high pressure side 255x and low pressure side 255y.

Line 251y, from joint 251, directs a portion of concentrate line 250, through pressure reducer 256 to line 257, which operates as a low pressure side inlet liquid flow to reverse osmosis unit K.

Reverse osmosis unit K, then, acts as a final concentrate-generating reverse osmosis unit, for concentrate in system 200. Liquid on opposite sides of the membrane 255 is the same, in each case concentrate from a previous reverse osmosis unit, in this example instance, reverse osmosis unit I. At line 260 a high pressure side concentrate is shown removed from a reverse osmosis unit K. At 261 it is joined with line 262, a high pressure side concentrate line from as another final concentrate-generating reverse osmosis unit J. The combined concentrate is directed through pressure reducer 263, to provide concentrate out in line 202 from process 200.

Line 270 is a low pressure side outlet line from reverse osmosis unit K. It is directed through reverse osmosis pump 271 into line 272. At joint 218 line 272 is joined with a concentrate line 215, and is directed to joint 219, where the combined lines are split to be directed into reverse osmosis unit J. Thus, the reverse osmosis process conducted in unit J is conducted with the same liquid (in solute concentration) on opposite sides of the membrane 220, that liquid comprising a combination of concentrate from reverse osmosis unit H and low pressure side dilute outlet flow from reverse osmosis unit K.

Still referring to FIG. 4, in system 200, at pump 280, low pressure side outlet line 216 from reverse osmosis unit H is pressurized, and is directed through line 281 to joint 282. At joint 282, the liquid is split into lines 282x, 282y. Line 282x provides a high pressure inlet to reverse osmosis unit L.

Reverse osmosis unit L, generally, includes a reverse osmosis membrane arrangement or membrane 290 with a high pressure side 290x and low pressure side 290y. Line 282x provides direction of low pressure side outlet flow (dilute solution) from reverse osmosis unit H into high pressure side 290x of reverse osmosis unit L. Line 282y is directed into pressure reducer 291, to provide line 292 as an inlet line to the low pressure side 290y of reverse osmosis unit L. Thus, it can be seen that the reverse osmosis process conducted in reverse osmosis unit L is conducted with the input on opposite sides of the membrane 290 being the same, i.e. each side being provided with low pressure side outlet from reverse osmosis unit H.

At 295, a concentrate outlet from the high pressure side 290x of reverse osmosis unit L is shown. Line 295 directs the concentrate from reverse osmosis unit L to joint 228, where it is combined with a dilute solution in line 227, and is directed to joint 230. Thus, the reverse osmosis process conducted in reverse osmosis unit I is conducted with the same liquid feed concentration to opposite sides of the membrane 240, that liquid comprising a combination of low pressure side outlet (dilute solution) from one reverse osmosis unit membrane, in this instance reverse osmosis unit J; and, concentrate from another reverse osmosis unit, in this instance reverse osmosis unit L.

With respect to reverse osmosis unit L, attention is now directed to line 296, a low pressure side outlet line form reverse osmosis unit L. The solution in line 296 is pressurized at reverse osmosis pump 296x and is provided in line 297 as a high pressure solution from a low pressure side of reverse osmosis unit L. Line 297 is directed to joint 298, where the solution in line 297 is combined with another liquid, discussed below, and is directed through line 299 to joint 300, where the liquid is split into lines 300x, 300y. Line 300x comprises a high pressure side inlet line to reverse osmosis unit M.

Reverse osmosis unit M comprises a reverse osmosis membrane or membrane arrangement 310 with the high pressure side 310x and a low pressure side 310y. Line 300y is directed through pressure reducer 311 into 312, line 312 being a liquid inlet line to the low pressure side 310y of reverse osmosis unit M.

Line 320 is a high pressure side outlet line for reverse osmosis unit M, and carries concentrate from a reverse osmosis operation conducted within reverse osmosis unit M. Via line 320, this concentrate is directed to joint 248 and is combined with pressurized outlet from a low pressure side reverse osmosis unit I and original solution in line 206, to be directed to reverse osmosis unit H. Thus, the reverse osmosis process conducted within reverse osmosis unit H is not only conducted with the same liquid on opposite sides of the membrane 210, but that liquid comprises a combination of: the original feed line 206, pressurized low pressure side (dilute) outlet from reverse osmosis unit I; and, pressurized concentrate from reverse osmosis unit M.

At line 321, low pressure side outlet (dilute solution) from reverse osmosis unit M is provided. The solution is pressurized by reverse osmosis unit pump 322 and directed via line 323 into a final polishing reverse osmosis unit N. The reverse osmosis unit N comprises a reverse osmosis membrane or membrane arrangement 330 having a high pressure side 331 and a low pressure side 332. Line 323 provides a high pressure side inlet flow to reverse osmosis unit N. At 331, a high pressure side outlet, or concentrate outlet, for reverse unit N is shown. Via line 331, this concentrate is directed to joint 298, where it is combined with pressurized solution in line 297 from a low pressure side of reverse osmosis unit H, and is directed to joint 300. Then, the combined liquid is split and directed into reverse osmosis unit M. Thus, the reverse osmosis operation conducted in reverse osmosis unit M is conducted with the same liquid concentration on opposite sides of the membrane 310. The liquid directed into opposite sides of membrane 310, then, of unit M, comprises a combination of: high pressure side outlet concentrate solution from unit N and low pressure side outlet dilute solution from unit L.

Low pressure side outlet (permeate) from reverse osmosis unit N comprises purified solvent (dilute solution) directed out from system 200 via line 203.

Directing attention again to reverse osmosis unit N, the solvent polishing unit from system 200, it is noted that reverse osmosis operation conducted in reverse osmosis unit N is conducted with no inlet feed line to the low pressure side 322, and comprises a final polishing operation conducted in general accord with reverse osmosis process described above, in connection with FIG. 1. However, because the concentrate inlet at line 323 comprises relatively pure solvent, the polishing is readily conducted without the need for a relatively high pressure operation.

In general, the reverse osmosis processes conducted in system 200 are conducted with the same solution (in concentration solute) directed to both the high pressure and low pressure side of each reverse osmosis membrane unit, except for the final permeate polishing unit N.

It is noted that the process conducted in the system of FIG. 4 can be operated with a variety of alternate locations for pumps, pressure reducers and joints.

In the general terms characterized herein above, system 200 includes: a first, final, solvent-generating reverse osmosis unit N; a first, final, concentrate-generating reverse osmosis unit J; a second final concentrate-generating reverse osmosis unit K; and, an intermediate reverse osmosis membrane unit system comprising a plurality of units, in the example shown units M, L, H and I. In the example system 200 depicted, the intermediate reverse osmosis unit membrane system (in the example comprising units M, L, H and I) can be characterized as including: a most permeate flow-direction reverse osmosis unit M, a first subsystem comprising reverse osmosis unit H; and, a second subsystem comprising two reverse osmosis units, in this instance a second reverse osmosis unit L and a third reverse osmosis unit I.

In general, operation of reverse osmosis system 200 is as follows:

(a) concentrate from first, final, solvent (or dilute solution)-generating reverse osmosis unit N is directed into the most permeate flow-direction reverse osmosis unit M of the intermediate reverse osmosis membrane unit system (units M, L, H and I, collectively).

(b) Concentrate outlet flow from the most permeate flow-direction reverse osmosis unit (M) in the intermediate reverse osmosis membrane unit system (units M, L, H and I) is directed into the first reverse osmosis unit H of the first subsystem.

(c) Concentrate outlet flow from the first reverse osmosis unit H of the first subsystem, is directed into the first, final, concentrate-generating reverse osmosis unit J.

(d) Low pressure side outlet flow (dilute solution) from the most permeate flow-direction reverse osmosis unit M of the intermediate system is directed to the first, final, solvent (or dilute solution)-generating reverse osmosis unit N.

(e) Low pressure side outlet flow (dilute solution) from the first unit H of the first subsystem, is directed into the second unit L of the second subsystem units L and I.

(f) Low pressure side outlet flow (dilute solution) from the second unit L of the second subsystem L, I is directed to the most permeate flow-direction unit M of the intermediate reverse osmosis membrane unit system (units M, L, K, H and I, collectively).

(g) Concentrate from the second unit L in the second subsystem, is directed into the third unit I of the second subsystem.

(h) Low pressure side outlet flow (dilute solution) from the third unit I of the second subsystem (units I and L) is directed into the first unit H of the first subsystem, unit H; and, concentrate from the third unit I of the second subsystem (units I and L) is directed into the second, final, concentrate-generating reverse osmosis unit K.

(i) Further, for the example depicted, low pressure side outlet flow, from the second, final concentrate-generating reverse osmosis unit K is directed into the first, final, concentrate-generating reverse osmosis unit J.

Flows to opposite sides of the various units (where relevant) are generally as depicted in FIG. 4 and characterized above.

D. A Further Example System, FIG. 5.

Figure 5:
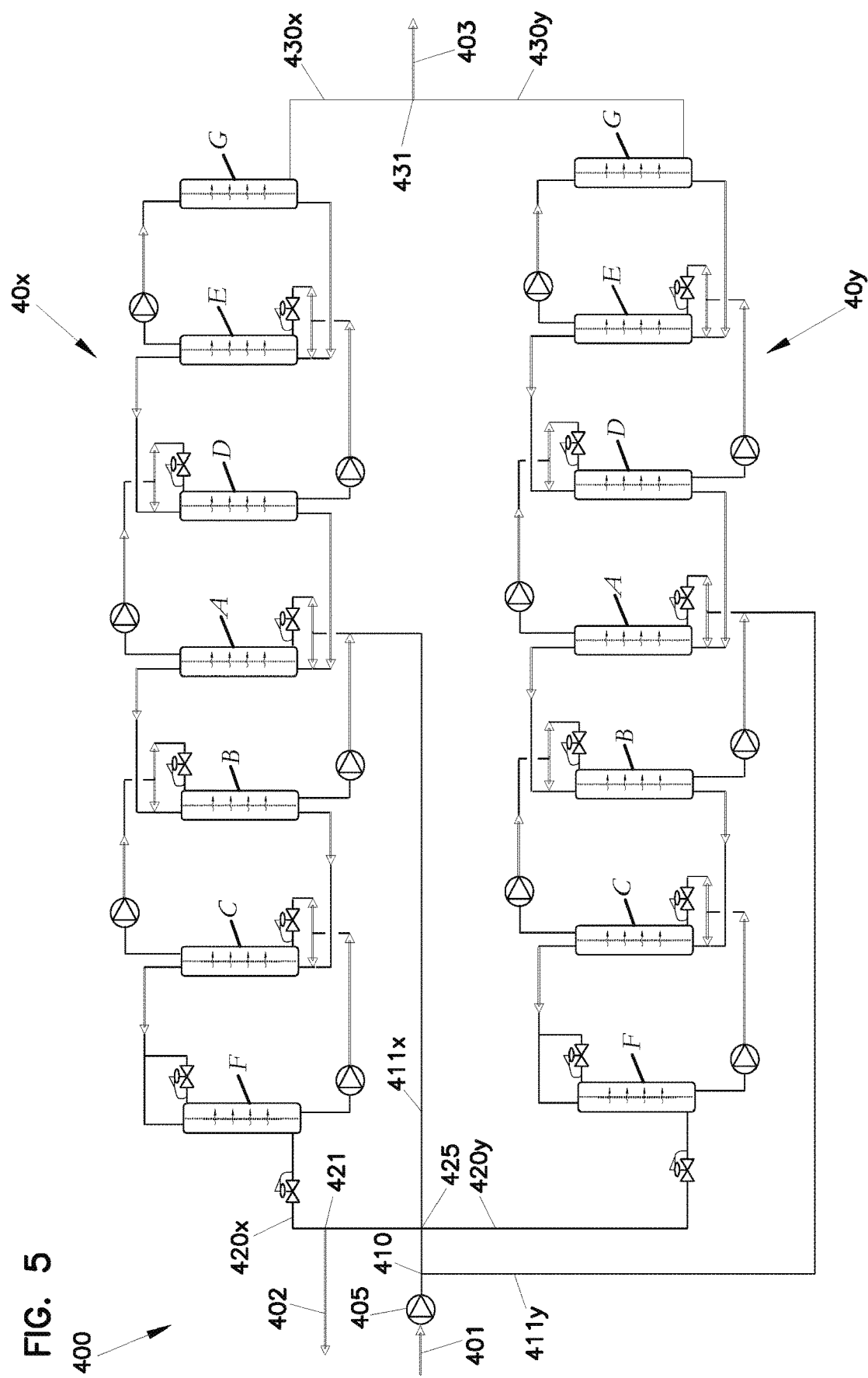
FIG. 5 is schematic depiction of a process for conducting reverse osmosis processing using two systems in parallel, each in general accord with FIG. 3.

The systems described herein can be implemented in an overall equipment system configured for parallel operation. An example is depicted in FIG. 5. Referring to FIG. 5, a reverse osmosis system 400 is depicted. A system 400 has an original solution feed line 401, a concentrate outlet line 402 and a solvent outlet line 403. In general, the system 400 comprises two systems analogous to system 40, configured in parallel; in particular, systems 40$x$ and 40$y$. Each of units 40$x$ and 40$y$ can generally be the same as unit 40, FIG. 3, previously described, each having seven (7) reverse osmosis units A-G, conducted in an operation similar to the description for unit 40, FIG. 3. In particular, inlet line 401 is pressurized at pump 405 and then is directed to joint 410, where it is split into a first feed line 411$x$, to system 40$x$, and a second feed line 411$y$, to system 40$y$. The concentrate outlet from unit 40$x$ is shown as 420$x$ combined to joint 421 with concentrate outlet in line 420$y$, from system 40$y$, for overall concentrate out at line 402.

Solvent out from unit 40$x$ at line 430$x$ is combined with solvent out from unit 40$y$ at line 430$y$, the combination occurring at joint 431, providing combined solvent out at line 403 from system 400.

Thus, system 400 generally comprises two systems corresponding to system 40, FIG. 3, operated in parallel, the inlet line 401 being split for directing inlet to each system (40$x$, 40$y$) and the solvent and concentrate outlet from each system being combined, to provide an overall concentrate outlet 402 and solvent outlet 403. It is noted that such an operation in parallel can be conducted with any of the systems described herein. Further, the principles can be applied with more than two operated systems in parallel.

Again, one of the other more common problems associated with processing higher and higher solution concentrations via a reverse osmosis system is the phenomenon of solution concentration gradients near the membrane. This occurs as solvent is forced out of the solution directly adjacent to the membrane, while portions of the solution stream farther away from the membrane do not experience as high of a concentration. This localized area of high concentration tends to build over time. As this thin layer of high concentration forms near the membrane wall it has the net effect of increasing the osmotic pressure across the membrane due to the increased solution concentration being directly exposed to the membrane. This increasing of osmotic pressure pushes back on the driving reverse osmosis pressure being applied to achieve a separation thereby reducing flux through the membrane for a given pressure. This increase in-turn reduces the overall membrane effectiveness and/or increases pumping energy consumption to achieve the desired separation.

This localized area of high concentration near the membrane wall is also prone to reaching solution concentrations high enough to cause precipitates to form as the upper solubility limit of the solute is reached for a given solution. These precipitates can quickly clog the minute pores of the RO membrane reducing its effectiveness. To address this problem and to remove other process solution contaminates, large scale RO units require periodic cleaning as a means removing much of the materials clogging the micro pores in the membrane. This is often done by flushing the membrane with high velocity purges and/or chemical based cleaning techniques.

Several studies have been conducted which indicate that effective "cleaning" or regenerating of RO membranes can be achieved by periodically operating them in a reverse flow pattern to their normal operation. For example if a reverse osmosis membrane were to be operated as a forward osmosis membrane thereby momentarily reversing the direction of permeate flux through the membrane, this change of flow can effectively backwash the membrane of accumulated micro-pore clogging contaminates. It is envisioned that this periodic forward osmosis technique can be utilized in the present invention as a means of cleaning and/or regenerating or rejuvenating the membranes to regain much of their efficiency as it degrades over time. This regeneration process can be combined with a high velocity flushing process in the present invention to effectively sweep solid contaminates away from the membrane to prevent rapid re-contamination of the membrane after a backwashing. This backwashing can be done when the system is temporarily off-line, or as an alternative, a separate parallel embodiment of the system can be utilized that would enable one unit to be online while the other unit is offline during a periodic backwashing process. Any number of parallel embodiments of the system can be utilized in this way such that one or more membranes can be going through a cleaning cycle while other parallel membrane units remain online and in operation.

It is noted that in FIG. 5 a number of phantom arrowheads are indicated by the designation "r". These are intended to indicate that the flows in the identified lines can be in a reverse direction, i.e., in the direction indicated by the arrowhead "r" under certain operating conditions. This will be a matter dependent upon the particular choice of operation selected by an operator for the system.

E. Another Example System, FIG. 6.

Figure 6:
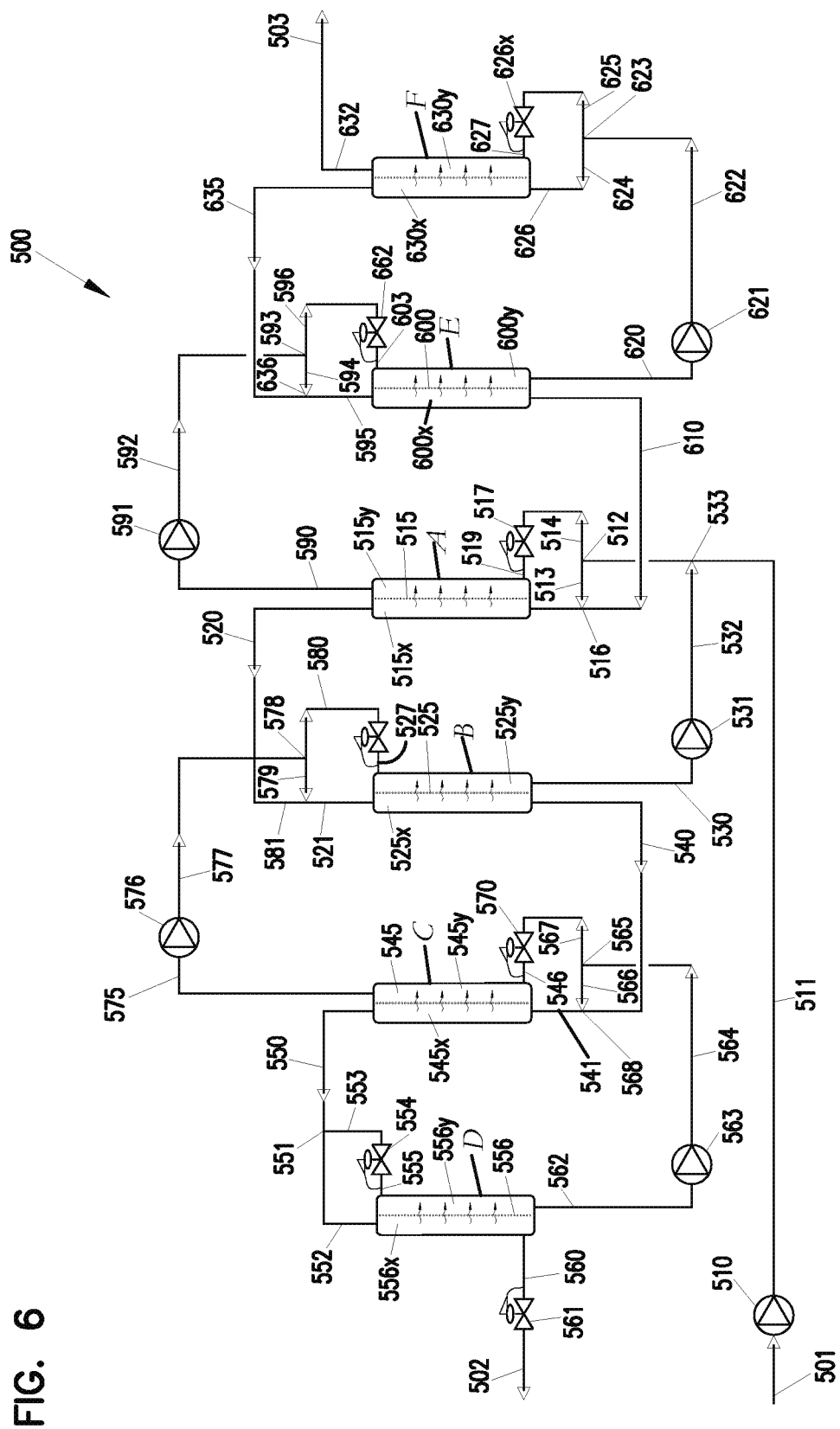
FIG. 6 is a further example system for conducting a reverse osmosis process in accord with the present disclosure.

Attention is now directed to FIG. 6, in which another example system is depicted, at 500. Referring to FIG. 6, an original solution is directed into the system 500 via line 501. A process concentrate out line from system 500 is shown at 502; and, a processed dilute solution out line from system 500 is shown at 503.

A system in accord with FIG. 6 generally includes at least two (2) and typically at least three (3) reverse osmosis units, usually at least four (4). The particular example system 500 depicted includes six reverse osmosis units A-F, respectively.

Referring to FIG. 6, an original solution feed in line 501 is directed through pump 510 into line 511. Line 511 is directed to joint 512, where it is split into lines 513, 514, for direction in reverse osmosis unit A. Reverse osmosis unit A comprises a reverse osmosis membrane arrangement or membrane 515 having a high pressure side 515x and a low pressure side 515y. Line 513 is directed to inlet line 516, to high pressure side 515x; and, inlet line 514 is directed through pressure reducer 517 into low pressure inlet line 519, for low pressure side 515y. It is noted that inlet feed line 511 is modified before reaching joint 512, by including therein a low pressure side outlet line from unit B, as described below. Further, at inlet line 516, liquid inlet line 513 is modified by inclusion of a concentrate line from unit E, before introduction to reverse osmosis unit A. Thus, different specific liquids, in total, are directed into the high pressure side 515x and low pressure side 515y to reverse osmosis unit A. The solute concentration difference between the inlet feeds 516, 519, if any, will typically not be more than 20%, usually not more than 15% typically 10% or less.

An outlet line 520 from the high pressure side 515x of reverse osmosis unit A is a concentrate outlet line. It is directed into inlet line 521 for reverse osmosis unit B. It is noted that before entering reverse unit B, liquid in inlet line 520 is modified, at inlet line 521, by receiving a portion of a low pressure side outlet flow from unit C, as discussed below.

Reverse osmosis unit B includes a reverse osmosis membrane arrangement or membrane 525 and has a high pressure side 525x and low pressure side 525y. Within reverse osmosis unit B, a reverse osmosis operation is conducted including, a feed introduced into the high pressure side 525x, which comprises in part concentrate from reverse osmosis unit A, in this instance mixed with low pressure side outlet from reverse osmosis unit C. Further the inlet feed in line 527, to low pressure side 525y of reverse osmosis unit B, comprises low pressure outlet flow from reverse osmosis unit C, as discussed below.

At line 530, a low pressure outlet (dilute solution) flow for reverse osmosis unit B is provided. The low pressure outlet flow for reverse osmosis unit B is directed through pump 531 into line 532. The low pressure side outlet flow from reverse osmosis unit B, is mixed with the original solution, pressurized in line 511, at joint 533. This mixed solution is then directed to joint 512, to be split and directed, in due course, into unit A.

Line 540 is a high pressure side concentrate, outlet from reverse osmosis unit B. Line 540 is directed to inlet line 541 for reverse osmosis unit C.

Reverse osmosis unit C comprises a reverse osmosis membrane arrangement or membrane 545 having a high pressure side 545x and a low pressure side 545y. The reverse osmosis unit operation conducted in unit C, is between a high inlet pressure side feed inlet 541 that comprises concentrate from unit B, via line 540 and low pressure side outlet flow from reverse osmosis unit D, as discussed below. The low pressure side inlet for reverse osmosis unit C, provided at line 546, generally comprises low pressure side outlet flow from reverse osmosis unit D, again as discussed below.

Line 550 is a high pressure side concentrate outlet line from reverse osmosis outlet unit C. The liquid in line 550 is split at joint 551 with a first line 552 providing a high pressure side inlet line to reverse osmosis unit D; and, a second line 553 being directed through pressure reducer 554 to provide an inlet line 555 to a low pressure side of reverse osmosis unit D.

In general, reverse osmosis unit D comprises a reverse osmosis membrane arrangement or membrane 556 having a high pressure side 556x and a low pressure side 556y. For the particular system 500 depicted, reverse osmosis unit D is a final polishing unit for concentrate. Line 560 is a high pressure side concentrate outlet from unit D directed through pressure reducer 561, to provide concentrate outlet in line 502. Line 562, is a low pressure side outlet flow (dilute solution) from reverse osmosis unit D. Line 562 is directed through pump 563 into line 564. Line 564 is directed to joint 565 where it is split into lines 566, 567. Line 566 is directed to joint 568, where it is combined with concentrate inlet line 540, to provide an inlet feed at line 541 for reverse osmosis unit C. Line 567 is directed through pressure reducer 570, to line 546, and provides a low pressure side inlet to reverse osmosis unit C. Thus, the reverse osmosis operation conducted in unit C is between a high pressure side inlet liquid at line 541 comprising a combination of concentrate from unit B and low pressure side outlet from unit D, whereas the low pressure side of unit C is provided with inlet comprising low pressure side outlet from unit D.

At line 575, a low pressure side outlet (dilute solution) from unit C is provided. This solution is directed through pump 576, into line 577. Line 577 is directed to joint 578 where it is split into lines 579, 580. Line 579 is directed to joint 581, where the liquid is combined with liquid in line 520, to provide high pressure side inlet feed 521 to reverse osmosis unit B. Thus, the high pressure side inlet feed 521 to reverse osmosis unit B comprises a combination of: concentrate in line 520 from reverse osmosis unit A; and, low pressure side outlet flow in line 579, from reverse osmosis unit C. The inlet line at 527, for reverse osmosis unit B low pressure side 525y, comprises low pressure side outlet (dilute solution) from reverse osmosis unit C, from line 580 after passage through pressure reducer 526.

Still referring to system 500, FIG. 6, at line 590, a low pressure side outlet flow (dilute solution) is shown leaving reverse osmosis unit A. This low pressure side flow from line 590 is directed through pump 591 into line 592. It is then directed to joint 593 where it is split into a first line 594 and a second line 596. The first line 594 is directed into the high pressure side inlet feed line 595 for reverse osmosis unit E. The reverse osmosis unit E comprises a reverse osmosis member arrangement or membrane 600 having a high pressure side 600x and a low pressure side 600y. Still referring to system 500, and reverse osmosis unit E, line 596 is directed through pressure reducer 602, and into inlet line 603 for the low pressure side of reverse osmosis unit E.

At 610, a concentrate outlet from reverse osmosis unit E is provided. The concentrate outlet 610 is directed to line 516, where it is combined with liquid in line 513. Thus, the reverse osmosis unit operation conducted in reverse osmosis unit A is conducted with a high pressure inlet feed comprising a combination of: original solution from line 511; low pressure side dilute solution outlet flow from reverse osmosis unit B; and, concentrate from reverse osmosis unit E. The low pressure side feed to reverse osmosis unit A, however, is conducted with a combination of original solution in 511 and low pressure side dilute solution outlet flow from reverse osmosis unit B.

Still referring to system 500, attention is directed to outlet line 620 from reverse osmosis unit E. Outlet line 620 comprises a low pressure side outlet flow (dilute solution) from reverse osmosis unit E. It is directed through pump 621 into line 622. Line 622 is directed to joint 623 where it is split into lines 624 and 625. Line 624 is directed into high pressure side inlet line 626 for a high pressure side 630x of reverse osmosis unit F. Line 625 is directed through pressure reducer 628 into low pressure inlet line 627 for a low pressure side 630y of reverse osmosis unit F.

Reverse osmosis unit F, then, generally comprises a reverse osmosis membrane arrangement or membrane 630 having a high pressure side 630x and a low pressure side 630y.

Reverse osmosis unit F is operated as a final polishing membrane for dilute solution. The operation conducted in reverse osmosis unit F is conducted with a same inlet solution (in solute concentration) directed to each side of the membrane 630, the inlet solution comprising low pressure side outlet flow (dilute solution) from reverse osmosis unit E. At line 632 a low pressure side outlet flow for reverse osmosis unit F is depicted, comprising a dilute solution removed from system 500 via 503.

At line 635 a high pressure side concentrate line from reverse osmosis unit F is shown. This concentrate is directed to joint 636, where it is combined with a portion of low pressure side outlet flow from reverse osmosis unit A and is directed into line 595, and into the high pressure side inlet feed to reverse osmosis unit E.

Referring to reverse osmosis unit E, then, the operation conducted therein is conducted with a high pressure side inlet feed comprising a combination of: low pressure side outlet flow from reverse osmosis unit A; and, concentrate from reverse osmosis unit F. The low pressure side inlet for reverse osmosis unit E comprises low pressure side outlet flow from for reverse osmosis unit A.

In the process in accord with system 500, as with other processes described herein, each reverse osmosis membrane unit that is operated with both a high pressure side inlet feed and a low pressure side inlet feed, is typically either conducted with a same feed concentration directed to each side, or with the feed directed to each side which differs in solute concentration by no more than 20%, typically no more than 15% and usually 10% or less.

In the general terms characterized herein above, system 500 includes a first, final, dilute solution-generating reverse osmosis unit F; first, final, concentrate solution-generating reverse osmosis unit D; and, an intermediate reverse osmosis unit system, in the example shown comprising units E, A, B, and C. In general concentrate flow is from: a first, final, dilute solution-generating reverse osmosis unit F through intermediate reverse osmosis membrane system (in the example shown in series through units E, A, B and C) and then through final, concentrate solution-generating, reverse osmosis unit D. Further, for the example shown, low pressure side dilute solution outlet flows generally from first, final, concentrate solution-generating reverse osmosis unit D through the intermediate reverse osmosis unit system (comprising in series units C, B, A and E) to first, final, dilute solution-generating reverse osmosis unit F. The example system is operated with an original solution directed into the intermediate reverse osmosis unit system (comprising units E, A, B and C); in the particular system shown, into unit A.

Further, the intermediate reverse osmosis unit system (units E, A, B, and C) includes a most permeate flow-direction reverse osmosis unit (E) and a most concentrate flow-direction reverse osmosis unit (C). In accord with the general characterizations herein, unit B comprises a next permeate flow-direction reverse osmosis unit from unit C and a second next concentrate flow-direction reverse osmosis unit, from unit E. Further unit A comprises a first next concentrate-direction reverse osmosis unit, from unit E; and, a second, next permeate flow-direction reverse osmosis unit, from unit C. Also, in general, units A and B comprise a central unit system, for the intermediate reverse osmosis membrane unit system. In general, flow feeds to the various units are as characterized herein above.

It is noted that in the system 500 of FIG. 6, various locations of pumps, pressure reducers and joints are shown. Alternatives can be used, in general in accord with the principles herein. Further, it is noted that the system of FIG. 6 can be operated with counter current flow through a member of the units having both inlet feed to the high pressure side and inlet feed to the low pressure side.

It is noted that in FIG. 6 a number of phantom arrowheads are indicated by the reference "r". These are meant to indicate that optionally under some operating conditions, the flow in the indicated line can be in the reverse direction, i.e., in the direction identified in "r". This will be dependent upon operating conditions and parameters selected by the operator of the system.

F. Another Example System, FIG. 7.

Figure 7:
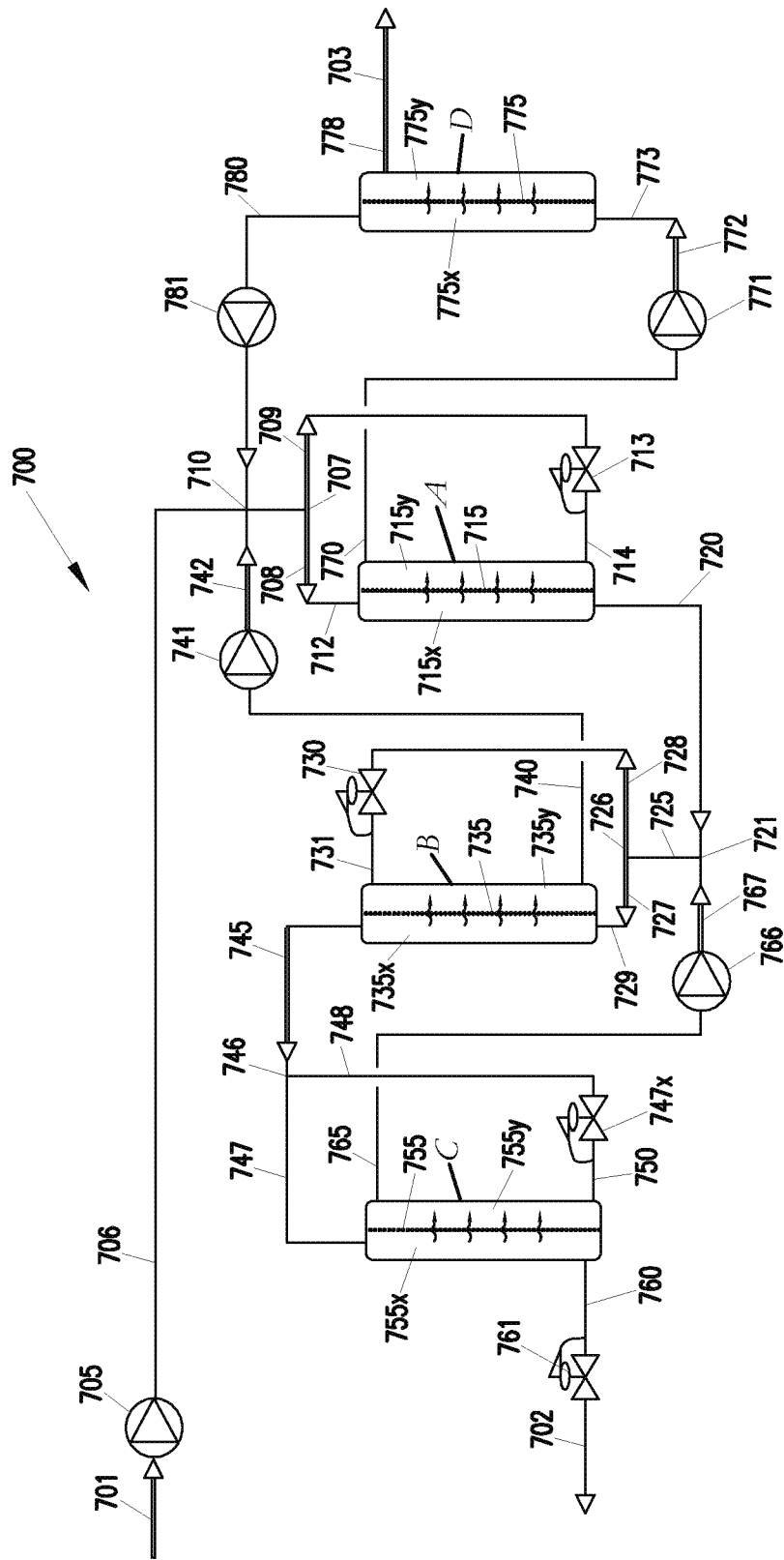
FIG. 7 is a schematic depiction of a still further example system for conducting a reverse osmosis process in accord with the present disclosure.

Attention is now directed to FIG. 7, in which another example system is depicted at 700. The cascading reverse osmosis system 700 is conducted with a plurality of reverse osmosis units, in this instance four reverse osmosis unit A-D. For the system 700, an original solution line into the system is depicted at 701. A concentrate out line from the system 700 is depicted at 702 and a dilute solvent outlet from the system 700 is depicted at 703.

According to FIG. 7, the original solution 701 is directed through reverse osmosis pump 705 into inlet feed line 706. This liquid is directed to joint 707 where it is split into lines 708, 709. It is noted that prior to reaching joint 707, the inlet line 706 is modified at joint 710, as discussed below. Line 708 is directed to the high pressure side inlet feed line 712 for reverse osmosis unit A. Line 709 is directed through pressure reducer 713 into low pressure side inlet feed line 714, for reverse osmosis unit A.

In general, reverse osmosis unit A comprises a reverse osmosis membrane arrangement or membrane 715 having a high pressure side 715x and a low pressure side 715y.

At 720, a high pressure side, concentrate outlet line from reverse osmosis unit A is depicted. This concentrate is directed via line 720 to joint 721, where the concentrate from reverse osmosis unit A is combined with a low pressure side outlet flow (dilute solution) from reverse osmosis unit C, as discussed below. This combination is directed into combined line 725, to joint 726, where it is split into lines 727 and 728. Line 727 is directed to a high pressure side inlet feed line 729, to reverse osmosis unit B. Line 728 is directed through pressure reducer 730 to low pressure side inlet line 731 for reverse osmosis unit B.

In general, reverse osmosis unit B comprises a reverse osmosis membrane arrangement or membrane 735 having a high pressure side 735x and a low pressure side 735y.

From a review of reverse osmosis membrane unit B, in the system 700, FIG. 7, it can be seen that the reverse osmosis operation conducted in reverse osmosis unit B is with the same solution concentration entering the high pressure inlet 729 and the low pressure inlet 731, the mixture comprising a combination of high pressure side outlet concentrate solution from reverse osmosis unit A, and as discussed below, low pressure side outlet dilute solution from reverse osmosis unit C.

Referring still to FIG. 7, at 740 a low pressure side outlet flow (dilute solution) from reverse osmosis unit B is depicted. The solution 740 from a low pressure side of osmosis unit B is directed through pump 741 into line 742. The low pressure side outlet flow from reverse osmosis unit B is then directed via line 742 to joint 710 where it is combined with the original solution feed in line 706 and, as discussed below, with concentrate from reverse osmosis unit D. This combination is then directed to joint 707, to be split and used in each side of the operation conducted in reverse osmosis unit A.

Still referring to system 700, FIG. 7, at 745 a concentrate outlet line for reverse osmosis unit B is shown. This concentrate outlet is directed to joint 746 where it is split into lines 747 and 748. Line 747 is generally a high pressure side inlet feed for reverse osmosis unit C. Line 748 is directed through pressure reducer 747 into line 750, a low pressure side inlet feed to reverse osmosis unit C.

In general, reverse osmosis unit C comprises a reverse osmosis member arrangement or membrane 755 having a high pressure side 755x and a low pressure side 755y. The reverse osmosis operation conducted in reverse osmosis unit C, is with inlet feed to each side of the reverse osmosis membrane comprising concentrate outlet flow from reverse osmosis unit B.

At 760, concentrate outlet from reverse osmosis unit C is depicted. This concentrate outlet is directed through pressure reducer 761, into concentrate outlet line 702 for system 700.

At 765 a low pressure side outlet flow (dilute solution) from reverse osmosis unit C is provided. This low pressure side outlet from the reverse osmosis unit C is directed through pump 766 into line 767 to joint 721. At joint 721 the low pressure side outlet from reverse osmosis unit C is combined with concentrate from reverse osmosis unit A and is directed into joint 726, to be split and used as a feed line to opposite sides of reverse osmosis unit B.

Attention is now directed to line 770, a low pressure side outlet line for reverse osmosis unit A. This outlet flow is directed through pump 771 into pressurized line 772, which directs the low pressure side outlet flow (dilute solution) from reverse osmosis unit A into inlet line 773 for reverse osmosis unit D.

Reverse osmosis unit D is operated as a polishing reverse osmosis unit, with no low pressure side inlet stream. The reverse osmosis unit D comprises a reverse osmosis membrane unit arrangement or membrane 775 having a high pressure side 775x and a low pressure side 775y. Within reverse osmosis unit D, feed stream 773 is the low pressure side outlet for reverse osmosis unit A. Again, there is no low pressure side inlet feed stream for reverse osmosis unit D. At 778 a permeate outlet for reverse osmosis unit D is shown. This low pressure side permeate outlet line 778 directs permeate for reverse osmosis unit D out of system 700, via solvent outlet line 703.

At 780 a concentrate outlet stream is shown for reverse osmosis unit D. It is directed through pump 781 into joint 710, where it is combined with: pressurized low pressure side outlet flow from reverse osmosis unit B; and, pressured inlet feed from line 706, to be directed to joint 707.

In general, system 700, is conducted with a plurality of reverse osmosis units. Each reverse osmosis unit that is operated with both a high pressure inlet side feed and a low pressure inlet side feed, is conducted with the same feed concentration directed to each side of the respective reverse osmosis membrane unit. This is the case, for example, with units A, B and C. Again, polishing unit D is operated with no low pressure side inlet feed for this particular example.

In the general language characterized above, system 700 includes: a first, final, solvent-generating reverse osmosis unit D; a first, final, concentrate-generating reverse osmosis unit C; and, an intermediate reverse osmosis unit system in the example shown comprising units A and B. The intermediate reverse osmosis unit system (units A and B) includes: a most permeate flow-direction reverse osmosis unit A; and, a most concentrate flow-direction reverse osmosis unit B.

System 700 as depicted is conducted with:

(a) Concentrate flow from the first, final, solvent-generating reverse osmosis unit D being directed through the intermediate reverse osmosis unit system (units A and B, in the example shown in series through unit A and then unit B) into the first, final, concentrate-generating reverse osmosis unit C.

(b) Also, low pressure side (dilute solution) outlet flow from the first, final, reverse osmosis unit C is directed through the intermediate reverse osmosis unit system (comprising units A and B, and in the example shown in series through unit B and then unit A) to the first, final, solvent-generating reverse osmosis unit D.

(c) Finally, original solution is directed into the intermediate reverse osmosis unit system (comprising units A and B), in the specific example shown it is directed to unit A.

The various units (A, B, C and E) of unit 700 can be conducted with flows generally as characterized.

In the example system 700, FIG. 7, the only unit not operated with the same feed to a high pressure side and a low pressure side, is unit D, which is not operated with any inlet flow to the low pressure side.

It is noted that in the system 700 of FIG. 7, each reverse osmosis unit (A, B, C) that is operated with both a high pressure side inlet feed and a low pressure side inlet feed, is depicted as conducted with a counter current flow. Alternatives are possible. Also, various pumps, pressure reducers and joints depicted in FIG. 7 can be alternately positioned, if desired.

G. Another Example System, FIG. 8

Figure 8:
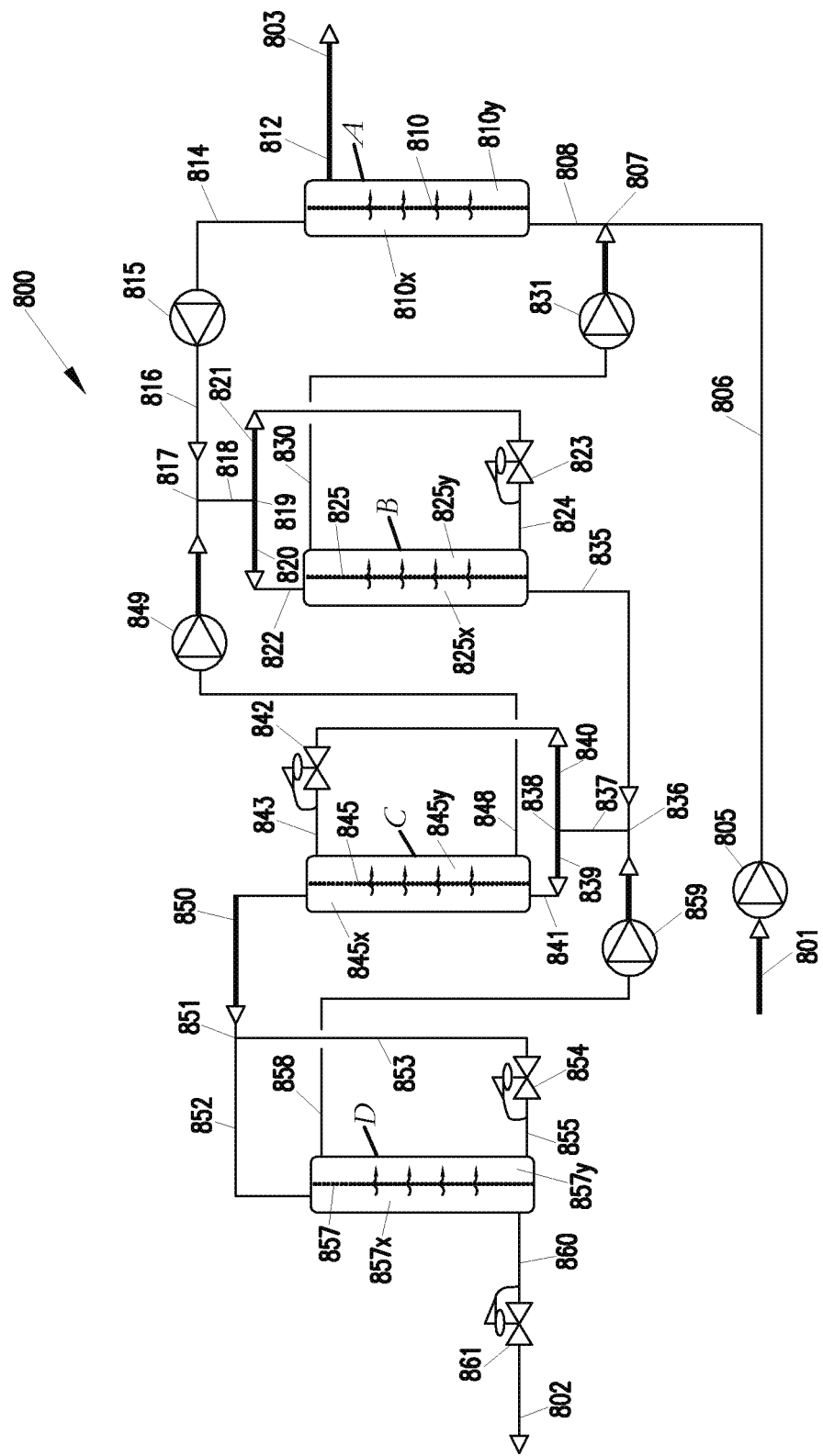
FIG. 8 is a schematic depiction of yet another example system for conducting a reverse osmosis process in accord with the present disclosure; the system of FIG. 8 being analogous to FIG. 7 except with regards to original solution entering the first, final solvent outlet membrane unit.

Attention is now directed to cascading reverse osmosis system 800, FIG. 8. Referring to FIG. 8, cascading reverse osmosis system 800 is depicted for processing an original solution mixture in line 801. The solution will be processed within the system 800 to provide a concentrate outlet as indicated 802 and a solvent outlet as indicated at 803.

The cascading reverse osmosis system 800 depicted in FIG. 8, includes a plurality of reverse osmosis membrane units, in this example reverse osmosis membrane units A-D.

Referring to FIG. 8, original solution in line 801 is directed through pump 805 to provide a solution feed in pressurized inlet line 806. Line 806 is modified at joint 807 by being combined with low pressure side outlet flow from reverse osmosis unit B. This feed is then directed into inlet line 808, the high pressure side inlet feed to side 810x of reverse osmosis unit A.

Reverse osmosis unit A comprises a reverse osmosis membrane arrangement or membrane 810 having a high pressure side 810x and a low pressure side 810y. Line 808 is an inlet feed line for high pressure side 810x. For the particular system depicted, reverse osmosis unit A does not have a low pressure side inlet line.

For the particular system 800 depicted, reverse osmosis unit A is operated with a high pressure side inlet feed, then, comprising, in combination, original solution to be processed; and, low pressure side outlet flow from reverse osmosis unit B.

At 812, a low pressure side outlet (dilute solution) stream from reverse osmosis unit A is depicted. This stream is directed into the solution outlet stream 803.

At 814, a high pressure side concentrate outlet stream from reverse osmosis unit A is depicted. It is directed into pump 815, to provide a pressurized line 816, of pressurized concentrate from reverse osmosis unit A. Line 816 is directed to joint 817, where concentrate from reverse osmosis unit A is combined with low pressure side outlet flow for reverse osmosis unit C, the combination being directed into line 818. Line 818 is directed to joint 819 where liquid carried thereby is split into lines 820, 821. Line 820 is directed to high pressure side inlet line 822 for reverse osmosis membrane unit B. Line 821 is directed through pressure reducer 823 and then into reverse osmosis low pressure side inlet line 824, for unit B.

Reverse osmosis membrane unit B generally comprises a reverse osmosis membrane arrangement or membrane 825 having a high pressure side 825x and a low pressure side 825y. The reverse osmosis process conducted in reverse osmosis unit B, for the cascading reverse osmosis system 800 depicted, is conducted with the same liquid flow (in concentration solute) directed to the inlet of the high pressure side 825x and to the inlet of the low pressure side 825y; that liquid comprising a combination of concentrate from reverse osmosis unit A and low pressure side outlet from reverse osmosis unit C.

Still referring to system 800, FIG. 8, at 830 the low pressure side outlet flow is shown leaving reverse osmosis unit B and being directed through pump 831 to joint 807. Here, the low pressure side outlet flow from reverse osmosis unit B is combined with the original solution in line 806 to be directed into reverse osmosis membrane unit A.

At line 835, high pressure side concentrate is being removed from reverse osmosis unit B. It is directed to joint 836 where it is combined with a dilute solution from reverse osmosis unit D and is directed via line 837 to joint 838. At joint 838, the liquid stream from line 837 is split, into lines 839 and 840. Line 839 is directed into the high pressure side inlet line 841 for reverse osmosis unit C. Line 840 is directed through pressure reducer 842 into the low pressure side inlet line 843 for reverse osmosis unit C.

In general, the reverse osmosis unit C includes a reverse osmosis membrane arrangement or membrane 845 having a high pressure side 845x and a low pressure side 845y. Line 841 directs inlet feed to high pressure side 845x and line 843 directs inlet feed to low pressure side 845y. It is noted that the reverse osmosis operation conducted with reverse osmosis unit C is conducted with the same inlet feed (in solute concentration) to both the high pressure side 845x and the low pressure side 845y, that inlet feed comprising in combination of: low pressure side outlet flow from reverse osmosis unit D, and concentrate from reverse osmosis unit B.

At 848, a low pressure side outlet flow line for reverse osmosis unit C is depicted. The solution is directed through line 848 through pump 849, and then to joint 817, where it is combined with concentrate from reverse osmosis unit A and is directed into reverse osmosis unit B for processing as previously described.

Line 850 is a high pressure side concentrate outlet line for reverse osmosis unit C. It is directed to joint 851 where it split into lines 852 and 853. Line 852 is a high pressure side inlet line to reverse osmosis unit D. Line 853 is directed through pressure reducer 854 to low pressure side inlet line 855 for reverse osmosis unit D.

Reverse osmosis unit D generally comprises a reverse osmosis membrane arrangement or membrane 857 having a high pressure side 857x and a low pressure side 857y. For the particular reverse osmosis unit D depicted, the reverse osmosis process is conducted with the same feed streams (in solute concentration) to both the upstream side via 857x and the downstream side 857y of member 857.

At 858 the low pressure side outlet (dilute solution) stream for reverse outlet unit D is depicted. It is directed through pump 859 to joint 836, where it is combined with concentrate for reverse osmosis unit B and used for the feed stream to reverse osmosis unit C.

At 860 the high pressure side concentrate is shown leaving reverse osmosis unit D. This concentrate is directed to pressure reducer 861 and then is directed as a concentrate out in line 802, from system 800.

Referring in general to system 800 FIG. 8, it is noted that for each of the reverse osmosis units therein, which is conducted with both a high pressure side inlet feed and a low pressure side inlet feed, (i.e. units B, C and D), the inlet feed to each side of a selected unit is the same, in concentration solute. The only reverse osmosis membrane unit conducted without both high pressure side inlet and a low pressure side inlet feed, is reverse osmosis unit A.

It is noted that for the system 800 of FIG. 8, those reverse osmosis units (B,C, D) operate with both a high pressure side inlet feed and a low pressure side inlet feed, are depicted as conducted with counter current flow. Alternatives are possible.

In addition, the system 800 of FIG. 8, is depicted with various pumps, pressure reducers, and joints. Alternative positions or configurations of these are possible.

In general terms characterized above, system 800 can be viewed as including: a first, final, solvent (or dilute solution)—generating reverse osmosis unit A; a first, final concentrate-generating reverse osmosis unit D; and, an intermediate reverse osmosis unit membrane system comprising units B and C. Unit B can be considered a most permeate flow-direction reverse osmosis unit, of the intermediate system; and, unit C can be viewed as comprising a most concentrate flow-direction reverse osmosis unit, of the intermediate system.

Further, in general, operation of the system 800 can be characterized as follows:

(a) Concentrate flow from the first, final, solvent (or dilute solution)-generating reverse osmosis unit A is directed through the intermediate system (in the example shown in series through units B and C) to the first, final, concentrate-generating reverse osmosis unit D.

(b) Low pressure side outlet flow (dilute solution) from the first, final, concentrate-generating reverse osmosis unit D can be viewed as directed through the intermediate system (in the example shown in series though units C and B) into the first, final solvent (or dilute solution)—generating reverse osmosis unit A.

(c) Further, in the example depicted, the original solution can be viewed as directed into the first, final, solvent (or dilute solution)—generating reverse osmosis unit A.

Of course principles analogous with FIG. 8 could be applied, with the original solution directed into first, final, concentrate-generating reverse osmosis unit D, with the systems appropriately modified for the intended flows.

The particular system of FIG. 8, is configured for a situation in which the concentrate out 802, is desired to be substantially higher in concentration than the concentration of the feed solution, 801 and the feed solution 801 is relatively dilute such that solvent can be extracted in a single step reverse osmosis process of reverse osmosis unit A.

H. Examples of Modified Versions of FIG. 8-FIGS. 9, 9A and 10

Figure 9:
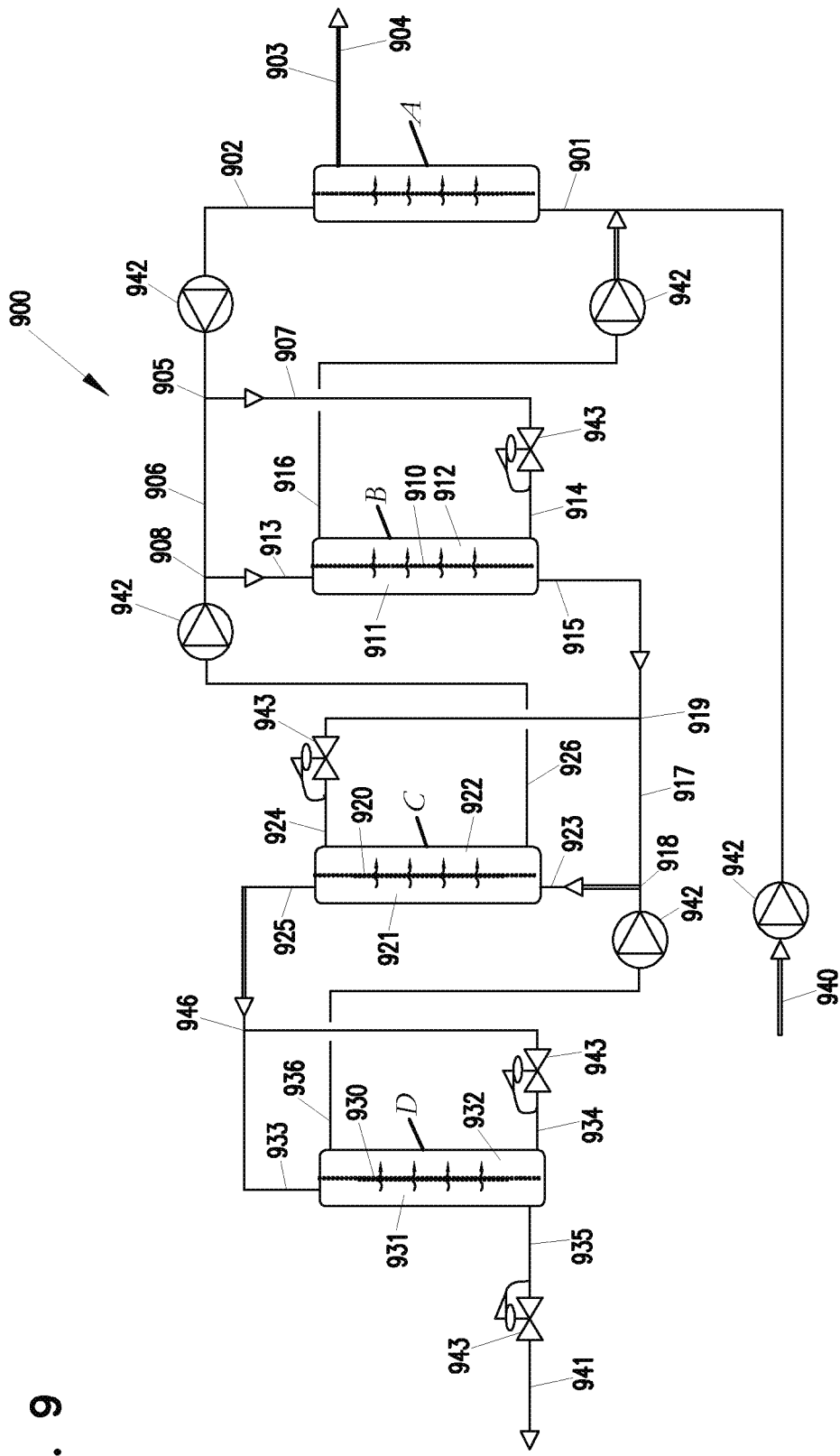
FIG. 9 is a schematic depiction of another example system for conducting a reverse osmosis process in accord with the present disclosure.
Figure 9A:
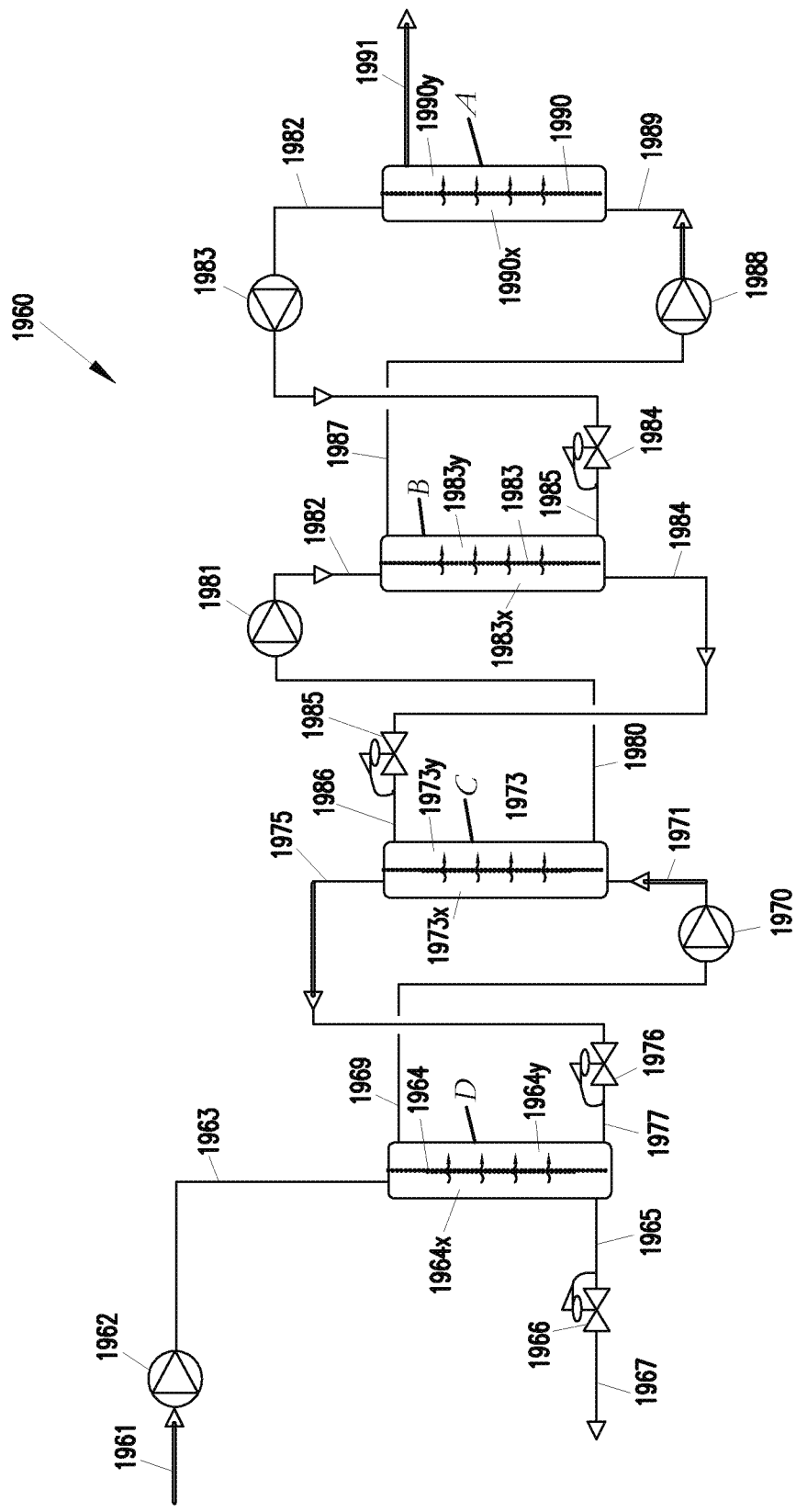
FIG. 9A is an example system analogous to FIG. 9, except modified for isolating certain solute movement.
Figure 10:
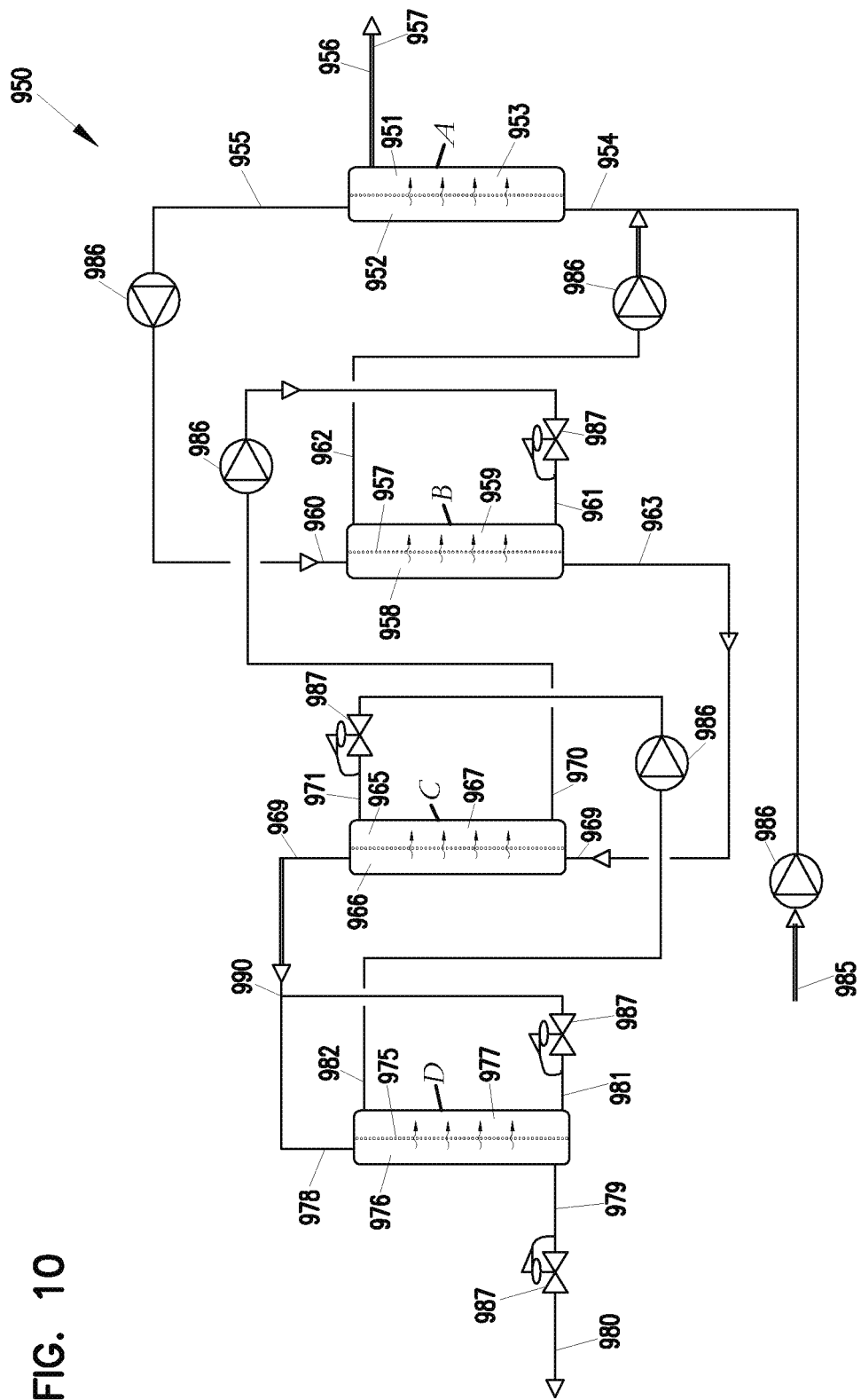
FIG. 10 is a schematic depiction of another example system for conducting a cascading reverse osmosis process in accord with present disclosure.

As discussed above, the various equipment systems characterized herein, can be modified with respect to: pump location, pressure reducer location; and, joints, to accomplish different effects and thus provide for different processes. FIGS. 9, 9A and 10 provide examples relating to modification of the four reverse osmosis unit system 800, FIG. 8.

Referring to FIG. 9, system 900 generally involves the use of four reverse osmosis units A, B, C and D. Reverse osmosis unit A is a conventional reverse osmosis unit, and does not include a low pressure side inlet. Rather reverse osmosis unit A has a high pressure side inlet 901, a high pressure side (concentrate), outlet 902 and a low pressure side outlet 903 which, for system 900 comprises a purified solvent outlet 904.

Reverse osmosis unit B is a most permeate flow-direction reverse osmosis unit, in the intermediate reverse osmosis unit system comprising units B and C. Reverse osmosis unit B has a reverse osmosis membrane arrangement or membrane 910 with a high pressure side 911 and a low pressure side 912. Reverse osmosis unit B includes a high pressure side inlet 913 and a low pressure side inlet 914, a high pressure side, concentrate outlet 915 and a low pressure side, outlet 916.

Reverse osmosis unit C comprises a most concentrate flow-direction reverse osmosis unit in the intermediate reverse osmosis unit system comprising units B and C. Reverse osmosis unit C comprises a reverse osmosis membrane arrangement or membrane 920 having a high pressure side 921 and a low pressure side 922. Unit C has a high pressure side inlet 923, a low pressure side inlet 924, high pressure side, concentrate, outlet 925 and a low pressure side, dilute solvent solution outlet 926.

Reverse osmosis unit D is a final, concentrate-generating reverse osmosis unit for system 900. Reverse osmosis unit D comprises a reverse osmosis membrane arrangement or membrane 930 having a high pressure side 931 and a low pressure side 932. Unit D includes a high pressure side inlet 933, a low pressure side inlet 934; a high pressure side, concentrate, outlet 935; and, a low pressure side, dilute solution outlet 936.

For system 900, at 940 original solution inlet is shown. At 941, concentrate outlet is shown. Various pumps are indicated in this system at 942 with various pressure reducers are indicated in the system at 943.

Referring to FIG. 9, it can be seen that the system is operated with original solution 940 directed through pump 942 into inlet 901 for reverse osmosis unit A. At inlet 901, solution 940 is mixed with low pressure side outlet 916 from reverse osmosis unit B. At reverse osmosis unit A, a reverse osmosis operation is conducted providing a low pressure side outlet flow 903 which leaves system 900 as solvent outlet 904. High pressure side outlet (concentrate) is shown leaving reverse osmosis unit A and being directed into joint 905 where it splits into lines 906 and 907. Line 907 is directed through pressure reducer 943 and into the low pressure side 912 of reverse osmosis unit B via 914. Line 906 is directed to joint 908 where it combines with flow from 926 to feed inlet 913 to the high pressure side 911 of reverse osmosis unit B. The reverse osmosis operation conducted in reverse osmosis unit B, is with high pressure side inlet 913 comprised of solution from low pressure side outlet 926 from reverse osmosis unit C and high pressure side concentrate solution from high pressure side outlet 902 from reverse osmosis unit A. It is noted reverse osmosis unit B is set up for counter current flow, although alternatives are possible.

From reverse osmosis unit B, low pressure side outlet 916 is shown directed into inlet 901 for reverse osmosis unit A, as previously described. Concentrate in line 915 from reverse osmosis unit B is used as low pressure side inlet for reverse osmosis unit C and is also combined with dilute solution low pressure side outlet flow from reverse osmosis unit D in 936 at joint 918 to serve as inlet feed 923 to the high pressure side of reverse osmosis unit C. Reverse osmosis unit C is operated with counter current flow and a high pressure side inlet flow at 923 comprising a combined flow solution of low pressure side outlet from reverse osmosis unit D and high pressure side outlet from reverse osmosis unit B. (At 919, line 915 is split to provide low pressure side inlet flow 924, for unit C).

Low pressure side outlet from reverse osmosis unit D, is shown at line 936 and is used as a portion of the high pressure side inlet for reverse osmosis unit C. High pressure side outlet 925 from reverse osmosis unit C is split at joint 946, and is used as both the high pressure side inlet 933 and low pressure side inlet 934 for reverse osmosis unit D. The concentrate outlet from reverse osmosis unit D, at 935, generally comprises the concentrate outlet from the system 900, once reduced in pressure. The low pressure side outlet 936 from reverse osmosis unit D is combined with flow in line 917 at joint 918 and used as a high pressure side inlet at 923 for reverse osmosis unit C.

From a review of FIG. 9, it can be understood that each of reverse osmosis units B, C and D are operated with: a high pressure side inlet flow; a low pressure side inlet flow; and, each is operated with a counter current flow. Of course, an alternative to counter current flow is possible.

The system of FIG. 9 can be generally characterized as involving a first, final, solvent (or dilute solution)—generating unit A; a first, final, concentrate—generating unit D, and an intermediate reverse osmosis unit system comprising two units, units B and C; unit B being a most permeate flow-direction unit and unit C being a most concentrate flow-direction unit. The system of FIG. 9 will be particularly advantageous, if the system inlet feed solution 940 is dilute enough such that solvent can be extracted in a single step reverse osmosis process in reverse osmosis unit A and, higher concentrate solution is desired such as could be produced via the high pressure side outlet of reverse osmosis unit D at 935.

Any number of intermediate units could be used to obtain progressively higher solution concentrations.

Note that FIG. 9 is similar to FIG. 8, other than the location of flow joints. As stated previously, various configurations of flow joints, pumps, and pressure reducing devices are possible. Several examples are presented herein, however, these examples are not intended to, nor do they, represent all of the various possible configurations of the cascading reverse osmosis system claimed herein.

It is noted that in FIG. 9 a number of phantom line arrowheads are designated by "r". These are intended to indicate that optionally the flow in the line indicated can be in the reverse direction from that discussed above, i.e., the direction of arrowhead "r". This will be a matter selected by the operator of the system, based upon parameters for operation selected.

In FIG. 9A, a variation in system 900, is depicted 1960. The system 1960 comprises four reverse osmosis units A, B, C, and D.

Original solution flow into system 1960 is shown at 1961. It is directed through pump 1962 into inlet feed line 1963 for a high pressure side of unit D; unit D comprising a membrane or membrane arrangement 1964 having a high pressure side 1964x and a low pressure side 1964y. Concentrate outlet flow from unit D is shown at line 1965 directed through pressure reducer 1966 to provide a final concentrate outlet 1967. Low pressure side outlet flow from unit D is shown at line 1969 directed through pump 1970 into high pressure side inlet line 1971 for unit C. Unit C generally comprises reverse osmosis membrane or membrane arrangement 1973 having an upstream side 1973x and a downstream side 1973y. The high pressure side, concentrate, outlet from unit C is shown at 1975, directed through pressure reducer 1976 to provide a low pressure side inlet feed 1977 for reverse osmosis unit D.

At 1980, a low pressure side inlet line from unit C is shown directed through pump 1981 into high pressure side inlet feed 1982 for reverse osmosis unit B. Reverse osmosis unit B comprises a membrane arrangement or membrane 1983 having a high pressure side 1983x, and a low pressure, downstream, side 1983y. High pressure, concentrate, outlet from unit B is shown at line 984 directed through pressure reducer 1985 into low pressure side inlet feed 1986, for reverse osmosis unit C. At 1987, a low pressure side outlet from unit B is shown directed through pump 1988 into inlet feed 1989 for high pressure side of unit A. Unit A includes a membrane 1990 having a high pressure side 1990x, and a downstream, low pressure side 1990y. At 1991, a low pressure side outlet flow from unit A is shown, providing a dilute solution outlet from system 1960. At 1982, a high pressure side outlet from unit A is shown directed through pump 1983 and pressure reduction 1984 to provide an inlet line 1985 for unit B.

Of course, variations and specific pump pressure reducer locations can be provided, in the system in accord with FIG. 9A.

FIG. 9A demonstrates the principle of isolating one or more flows, and not providing complete cascading flow, within the system. For example, since the high pressure side inlet feed 971 to unit C comes from unit D, the high pressure side outlet feed from unit C is back into unit D; and, dilute solution flow from unit C is directed into unit B as high pressure flow, and concentrate flow from line 984 from unit B is directed back into unit C.

Stated in more general terms, first reverse osmosis membrane unit (D) is operated with both a high pressure side inlet feed and a low pressure side inlet feed, the high pressure side inlet feed being original solution flow. Low pressure side inlet feed is pressure side concentrate outlet flow from a second unit (C). For the system 1960, a low pressure side outlet flow from the first unit (D) is directed into the second unit, and not elsewhere. The high pressure side concentrate outlet flow from the second unit (C) is directed into the first unit (D) and not elsewhere. This provides a closed loop for concentrate in high pressure, side of unit C, and the low pressure side of unit D. At least a third unit (B) provided, receiving low pressure side outlet flow from the second unit (C).

A system similar to unit 9A can be used when it is desirable to change the specific solute the system. For example, assume that the inlet flow at 1961 comprises a particularly caustic material, for reverse osmosis membrane. Then, the first membrane unit D would be constructed, typically more expensively, to manage the material. However, for downstream side of unit C through units B and A, the system could be charged with a different (less caustic) solute, to facilitate operation with ordinary, not high resistance, membranes from units A, B and C.

In general, a system in accord with FIG. 9A will be referred to as a closed loop system in that it prevents movement of a single (solute) concentrate completely through the system, if desired.

Of course, in the system of FIG. 9A there is also no specific requirement that the same total solvent composition be used in each of the isolated loops, although solvent will move across the membranes in operation.

In FIG. 10, system 950 is depicted also comprising four reverse osmosis units A, B, C and D. Reverse osmosis unit A comprises a reverse osmosis membrane arrangement or membrane 951 having a high pressure side 952 and a low pressure side 953. Unit A includes a high pressure side inlet 954, but no low pressure side inlet. A high pressure side (concentrate) outlet flow is shown at 955. The low pressure side outlet flow is shown at 956 and comprises the solvent outlet from the system 950.

Reverse osmosis unit B comprises a reverse osmosis membrane arrangement or membrane 957 having a high pressure side 958 and a low pressure side 959. High pressure side inlet 960 comprises a high pressure side (concentrate) outlet 955 from unit A. Unit B includes a low pressure side inlet 961, configured for counter current flow in unit B, with respect to the inlet flow 960 to the high pressure side.

Low pressure side outlet 962 from unit B, is directed to high pressure side inlet 954 of unit A. High pressure side outlet (concentrate) from unit B, is shown at 963.

Unit C comprises a reverse osmosis membrane arrangement or membrane 965 having a high pressure side 966 and a low pressure side 967. High pressure side inlet 968 is shown. The high pressure side outlet (concentrate) is shown at 969. A low pressure side outlet (dilute solution) is shown at 970. A low pressure side inlet is shown at 971. Unit C is shown here as configured for counter current flow.

Unit D comprises a final, concentrate-generating reverse osmosis unit that includes a reverse osmosis membrane arrangement or membrane 975 having a high pressure side 976 and a low pressure side 977. Unit D includes a high pressure side inlet 978, and a high pressure side outlet (concentrate) 979. The high pressure side concentrate outlet 979 provides for final concentrate removal 980 from system 950. Unit D includes a low pressure side inlet 981 configured for counter current flow within unit D. The low pressure side outlet is shown at 982, from reverse osmosis unit D.

Original solution inlet to system 950 is shown at 985.

From a review of FIG. 10, it will be understood that the system includes a plurality of reverse osmosis unit pumps 986 and pressure reducers 987 appropriately positioned for operation.

Still referring to FIG. 10, the system 950 is operated in general, with original solution 985 directed into reverse osmosis unit At high pressure side inlet 954, where it is combined with low pressure side outlet 962 from reverse osmosis unit B which has been pressurized. Reverse osmosis unit A is not conducted with a low pressure side inlet, and comprises a first, final, solvent-generating reverse osmosis unit A at the most solvent end of the system. Solvent is shown removed from the system at 956. High pressure side outlet (concentrate) is shown at line 955 being directed to unit B as a high pressure side concentrate inlet 960. Low pressure side inlet 961 for reverse osmosis unit B comprises low pressure side outlet 970 from reverse osmosis unit C. Concentrate from reverse osmosis unit B at line 963 is shown directed into reverse osmosis unit C a high pressure side inlet 968. High pressure side, concentrate, outlet from reverse osmosis unit C is shown at 969 directed to joint 990, where it is split to provide both high pressure side inlet feed 978 and low pressure side inlet feed 981 to reverse osmosis unit D. Low pressure side outlet 982 from reverse osmosis unit D is shown used as the low pressure side inlet 971 for reverse osmosis unit C.

Still referring to FIG. 10, system 950 can be viewed as comprising: a final solvent-generating reverse osmosis unit A; intermediate reverse osmosis unit system comprising units B and C, and a most concentrate-generating reverse unit D. Further, the intermediate reverse osmosis unit system can be characterized as comprising a most permeate flow-direction unit B and a most concentrate direction unit C.

It should be noted that various ones of pumps are optional and not required for system operation. Also it is noted that various ones of pressure reducers 987 are optional and not required for system operation.

The present invention can be used in conjunction various levels of pre and post treatment including, but not limited to, filtration, or treatment with activated carbon or other selective absorbents, partial distillation, etc.

The present invention can be used in conjunction with various ballast, surge, or storage tanks in between the various membrane stages.

IV. Some Additional Example Systems, FIGS. 11-13

The figures thus far described were included in the disclosure of U.S. provisional 61/131,947, filed Jun. 13, 2008. In this section, FIGS. 11-13, which include some features not previously described, are depicted. These arrangements can provide an understanding of some advantageous applications of the principles described herein.

A. A First Additional Example System and Process, FIG. 11.

Figure 11:
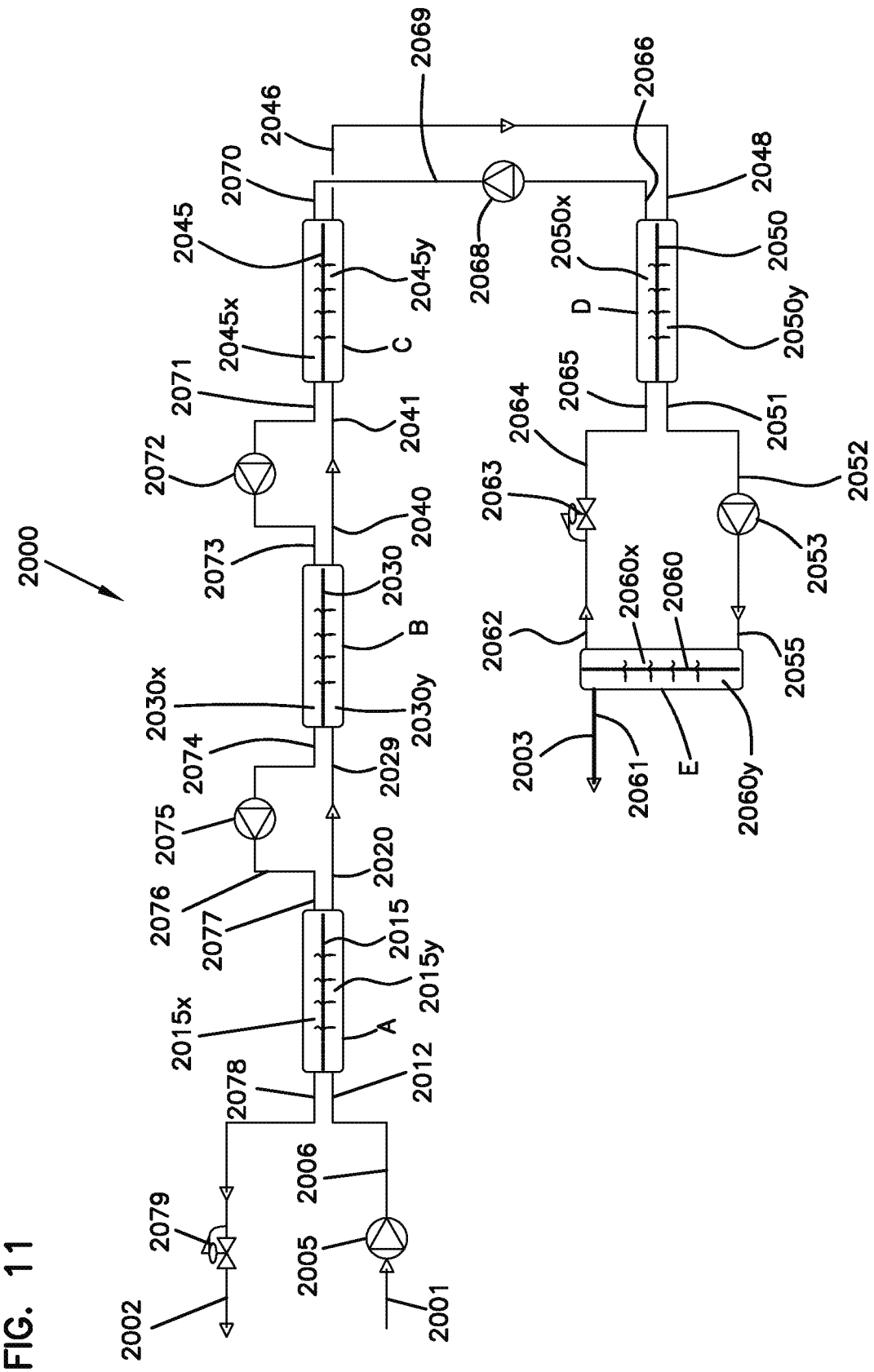
FIG. 11 is a schematic depiction of a further example system for conducting a reverse osmosis process in accord with the present disclosure.

Attention is now directed to FIG. 11, in which an additional example system is depicted at 2000. The cascading reverse osmosis system 2000 is conducted with a plurality of reverse osmosis units, in this instance five reverse osmosis units A-E. For the system 2000, an original solution flow line into the system is depicted at 2001. A concentrate outlet line from the system 2000 is depicted at 2002, and a purified solvent outlet line from the system 2000 is depicted at 2003.

According to FIG. 11, the original solution 2001 is directed through reverse osmosis pump 2005, into feed line 2006. The liquid is then directed to low pressure side inlet line 2012 for reverse osmosis unit A. In general, reverse osmosis unit A comprises reverse osmosis membrane arrangement or membrane 2015 defining a high pressure side 2015x and a low pressure side 2015y. In the general terms, used herein, the reverse osmosis unit A of system 2000 is a first, final, concentrate outlet-generating reverse osmosis unit.

From reverse osmosis unit A, the low pressure side outlet solution (reduced-solute solvent) out is indicated at 2020. This line is directed to low pressure side inlet line 2029, of reverse osmosis unit B. Reverse osmosis unit B comprises reverse osmosis membrane arrangement or membrane 2030 defining a high pressure side 2030x and a low pressure side 2030y. A low pressure side solution (reduced-solute solvent) outlet is shown at 2040. This outlet directs low pressure side outlet flow into low pressure side inlet line 2041 for reverse osmosis unit C. In general terms used herein, reverse osmosis unit B is a member of an intermediate reverse osmosis membrane unit system comprising at least one reverse osmosis unit. In the particular system 2000 depicted in FIG. 11, the intermediate reverse osmosis membrane unit system comprises multiple reverse osmosis units, and, in particular the system 2000 depicted, it comprises three units B, C and D.

In general, reverse osmosis unit C comprises a reverse osmosis membrane arrangement or membrane 2045, defining a high pressure side 2045x and a low pressure side 2045y.

At 2046, a low pressure side outlet (reduced-solute solvent) flow from reverse osmosis unit C is depicted. Line 2046 directs the low pressure side outlet from reverse osmosis unit C into low pressure side inlet line 2048 for reverse osmosis unit D.

In general, reverse osmosis unit D comprises reverse osmosis membrane arrangement or membrane 2050 defining a high pressure side 2050x and a low pressure side 2050y. At

2051, a low pressure side outlet (reduced-solute solvent) is depicted, directing low pressure side outlet flow: from reverse osmosis unit D into line 2052; through reverse osmosis unit pump 2053; and, into a high pressure side inlet line 2055 for reverse osmosis unit E.

In general terms, reverse osmosis unit E comprises a reverse osmosis membrane arrangement or membrane 2060 defining a high pressure side 2060x and a low pressure side 2060y. At 2061, a low pressure side outlet line for reverse osmosis unit E is depicted. Line 2061 provides for reduced-solute solvent outflow to the purified solvent out line 2003 for the system 2000. In the general terms used herein, reverse osmosis unit E is a first, final, solvent outlet-generating reverse osmosis unit. Reverse osmosis unit A is a first, final, concentrate outlet-generating reverse unit. Reverse osmosis unit D is a most permeate flow-direction reverse osmosis unit in the intermediate reverse osmosis membrane unit system; reverse osmosis unit B is a most concentrate flow-direction reverse osmosis unit, in the intermediate reverse osmosis unit membrane unit system; and, reverse osmosis unit C is a central unit in the intermediate reverse osmosis unit system.

At 2062, a high pressure side (concentrate) outlet line for reverse osmosis unit E is depicted. That is, the outlet concentrate from reverse osmosis unit E is directed into line 2062. It is then directed through pressure reduction device 2063 into line 2064, by which it is directed into a high pressure side inlet line 2065, for reverse osmosis unit D, and thus into the intermediate reverse osmosis unit system comprising units B, C and D. At 2066, a concentrate outlet line is shown from reverse osmosis unit D. This concentrate is directed through reverse osmosis pump 2068, into line 2069 and eventually to high pressure side inlet line 2070, for reverse osmosis unit C.

From reverse osmosis unit C, a high pressure side outlet line is shown at 2071. This would receive the concentrate from reverse osmosis unit C, and direct it through reverse osmosis pump 2072, from which it is directed into a high pressure side inlet line 2073 for reverse osmosis unit B. Concentrate from reverse osmosis unit B is shown directed into a high pressure side concentrate outlet line 2074, by which concentrate leaves reverse osmosis unit B, and thus the intermediate reverse osmosis unit system comprising units B, C and D. Line 2074 is directed through reverse osmosis unit pump 2075 into line 2076, and eventually into high pressure side inlet line 2077 for reverse osmosis unit A. Concentrate out from reverse osmosis unit A is directed into a concentrate outflow line 2078, eventually being directed through a pressure reducer 2079, and into concentrate outlet flow line 2002.

The configuration of FIG. 11 can be used to take advantage of some energy savings. In particular, it is noted that in use of reverse osmosis unit systems in accord with the present disclosure, the amount of pressure needed for a reverse osmosis process generally goes up, as the volume of liquid goes down and solute concentration increases. That is, in the more concentrated high pressure side concentrate inlet flows, relatively high pressures are needed for the reverse osmosis operation. Thus, referring to FIG. 11, the operating pressure differential across reverse osmosis unit D is, for typical operation, lower than the pressure differential across reverse osmosis unit A. Indeed, it is anticipated that for a typical system, the pressure differential across the reverse osmosis unit D could be about 50 psi, with the pressure across the remaining units in concentrate flow direction, i.e. units C, B and A, respectively, increasing. For example, reverse osmosis unit C might be operated at 200 psi differential, unit B at 400 psi differential, and unit A at a 690 psi differential.

The system of FIG. 11 is configured so that there is no step-down between reverse osmosis units A, B, C and D to save energy. Further, as the concentrate moves from unit D through C through B to A, pressure is increased as concentration solute increases, with each system taking advantage of the pressure increase previously put in, for example at 2068 and 2072.

It is noted that the principles described with respect to the system of FIG. 11 can be applied in a variety of alternately configured systems, and with an alternate number of reverse osmosis units. In general, a characteristic of FIG. 11, is that with respect to each reverse osmosis unit that is operated with each of: a high pressure side inlet; a high pressure (concentrate) side outlet, a low pressure side inlet and a low pressure side outlet, i.e. reverse osmosis units A, B, C and D, between each pair of such units is located a reverse osmosis pump (or step of increasing pressure) in the concentrate flow direction; and, between each pair of such units there is located no pressure reduction step-down in the permeate flow direction. It is also noted that in the specific example system of FIG. 11, there is no pump located in the low pressure side outlet flow line from any of units (A, B, C) which has both a high pressure side concentrate inlet and a low pressure side inlet, as well as a high pressure side outlet and a low pressure side outlet. Optionally, pumps could be provided at those locations.

In general terms, the system of FIG. 11 can be characterized as including an intermediate reverse osmosis unit system (units B, C and D) which has no pressure reducer or step-down unit therein, i.e. between an two units (B, C, D) therein, and in which there is no pump in the permeate or low pressure side outlet flow line between any two units (B, C, D) therein.

For the example system of FIG. 11, the only pressuring-reducing step-downs are the ones identified at 2079 and 2063; the one at 2079 being the final concentrate outlet pressure-reducing step-down; and, the one at 2063 adjusting pressure from the operation of final, solvent-generating reverse osmosis unit E to the proper inlet pressure for line 2065; i.e. inlet pressure for concentrate (the high pressure side) inlet feed for the intermediate reverse osmosis unit system. Both of these pressure reducing devices can be optional, as well as pumps 2068, 2072 and 2075.

It is also noted that reverse osmosis unit E is not operated with a permeate side inlet. Rather, it is final solvent purification reverse osmosis unit, analogous to ones previously described herein.

Again, it is noted that the system of FIG. 11 as described, is configured for a relatively efficient energy use. In particular, energy use in a reverse osmosis system will be a function of pressure differential and volume. As concentrate moves toward a more and more concentrated status, the liquid volume decreases and higher pressure is generally needed to produce sufficient gains in solute concentration at each step in the process. The system of FIG. 11 is configured for efficient use of the energy put in by the various pumps, by not having step-down occurring in as frequent locations as certain previously described systems.

It is noted that the principles described in connection with FIG. 11, can be configured in alternate systems with alternate numbers of reverse osmosis units, alternation and original solution in location, and/or alternate locations of equipment.

It is also noted that each and every step in equipment configuration depicted in FIG. 11 is not required, in order to obtain some benefit in accord with the principles thereof.

B. The System and Process of FIG. 12

Figure 12:
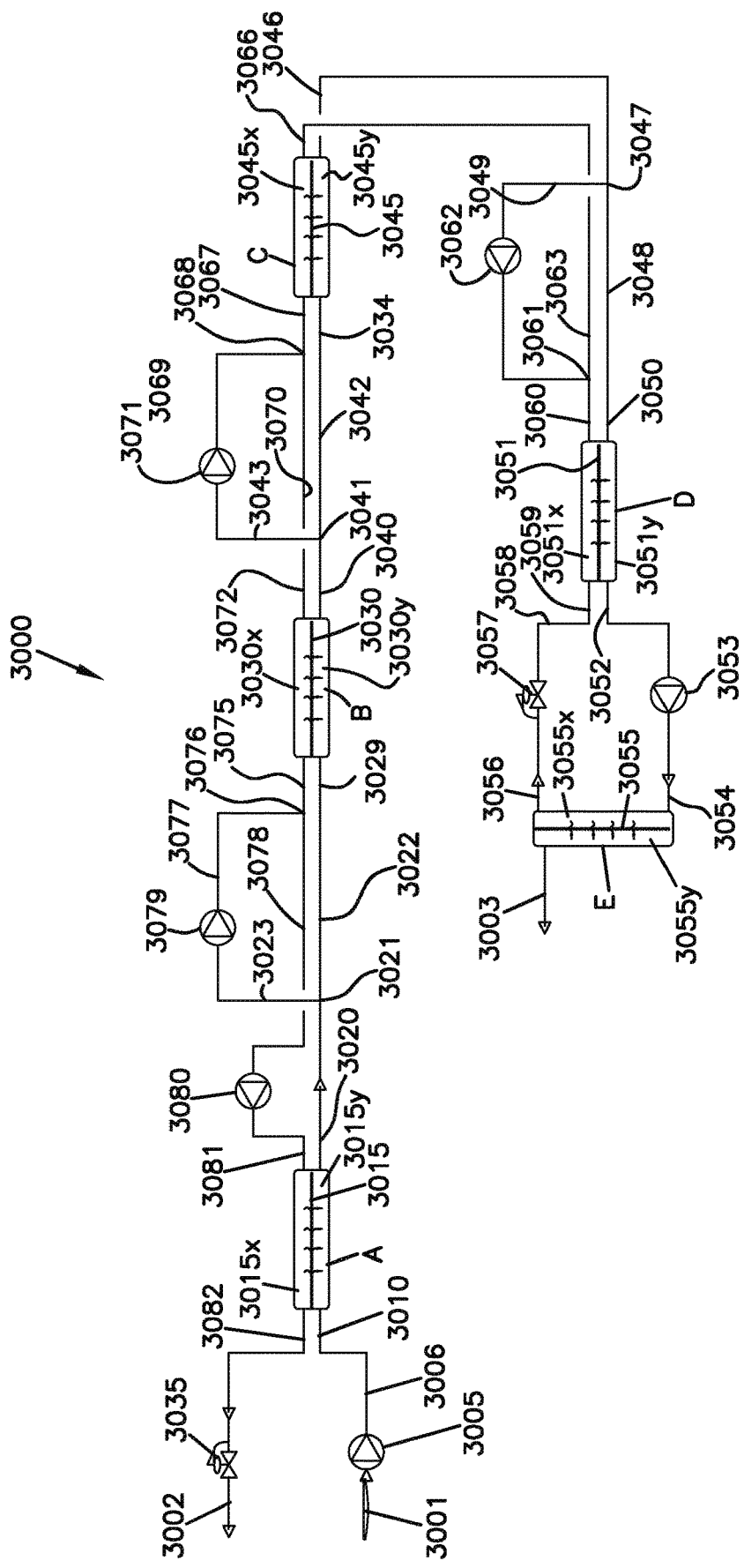
FIG. 12 is a schematic depiction of a further example system for conducting a reverse osmosis process in accord with the present disclosure.

Yet another variation in the principles described herein, is depicted in connection with the process and system of FIG. 12. Referring to FIG. 12, reverse osmosis system 3000 is depicted. At 3001, original solution in is depicted. Concentrate outflow from the system 3000 is depicted at 3002, and purified solvent outflow is depicted at 3003.

The particular system 3000 depicted comprises reverse osmosis units A, B, C, D and E. In terms used herein, reverse osmosis unit A is a first, final, concentrate outlet-generating reverse osmosis unit; reverse osmosis unit E is a first, final, solvent or purified solvent outlet-generating reverse osmosis unit; and, reverse osmosis units B, C, D form an intermediate reverse osmosis unit system; with unit B comprising a final concentrate-flow-direction unit therein; reverse osmosis unit D comprising a final, solute-reduced solvent or permeate flow-direction reverse osmosis unit of the intermediate reverse osmosis unit system; and with reverse osmosis unit C comprising a central unit of the intermediate reverse osmosis unit system.

In particular, and still referring to FIG. 12, solution in at line 3001 is shown directed through reverse osmosis pump 3005 and into line 3006, whereby it is directed into low pressure side inlet flow line 3010 for reverse osmosis unit A.

Reverse osmosis unit A comprises reverse osmosis membrane arrangement or membrane 3015 defining a high pressure side 3015x and a low pressure side 3015y. For reverse osmosis unit A, a low pressure side outlet line 3020 is shown directing low pressure side outlet flow to joint 3021. At joint 3021, the low pressure side outlet flow from reverse osmosis unit A is split into lines 3022 and 3023. Line 3022 is shown directed to low pressure side inlet line 3029 for reverse osmosis unit B.

In general, reverse osmosis unit B comprises reverse osmosis membrane arrangement or membrane 3030 defining a high pressure side 3030x and a low pressure side 3030y. At 3040, a low pressure side outlet for reverse osmosis unit B is shown directed to joint 3041, where it is split into lines 3042 and 3043. Line 3042 is directed to low pressure inlet line 3034 for reverse osmosis unit C.

In general, reverse osmosis unit C comprises a reverse osmosis membrane arrangement or membrane 3045 defining a high pressure side 3045x and a low pressure side 3045y. At 3046, low pressure side outlet line for reverse osmosis unit C is depicted, directing low pressure side outlet flow from unit reverse osmosis unit C to joint 3047, where the flow is split into lines 3048 and 3049.

Low pressure side flow in line 3048 is directed to low pressure side inlet line 3050 for reverse osmosis unit D. In general, reverse osmosis unit D comprises a reverse osmosis membrane arrangement or membrane 3051 defining a high pressure side 3051x and a low pressure side 3051y. A low pressure side outlet flow from reverse osmosis unit D is shown in 3052 directed to reverse osmosis pump 3053 and into high pressure side inlet line 3054 for reverse osmosis unit E.

Reverse osmosis unit E generally comprises a reverse osmosis membrane arrangement or membrane 3055 defining a high pressure side 3055x and a low pressure side 3055y. Low pressure side solution outlet flow for reverse osmosis unit E is shown at line 3003, comprising permeate or solvent outlet flow from the system 3000. At 3056, a high pressure side concentrate outlet flow for reverse osmosis unit E is depicted, directed into pressure reduction unit 3057, to be directed via line 3058 into high pressure side inlet line 3059 for reverse osmosis unit D. At 3060, a high pressure side concentrate outlet flow from reverse osmosis unit D is shown, directed to joint 3061, where it is combined with flow from line 3049 (after flow from line 3049 has been pressurized at pump 3062) and is directed into line 3063 from joint 3061. The combined flow, in line 3063 is directed to a high pressure side concentrate inlet line 3066, for reverse osmosis unit C.

At 3067, a high pressure side concentrate outlet for reverse osmosis unit C is shown directed to joint 3068, where it is combined with flow in line 3069, and is directed into line 3070. Flow into line 3069 comprises the flow from line 3043 after being directed through, and pressured by, reverse osmosis unit pump 3071. Concentrate in pressurized line 3070 is directed to high pressure side inlet line 3072, for reverse osmosis unit B.

At 3075, a high pressure side, concentrate, outlet flow for reverse osmosis unit B is depicted, directed to joint 3076, where it is combined with flow from line 3077 and directed into line 3078. Flow in line 3077, comprises the flow from line 3023 after having been pressurized by passage through reverse osmosis pump 3079. High pressure side concentrate outlet flow at line 3078 from joint 3076 is directed through pump 3080, into high pressure side concentrate inlet line 3081, for reverse osmosis unit A.

At 3082, high pressure side concentrate outlet from reverse osmosis unit A is shown being directed to pressure reducer or pressure step-down unit 3035, and ultimately to concentrate outlet line 3002.

It is noted that particular system depicted FIG. 12 is operated with multiple, in this example four reverse osmosis units A, B, C and D, each of which has: a high pressure side concentrate inlet; a high pressure side concentrate outlet; a low pressure side inlet; and, a low pressure side outlet. Between each of these four units is provided a joint which directs a portion of reduced-solute, solvent, outflow from a next or previous upstream unit (in permeate or low pressure side outlet flow direction) into two streams. A first stream is directed into the low pressure side inlet of the next downstream unit (in permeate or low pressure side outflow direction); and, a second stream that is directed through a pump and is then combined with a high pressure side concentrate outlet flow from that same next permeate flow-direction downstream unit (or, alternately stated, the next upstream concentrate direction unit).

It is noted that the final reverse osmosis unit E is not conducted with a low pressure side inlet, but rather comprises a final solvent purification reverse osmosis unit in the system.

In general, the configuration of FIG. 12 can be modified with respect to such features as the specific flow line and pump configurations and specific number of reverse osmosis units. Pressure reducing devices 3035 and 3057 are optional. In addition, pump 3080, and any of the individual bypass lines and associated pumps, are optional.

This system depicts how a process analogous to that conducted with respect to FIG. 11 can be further modified for energy efficiency. In particular, as material moves in the permeate flow-direction (low pressure side flow direction) from unit A, to unit B, to unit C, to unit D, the volume in the low pressure side outlet flow increases, as a result of the solvent addition coming from the reverse osmosis process; i.e. solvent passage across the various reverse osmosis membranes in the reverse osmosis membrane units. At each downstream joint, at least a portion of the increase in volume is taken back out, is re-pressurized and is put in the concentrate outlet flow form in the next permeate flow-direction (low pressure side flow direction) downstream unit; this could alternately be identified as the next upstream unit in concentrate flow-direction. This reduces the amount of energy needed to accomplish the downstream reverse osmosis operations (in the permeate direction) with respect to an increasing volume of solution. Another way to state this, is that a certain amount of solution is bypassed back between any two of the reverse osmosis units A, B, C and D.

Thus, referring back to the process of previously discussed FIG. 11, and reverse osmosis unit D, there was a high volume of liquid passing through the system, but the differential pressure for operation of a reverse osmosis step for that membrane unit (D) was relatively low, with step wise increases in pressure as volume decreased in the concentrate flow direction. With respect to the system of FIG. 12, each reverse osmosis unit is operated with a relatively high differential pressure; and a high solvent volume is not pushed through the entire system, but rather is bypassed back. Thus, in the process of FIG. 12 energy advantage is obtained by not pressurizing a higher volume of liquid than needed, at various ones of the reverse osmosis units. As one can see, it is possible to mix and match various configurations from the process of FIG. 12 with the process of FIG. 11.

C. The Reverse Osmosis Process and System of FIG. 13

Figure 13:
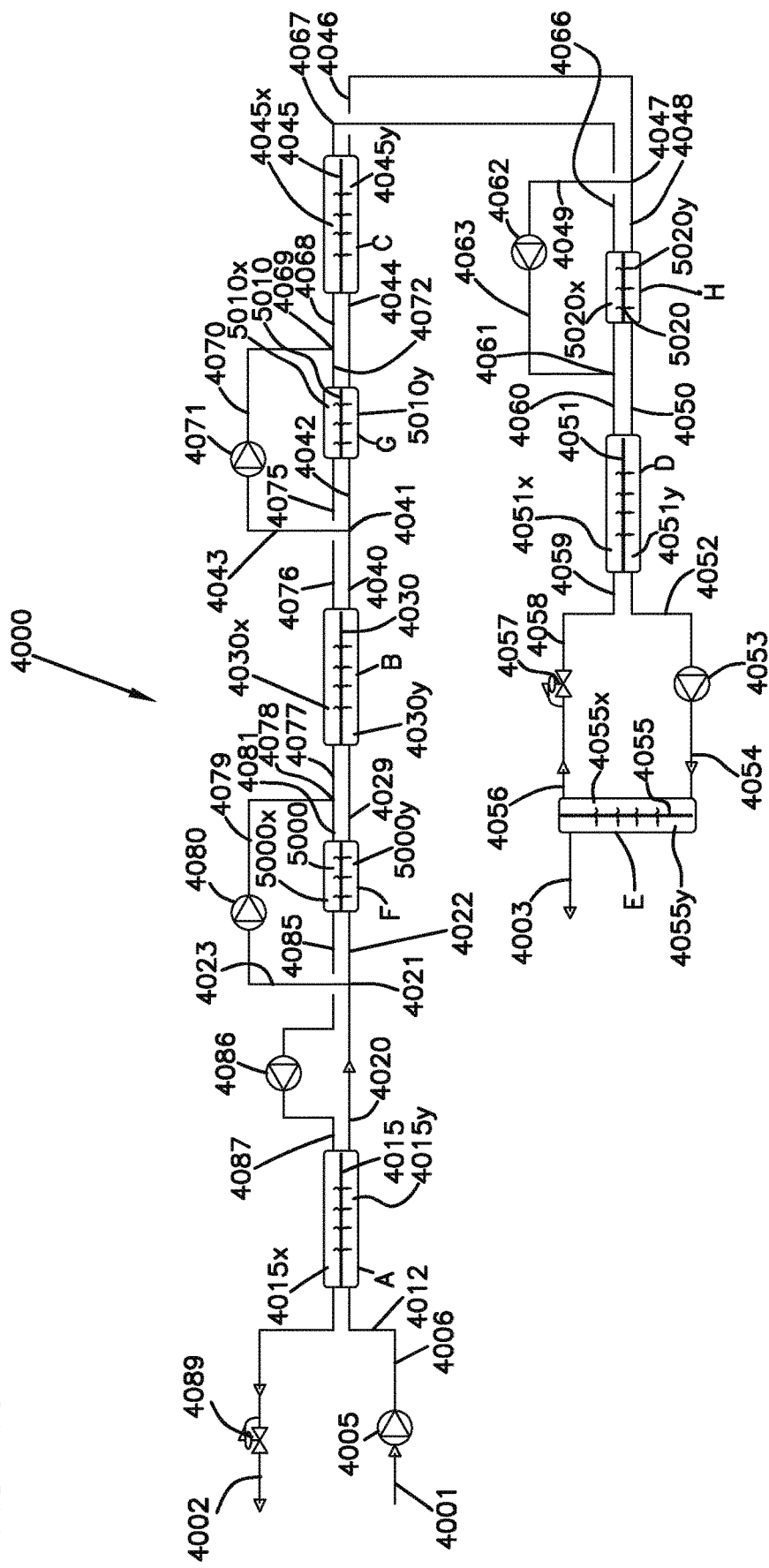
FIG. 13 is a schematic depiction of a further example system for conducting a reverse osmosis process in accord with the present disclosure.

In FIG. 13, another reverse osmosis system is depicted generally at 4000. The reverse osmosis system 4000 is a modification of the system 3000, FIG. 12. In particular, the system 4000 uses reverse osmosis units A, B, C, D and E somewhat analogously to the use of analogously identified reverse osmosis units in FIGS. 11 and 12. However, in FIG. 13, some additional smaller units F, G and H are used, one each between units A, B, C, and D, respectively. The operation of these units (FIG. 14) will be understood from the following general description of system 4000.

Before returning to a detailed description of system 4000, FIG. 13, the general terms used herein, the following characterizes the system 4000: reverse osmosis unit A is a first, final, concentrate-direction reverse osmosis unit; reverse osmosis unit E is a first, final, permeate or reduced solute solvent-direction reverse osmosis unit; reverse osmosis units F, B, G, C, H and D form an intermediate reverse osmosis unit system; reverse osmosis unit F is a final concentrate flow-direction reverse osmosis unit in the intermediate reverse osmosis unit system; and, reverse osmosis unit D is a final reduced-solute solvent or permeate flow-direction reverse osmosis unit, in the intermediate reverse osmosis unit system. Thus, units B, G, C and H are central units in the intermediate reverse osmosis unit system.

Referring to FIG. 13, at 4001 original solution flow into the system is depicted at 4001. Concentrate outflow from the system is depicted at line 4002, and (purified) solvent outflow is depicted at 4003. Solution inflow at 4001 is shown directed through reverse osmosis pump 4005 and into line 4006, from which it is directed into low pressure side inlet line 4012 for reverse osmosis unit A. Reverse osmosis unit A generally comprises a reverse osmosis membrane arrangement or membrane 4015 defining a high pressure side 4015x and a low pressure side 4015y. Low pressure side outlet flow from reverse osmosis unit A is shown at line 4020, directed to joint 4021. At joint 4021 it is split into lines 4022 and 4023. Line 4022 generally comprises a low pressure side inlet flow to reverse osmosis unit F, which comprises a reverse osmosis membrane 5000 defining a high pressure side 5000x and a low pressure side 5000y. For reverse osmosis unit F, a low pressure side outlet flow is shown at line 4029 directed as low pressure side inlet flow to reverse osmosis unit B.

Reverse osmosis unit B generally comprises reverse osmosis unit membrane arrangement or membrane 4030 defining a high pressure side 4030x and a low pressure side 4030y. At 4040, a low pressure side outlet line from reverse osmosis unit B is shown directed to joint 4041 where it split into lines 4042 and 4043. Line 4042 is a low pressure side inlet line to reverse osmosis unit G. Reverse osmosis unit G generally comprises a reverse osmosis membrane arrangement or membrane 5010 defining a high pressure side 5010x and a low pressure side 5010y.

At 4044, low pressure side outlet flow from reverse osmosis unit G is shown directed as a low pressure inlet flow to reverse osmosis unit C. Reverse osmosis unit C generally comprises a reverse osmosis membrane arrangement or membrane 4045 defining a high pressure side 4045x and a low pressure side 4045y. At 4046, low pressure side outlet flow from reverse osmosis unit C is shown directed to joint 4047, where it is split into line 4048 and line 4049. Line 4048 is directed as a low pressure side inlet flow into reverse osmosis unit H, which generally comprises reverse osmosis membrane arrangement or membrane 5020 defining a high pressure side 5020x and a low pressure side 5020y.

At line 4050, a low pressure side outlet flow from reverse osmosis unit H is shown directed into a low pressure side inlet flow for reverse osmosis unit D. Reverse osmosis unit D generally comprises reverse osmosis membrane arrangement or membrane 4051 defining a high pressure side 4051x and a low pressure side 4051y.

At line 4052, low pressure side outlet from reverse osmosis unit D is shown directed through reverse osmosis pump 4053 into line 4054, a high pressure side inlet line for reverse osmosis unit E.

Reverse osmosis unit E generally comprises a reverse osmosis membrane arrangement or membrane 4055 defining a high pressure side 4055x and a low pressure side 4055y.

Line 4003, the permeate outlet line from the system 4000, is a low pressure side outlet line from reverse osmosis unit E.

At 4056, a high pressure side concentrate outlet line from reverse osmosis unit E is shown directed through pressure reduction or pressure step-down unit 4057 and into line 4058 by which it is directed to high pressure side inlet line 4059 for reverse osmosis unit D. At 4060, a high pressure side concentrate outlet from reverse osmosis unit D is directed to joint 4061, where it joined with liquid in line 4063, which would generally comprise liquid from line 4049 after having been pressurized at pump 4062. This combined flow at line 4065 is directed as a high pressure side inlet flow to reverse osmosis unit H.

At 4066, a high pressure side concentrate outlet flow from reverse osmosis unit H is directed into high pressure side inlet flow line 4067 for reverse osmosis unit C.

At 4068, a high pressure side concentrate outlet from reverse osmosis unit C is shown directed to joint 4069, where it is combined with liquid in line 4070. Liquid in line 4070 comprises the liquid from line 4043 after being directed through reverse osmosis pump 4071. The combined line from joint 4069 is shown directed at line 4072 as the high pressure side concentrate inlet flow line to reverse osmosis unit G.

At 4075, high pressure side concentrate outlet flow from reverse osmosis unit G is shown, directed thereby to high pressure side inlet line 4076 for reverse osmosis unit B.

At 4077, a high pressure side concentrate outlet line for reverse osmosis unit B is shown directed to joint 4078, where it combined with liquid in line 4079. The liquid in line 4079 comprises liquid from line 4023 pressurized at reverse osmosis pump 4080. The combined stream at 4081 comprises a high pressure side concentrate inlet flow line to reverse osmosis unit F. At 4085, a high pressure side concentrate outlet flow from reverse osmosis unit F is shown. This liquid is directed through pump 4086, and then into high pressure side inlet line 4087 for reverse osmosis unit A. A high pressure side concentrate outlet from reverse osmosis unit A is shown directed to pressure reduction or step-down unit 4089, and into line 4002 as concentrate outlet from the system 4000.

In general terms, again, system 4000 of FIG. 13 is analogous to system 3000, FIG. 12, except for the introduction of reverse osmosis units F, G and H, one each positioned between two consecutive ones of reverse osmosis units A, B, C and D. Reverse osmosis units F, G and H are used to balance the concentration of the solution being added to the high pressure side of the system at the joints 4078, 4069, and 4061, with the concentration of the solution being bypassed from the low pressure side to the high pressure side of the system via pumps 4080, 4071 and 4062. This renders a more efficient system, with respect to overall use of energy, because a concentrated solution would not be diluted as would otherwise be the case in system 3000 (FIG. 12) at joints 3076, 3068 and 3061.

It is also noted that each of units A, B, C, D, F, G and H is operated with: a high pressure side (concentrate) inlet; a high pressure side (concentrate) outlet; a low pressure side inlet; and, a low pressure side (solvent) outlet. The final reverse osmosis unit E is not conducted with a low pressure side inlet, and comprises a final solvent-generating reverse osmosis unit.

It is noted that the principles described with respect to system 4000, FIG. 13 can be applied in a variety of alternate configurations, with alternate numbers of reverse osmosis units.

Indeed, it is noted that the principles of the systems of FIGS. 11-13 can be practiced with an alternate number of units and with solution flow entering or exiting the system at differing locations in the system. Further, some variations in pump locations and line direction can be accommodated without substantially varying from the principles. With respect to units F, G and H, FIG. 13, it is noted that one would expect that each of these could be a smaller or shorter reverse osmosis membrane unit in terms of membrane surface area (relative to unit A, B, C and D) as less permeate would generally need to be pushed from the higher pressure side of the system to the lower pressure side of the system through the reverse osmosis membrane of each of the units F, G and H.

V. Some General Comments and Observations

A. Principles and Techniques Relating to Reverse Osmosis Unit 26, FIG. 2A

Herein, as shown in FIG. 2A, a reverse osmosis unit is provided. The reverse osmosis unit includes: a reverse osmosis membrane arrangement; a high pressure side feed inlet; a low pressure side feed inlet; a high pressure side outlet; and, a low pressure side outlet. During operation of the reverse osmosis unit, the high pressure side outlet operates as a concentrate outlet relative to the system inlet feed 32; and, the low pressure side outlet provides for the outlet flow of dilute solution (purified solvent) relative to the system inlet feed 32, from the unit.

In selected example systems according the present disclosure, a reverse osmosis unit is configured for counter current flow with respect to a high pressure side flow and the low pressure side flow, during operation. In general terms, this references the fact the high pressure side inlet and the low pressure side inlet are at or near opposite ends of the reverse osmosis unit; and, the high pressure side outlet and the low pressure side outlet are at or near opposite ends of the reverse osmosis unit, although alternatives are possible.

Herein, reverse osmosis systems including at least one reverse osmosis unit in accord with the reverse osmosis characterization above, are provided. In a number of systems characterized herein, the reverse osmosis system includes at least two reverse osmosis units, each of the two including: a reverse osmosis membrane arrangement; a high pressure side feed inlet; a low pressure side feed inlet; a high pressure side outlet; and, a low pressure side outlet.

With respect to use of the reverse osmosis unit and system characterized above, a process or method for processing a solution is characterized herein. It is noted that the solution can comprise an original solution as characterized herein, although the solution being processed can comprise solution from another step (unit) of the process.

In a typical application, the process involves providing a reverse osmosis unit having: a reverse osmosis membrane arrangement; a high pressure side feed inlet; a low pressure side feed inlet; a high pressure side outlet; and, a low pressure side outlet.

The process further includes directing solution to be processed into the high pressure side inlet while also directing a solution (in some instances, the original solution to be processed and in other instances an alternate solution) into the low pressure side inlet, and conducting a reverse osmosis process across the reverse osmosis membrane arrangement between a high pressure side inlet feed stream and the low pressure side inlet feed stream.

Typically, the process is conducted under circumstances in which, for a selected reverse osmosis unit, the high pressure side pressure side inlet feed (stream) and the low pressure side inlet feed (stream) differ, if at all, in solute concentration by no more than 20%, usually no more than 15%, and in many instances by no more than 10%. Some examples are described herein, in which the high pressure side inlet feed (stream) and the low pressure side inlet feed (stream) have the same solute concentration.

B. Selected Additional Principles and Techniques Relating to, and Common to, Certain of the Example Systems According to certain aspects of the present disclosure, a process for, and equipment configured for, processing an original liquid/solute mixture into two process streams is provided. The two process streams generally comprise a system solvent or dilute solution outlet flow and a system concentrate solution outlet flow. The process generally comprises of a step of providing a (cascading) reverse osmosis system including at least:

(i) a first, final, solvent or dilute solution outlet-generating reverse osmosis membrane unit;

(ii) a first, final, concentrate outlet-generating reverse osmosis unit; and, (iii) an intermediate reverse osmosis membrane unit system comprising at lease one reverse osmosis unit.

In general, the process can include configuring the (cascading) reverse osmosis system for the following operation. That is, the process includes operating the reverse osmosis system to process the solution such that:

(a) Concentrate from the first, final, solvent or dilute solution outlet-generating reverse osmosis unit is directed into the intermediate reverse osmosis membrane unit system, as at least part of a feed stream thereto;
(b) Low pressure side outlet (dilute solution) flow from the intermediate reverse osmosis membrane unit system is directed into the first, final, solvent or dilute solution outlet-generating reverse osmosis unit as at least part of an inlet feed stream thereto;
(c) Concentrate from the intermediate reverse osmosis membrane unit system is directed into the first, final, concentrate outlet-generating reverse osmosis unit as at least part of an inlet feed stream thereto; and,
(d) Each reverse osmosis unit in the intermediate reverse osmosis membrane unit system is conducted with both a high pressure side inlet feed and a low pressure side inlet feed.

In general terms, each reverse osmosis unit that is operated with both a high pressure side inlet feed and a low pressure side inlet feed, is operated with a concentrate difference between the solution concentration on the high pressure and low pressure side of the membrane (concentration of solute) to the maximum extent reasonably allowable, for pressure available and structural integrity of the reverse osmosis unit.

In systems and processes in accord with the general techniques herein, each reverse osmosis unit in the intermediate reverse osmosis membrane unit system is typically operated with a solute concentration directed into the high pressure side inlet feed thereto within 20% of solute concentration, (typically within 15% and usually within 10%), of a solute concentration at a low pressure inlet feed thereto. In some instances the inlet feed to the high pressure side and to the low pressure of a selected reverse osmosis unit in the intermediate reverse osmosis membrane unit system, are the same, with respect to concentration of solute.

Further, each reverse osmosis unit in the intermediate reverse osmosis membrane unit system provides a high pressure side concentrate solution outlet flow and low pressure side dilute solution outlet flow; and, the original solution to be processed is directed into at least a selected one (or more) of the: first, final, solvent or dilute solution outlet-generating reverse osmosis membrane unit; the intermediate reverse osmosis membrane unit system; and, the first, final, concentrate outlet-generating reverse osmosis unit.

C. Further Characterizations of Selected Techniques, Processes and Arrangements with Respect to Certain Example Systems In the arrangements of each of FIGS. 3, 5 and 6, each of which is in accord with the characterizations in section B above, the arrangement is configured for a processes to be conducted in a manner such that the intermediate reverse osmosis membrane unit system comprises at least three (3) reverse osmosis units organized having: a most permeate flow-direction reverse osmosis unit; a most concentrate flow-direction reverse osmosis unit; and, at least one central unit.

Further, in the arrangements and processes of FIGS. 3, 5 and 6, the equipment is configured for a step of operating that includes:
(a) Directing the original solution to be processed into both the high pressure and the low pressure side of a selected central unit;
(b) Directing concentrate from the selected central unit ultimately into the most concentrate flow-direction reverse osmosis unit of the intermediate reverse osmosis membrane unit system;
(c) Directing concentrate from the most concentrate flow-direction reverse osmosis unit of the intermediate reverse osmosis membrane unit system into the first, final, concentrate outlet-generating reverse osmosis unit;
(d) Directing low pressure side dilute solution outlet flow from the selected central unit ultimately into the most permeate flow-direction reverse osmosis unit of the intermediate reverse osmosis membrane unit system; and,
(e) Directing low pressure side dilute solution outlet flow from the most permeate flow-direction reverse osmosis unit of the intermediate reverse osmosis membrane unit system into the first, final, solvent or dilute solution outlet-generating reverse osmosis unit.

Further, in the systems of, and practices according to, the arrangement of FIGS. 3, 5 and 6, a process in accord with above characterizations in this section is facilitated wherein the step of operating includes:
(a) Directing a low pressure side outlet flow (dilute solution) from the first, final, concentrate outlet-generating reverse osmosis unit into the most concentrate flow-direction reverse osmosis unit of the intermediate reverse osmosis membrane unit system;
(b) Directing low pressure side outlet flow (dilute solution) from the most concentrate flow-direction reverse osmosis unit of the intermediate reverse osmosis membrane system ultimately into the most permeate flow-direction reverse osmosis unit of the intermediate reverse osmosis membrane system;
(c) Directing low pressure side outlet flow (dilute solution) from the most permeate flow-direction reverse osmosis unit of the intermediate reverse osmosis system into the first, final, solvent or dilute solution outlet-generating reverse osmosis membrane unit;
(d) Directing a high pressure side outlet flow (concentrate or concentrate solution) from the first, final, solvent or dilute solution outlet-generating reverse osmosis unit into the most permeate flow-direction reverse osmosis unit of the intermediate reverse osmosis membrane unit system;
(e) Directing concentrate from the most permeate flow-direction reverse osmosis unit of the intermediate reverse osmosis unit membrane system ultimately into the most concentrate flow-direction reverse osmosis unit of the intermediate reverse osmosis membrane unit system; and,
(f) directing concentrate from the most concentrate flow-direction reverse osmosis unit of the intermediate reverse osmosis membrane unit system the first, final, concentrate outlet-generating reverse osmosis unit.

In accordance with the processes characterized as above, conducted for example, in the example systems of FIGS. 3, 5 and 6, the process and arrangement can be configured such that:
(a) The intermediate reverse osmosis membrane unit system comprises multiple reverse osmosis membrane units; and,
(b) the process comprises operating the intermediate reverse osmosis membrane unit system in complete series flow with respect to low pressure side outlet flow from the first, final, concentrate outlet-generating reverse osmosis unit to the first, final, solvent or dilute solution outlet-generating reverse osmosis unit. By the term "complete series flow" in this context, it is meant that the flow is directed through each unit of the reverse osmosis membrane unit system, in series.

(c) Further, the original solution can be directed into one of the reverse osmosis units of the intermediate reverse osmosis membrane system.

D. Certain Selected Features and Processes in Accord with the Systems of FIGS. 3 and 5

In the specific example systems and processes characterized above, in connection with FIGS. 3 and 5, a process in accord with the previous characterizations is provided in a manner involving operating the intermediate reverse osmosis membrane unit system specifically with five (5) reverse osmosis units:

(a) in complete concentrate (concentrate solution) flow series from the most permeate flow-direction unit of the intermediate reverse osmosis membrane unit system to the most concentrate flow-direction unit of the intermediate reverse osmosis membrane unit system; and, (b) in complete dilute solution flow series from the most concentrate flow-direction reverse osmosis unit of the intermediate reverse osmosis membrane unit system to the most permeate flow-direction reverse osmosis unit of the intermediate reverse osmosis membrane unit system.

Further, in the arrangements and processes exemplified in FIGS. 3 and 5, the system is configured for conducting the process by operating the most concentrate flow-direction reverse osmosis unit of the intermediate reverse osmosis membrane system with:

(a) a high pressure side inlet flow comprising a combination of:
(i) concentrate outlet flow from a first next permeate flow-direction reverse osmosis unit relative to the most concentrate flow-direction reverse osmosis unit of the intermediate reverse osmosis membrane unit system; and,
(ii) low pressure side dilute solution outlet flow from the first, final, concentrate outlet-generating reverse osmosis unit; and, (b) a low pressure side inlet flow comprising low pressure side dilute solution outlet flow from the first, final, concentrate outlet-generating reverse osmosis unit.

In an example process, the high pressure side inlet flow concentration and the low pressure inlet flow concentration, for the most concentrate flow-direction reverse osmosis unit of the intermediate reverse osmosis membrane system, is conducted with streams consisting essentially of the flow concentrations identified.

Further, the step of operating the process, in the system in accord with FIGS. 3 and 5, is operated with the first next permeate flow-direction reverse osmosis unit, relative to the most concentrate flow-direction reverse osmosis unit of the intermediate reverse osmosis membrane unit system, with:

(a) a high pressure side inlet flow comprising a combination of:
(i) concentrate flow from a second next permeate flow-direction reverse osmosis unit from the most concentrate flow-direction reverse osmosis unit of the intermediate osmosis membrane system; and,
(ii) low pressure side dilute solution outlet flow from the most concentrate flow-direction reverse osmosis unit of the intermediate reverse osmosis membrane unit system; and, (b) a low pressure side inlet flow comprising low pressure side dilute solution outlet flow from the most concentrate flow-direction reverse osmosis unit of the intermediate reverse osmosis membrane system.

For the particular processes and systems of FIGS. 3 and 5, the high pressure side inlet flow and the low pressure side inlet flow consist essentially of the flows characterized.

Further, the systems of FIGS. 3 and 5 are configured for operation in accord with the principles herein, including a step of operating the second next permeate flow-direction reverse osmosis membrane unit relative to the most concentrate flow-direction reverse osmosis unit of the intermediate reverse osmosis membrane unit system, with:

(a) a high pressure side inlet flow comprising a combination of:
(i) original solution to be processed;
(ii) low pressure side dilute solution outlet flow from the first next permeate flow-direction reverse osmosis unit relative to the most concentrate flow-direction reverse osmosis unit of the intermediate reverse osmosis unit system; and,
(iii) concentrate from a third next permeate flow-direction reverse osmosis membrane unit relative to the most concentrate flow-direction reverse osmosis unit of the intermediate reverse osmosis membrane unit system; and, (b) a low pressure side inlet flow comprising a combination of:
(i) original solution to be processed; and,
(ii) low pressure side outlet flow relative to the first next permeate flow-direction reverse osmosis unit, relative to the most concentrate flow-direction reverse osmosis unit of the intermediate reverse osmosis membrane unit system.

Typically the high pressure side inlet flow and the low pressure side inlet flow for the second next permeate flow-direction reverse osmosis membrane unit relative to the most concentrate flow-direction reverse osmosis unit of the intermediate reverse osmosis membrane unit system consist essentially of the flows characterized.

Still further, a system in accord with either FIGS. 3 and 5 can generally be characterized as including features for an operation involving operating the third next permeate flow-direction reverse osmosis unit, relative to the most concentrate flow-direction reverse osmosis unit in the intermediate reverse osmosis membrane unit system, with:

(a) a high pressure side inlet flow comprising a combination of:
(i) low pressure side dilute solution outlet flow from a low pressure side of the second next permeate flow-direction reverse osmosis unit, relative to the most concentrate flow-direction unit of the intermediate reverse osmosis membrane unit system; and,
(ii) concentrate outlet flow from a high pressure side of the most permeate flow-direction reverse osmosis unit of the intermediate reverse osmosis membrane unit system; and, (b) a low pressure side inlet flow comprising:
(i) low pressure side dilute solution outlet flow from a low pressure side of the second next permeate flow-direction reverse osmosis unit, relative to the most concentrate downstream unit of the intermediate reverse osmosis membrane unit system.

Typically the high pressure side inlet flow concentration and the low pressure side inlet flow, of the third next permeate flow-direction reverse osmosis membrane unit, relative to the most concentrate flow-direction reverse osmosis unit of the intermediate reverse osmosis membrane unit system, consist essentially of the flows identified.

Further, the systems characterized in either of FIGS. 3 and 5 and operation of them, can be characterized as being configured for operating the most permeate flow-direction reverse osmosis unit of the intermediate reverse osmosis membrane unit system, with:
(a) a high pressure side inlet flow comprising a combination of:
(i) low pressure side dilute solution outlet flow from the third next permeate flow-direction reverse osmosis unit, relative to the most concentrate flow-direction reverse osmosis unit of the intermediate reverse osmosis unit system; and,
(ii) concentrate outlet from the first, final, solvent outlet-generating reverse osmosis membrane unit; and,
(b) a low pressure side inlet flow comprised of low pressure side outlet (dilute solution) flow from the third next permeate flow-direction reverse osmosis unit, relative to the most concentrate flow-direction unit of the intermediate reverse osmosis membrane unit system.

In a typical process conducted with the systems of FIGS. 3 and 5, the high pressure side inlet flow and low pressure side inlet flow, for the most permeate flow-direction reverse osmosis unit of the intermediate reverse osmosis unit system, consist essentially of the flows concentrations characterized.

E. Selected Characteristics of a System for, and Process Conducted in Accord with, FIG. 6

In the system characterized herein in connection with FIG. 6, and operation of that system, the system is generally configured for operating the intermediate reverse osmosis membrane system with four (4) reverse osmosis units:
(i) In concentrate flow series from a most permeate flow-direction reverse osmosis unit of the intermediate reverse osmosis membrane system to the most concentrate flow-direction reverse osmosis unit of the intermediate reverse osmosis membrane unit system; and,
(ii) In dilute solution flow series from the most concentrate flow-direction reverse osmosis unit of the intermediate reverse osmosis membrane unit system to the most permeate flow-direction reverse osmosis unit of the intermediate reverse osmosis membrane unit system.

Further, the system of FIG. 6 can be characterized as configured for, and to be operated in accord with:
(a) Operating the first, final, concentrate outlet-generating reverse osmosis unit with a high pressure inlet flow and a low pressure side inlet flow comprising (and typically consisting essentially of) the same inlet solution, in terms of concentrate solute; and,
(b) Operating the first, final, dilute solution outlet-generating reverse osmosis membrane unit with a high pressure side inlet feed and a low pressure inlet feed comprising (and typically consisting essentially of) the same inlet solution, in terms of concentration solute.

F. Some Specific Configurations and Operational Features Characterized Herein in Connection with the System of FIG. 7

Herein, the system of FIG. 7 can be characterized as configured for operation of a process wherein the intermediate reverse osmosis membrane unit system comprises two (2) reverse osmosis membrane units in the form of:
(a) a most concentrate flow-direction reverse osmosis membrane unit; and,
(b) a most permeate flow-direction reverse osmosis membrane unit.

Further, the system can be characterized as a process that includes operating the first, final, dilute solution outlet-generating reverse osmosis membrane unit with a high pressure side inlet flow comprising low pressure side dilute solution outlet flow from the most permeate flow-direction reverse osmosis unit of the intermediate reverse osmosis membrane unit system.

Indeed the process can be characterized as operating the first, final, dilute solution outlet-generating reverse osmosis membrane unit with a high pressure side inlet flow consisting essentially of the flows characterized.

Further the process can be characterized as operating the most permeate flow-direction reverse osmosis unit of the intermediate reverse osmosis membrane system with: both a high pressure side inlet flow and a low pressure side inlet flow having the same concentration in solute, and each comprising a combination of:
(a) Concentrate outlet flow from the first, final, dilute solution outlet-generating reverse osmosis unit;
(b) Original solution to be processed; and,
(c) Low pressure side dilute solution outlet flow from the most concentrate flow-direction reverse osmosis unit of the intermediate reverse osmosis membrane unit system.

This specific process is described herein in connection with FIG. 7 as operating the most permeate flow-direction reverse osmosis membrane unit in the intermediate reverse osmosis membrane unit system with the high pressure side inlet flow and the low pressure side inlet flow consisting essentially of the flows characterized.

The system of FIG. 7 can also be characterized as configured for operating the most concentrate flow-direction reverse osmosis unit, of the intermediate reverse osmosis membrane unit system, with: both a high pressure side inlet flow and a low pressure inlet flow having the same concentration, in terms of solute concentration, and comprising a combination of:
(a) Concentrate outlet flow from the most permeate flow-direction reverse osmosis unit of the intermediate reverse osmosis membrane unit system; and,
(b) Low pressure side dilute solution outlet flow from the first, final, concentrate outlet-generating reverse osmosis unit.

Further, the step of operating the most concentrate flow-direction reverse osmosis membrane unit of the intermediate reverse osmosis membrane unit system can be characterized as operating both the high pressure side inlet flow and the low pressure side inlet flow with flows consisting essentially of the flows characterized.

Further, the system of FIG. 7 can be characterized as configured for operating the first, final, concentrate outlet-generating reverse osmosis unit with both a high pressure side inlet flow and a low pressure side inlet flow having the same concentration, in solute, comprising concentrate outlet flow from the most concentrate flow-direction reverse osmosis unit of the intermediate reverse osmosis membrane unit system.

The specific example system of FIG. 7 can be characterized as configured for operating the first, final, concentrate outlet-generating reverse osmosis membrane unit with both a high pressure side inlet flow and a low pressure side inlet flow consisting essentially of the flows characterized.

G. Selected Specific Characterizations of Systems and Processes in Accord with FIG. 8

In addition to the selected characterizations directed to the assembly and process in FIG. 8 characterized above, the assembly of FIG. 8 can be characterized as configured for operation of a process wherein the intermediate reverse osmosis membrane unit system comprises two (2) reverse osmosis units comprising a most permeate flow-direction reverse osmosis unit and a most concentrate flow-direction reverse osmosis unit.

The process can be characterized as conducted with a high pressure inlet feed to the first, final, solvent outlet-generating reverse osmosis unit comprising a combination of:

(a) Original solution; and, (b) Low pressure side dilute solution outlet flow from the most permeate flow-direction reverse osmosis unit of the intermediate reverse osmosis membrane unit system.

Further, the process can be characterized as conducted with a high pressure side inlet feed and a low pressure side inlet feed to the most permeate flow-direction reverse osmosis unit of the intermediate reverse osmosis membrane unit system being the same in solute concentration and comprising a combination of:

(a) Concentrate outflow from the first, final, solvent outlet-generating reverse osmosis membrane unit; and, (b) Low pressure side dilute solution outlet flow from the most concentrate flow-direction reverse osmosis unit of the intermediate reverse osmosis membrane unit system.

Further, the high pressure side inlet feed and the low pressure side inlet feed to the most concentrate flow-direction reverse osmosis unit, of the intermediate reverse osmosis membrane unit system, can be characterized as being the same in solute concentration and comprising, in combination:

(a) Concentrate outlet flow from the most permeate flow-direction reverse osmosis unit of the intermediate reverse osmosis membrane unit system; and, (b) Low pressure side dilute solution outlet flow from the first, final, concentrate outflow-generating unit.

Finally, a high pressure side inlet feed and a low pressure side inlet feed to the first, final, concentrate-generating reverse osmosis unit can be characterized as being the same in solute concentration and comprising concentrate from the most concentrate flow-direction reverse osmosis unit of the intermediate reverse osmosis membrane unit system.

In typical applications of the principles characterized above in connection with FIG. 8, the assembly is configured so that the process is conducted with the various flows identified herein above consisting essentially of the flows characterized.

H. Further Specific Characterizations of Equipment and Processes Related to the System of FIGS. 9 and 10

Herein above, it was characterized that the reverse osmosis units of FIG. 8, can be configured with alternate feed lines, for still further application and processes according to the present disclosure. These characterizations are exemplified, by the systems of FIGS. 9 and 10.

Referring first to the system of FIG. 9, when operated a process is conducted involving an intermediate reverse osmosis unit system comprising two reverse osmosis units comprising a most permeate flow-direction reverse osmosis unit and a most concentrate flow-direction reverse osmosis unit. Further, the process is conducted with:

(a) a high pressure side inlet feed to the first, final, dilute solution-outlet generating reverse osmosis unit comprising a combination of:
  (i) original solution; and,
  (ii) a low pressure side dilute solution outlet flow from the most permeate flow-direction reverse osmosis unit of the intermediate reverse osmosis membrane unit system;

(b) a high pressure side inlet feed to the most permeate flow-direction reverse osmosis unit of the intermediate reverse osmosis membrane system comprising a combination of:
  (i) a low pressure side dilute solution outlet flow from the most concentrate flow-direction reverse osmosis unit of the intermediate reverse osmosis unit system; and,
  (ii) a high pressure side concentrate outlet flow from the first, final, dilute solution outlet-generating reverse osmosis unit;

(c) a low pressure side inlet feed to the most permeate flow-direction reverse osmosis unit of the intermediate reverse osmosis unit system comprising concentrate outlet flow from the first, final, dilute solution outlet-generating reverse osmosis unit;

(d) a low pressure side inlet feed to the most concentrate flow-direction reverse osmosis unit of the intermediate reverse osmosis membrane unit system comprising concentrate outlet flow from the most permeate flow-direction unit of the intermediate reverse osmosis membrane unit system;

(e) a high pressure side inlet feed to the most concentrate flow-direction reverse osmosis unit of the intermediate reverse osmosis membrane unit comprising a combination of:
  (i) a low pressure side dilute solution outlet flow from the first, final, concentrate-generating reverse osmosis unit; and,
  (ii) a high pressure side concentrate outlet flow from the most permeate flow-direction unit of the intermediate reverse osmosis membrane unit system; and, (f) a high pressure side inlet feed and low pressure side inlet feed to the first, final, concentrate-generating reverse osmosis unit being the same in solute concentrate and each comprising concentrate outlet flow from the most concentrate flow-direction unit of the intermediate reverse osmosis membrane unit system.

In the system of FIG. 9, typically each of the flows consists essentially of the flow characterized above.

In FIG. 10, a process or system is also depicted wherein the intermediate reverse osmosis membrane unit system comprises (2) reverse osmosis units comprising a most permeate flow-direction reverse osmosis unit and a most concentrate flow-direction reverse osmosis unit.

Further, when the system of FIG. 10 is operated, a process is conducted with:

(a) a high pressure side inlet feed to the first, final, dilute solution outlet-generating reverse osmosis unit comprising a combination of:
  (i) original solution; and,
  (ii) a low pressure side dilute solution outlet flow from the most permeate flow-direction reverse osmosis unit of the intermediate reverse osmosis membrane unit system;

(b) a low pressure side inlet feed to the most permeate flow-direction reverse osmosis unit of the intermediate reverse osmosis unit system comprising a low pressure side dilute solution outlet flow from the most concentrate flow-direction reverse osmosis unit of the intermediate reverse osmosis unit system;

(iv) a high pressure side inlet feed to the most permeate flow-direction reverse osmosis unit of the intermediate reverse osmosis unit system comprising concentrate outlet flow from the first, final, dilute solution outlet-generating reverse osmosis unit;

(v) a high pressure side inlet feed to the most concentrate flow-direction reverse osmosis unit of the intermediate reverse osmosis membrane unit system comprising of concentrate outlet flow from the most permeate flow-direction unit of the intermediate reverse osmosis membrane unit system;

(vi) a low pressure side inlet feed to the most concentrate flow-direction reverse osmosis unit of the intermediate reverse osmosis membrane unit system comprising of low pressure side dilute solution outlet flow from the first, final, concentrate-generating reverse osmosis unit; and, (vii) a high pressure side inlet feed and a low pressure side inlet feed to the first, final, concentrate-generating reverse osmosis unit being the same in solute concentrate and each comprising concentrate outlet flow from the most concentrate flow-direction unit of the intermediate reverse osmosis membrane unit system.

In a typical application of the techniques described herein in connection with FIG. 10, each feed consists essentially of the flow characterized above.

I. Further Specific Characterizations of Equipment and Processes as Related to the System of FIG. 4.

In addition to being configured for conduct of process steps as characterized herein above with respect to FIG. 4, the system of FIG. 4 can be further characterized as configured for a process involving features and characteristics described in this section.

For example, the assembly of FIG. 4 can be characterized as being configured such that the reverse osmosis system includes two (2) final outlet-generating reverse osmosis units, characterized herein as a first and a second final concentrate outlet-generating reverse osmosis unit, respectfully.

Further, the process of FIG. 4 can be characterized as conducted in a system that comprises an intermediate reverse osmosis membrane unit system that includes four (4) reverse osmosis units including a most permeate flow-direction reverse osmosis unit. Further, the intermediate reverse osmosis membrane unit system can be characterized as including a first unit subsystem and a second unit subsystem.

(a) The first unit subsystem can be characterized comprising one reverse osmosis membrane unit, termed herein as a first subsystem reverse osmosis unit.

(b) The second subsystem can be characterized is including or comprising two second subsystems reverse osmosis units, characterized herein as a second subsystem reverse osmosis unit and a third subsystem reverse osmosis unit.

The process characterized is conducted with:

(a) concentrate outflow from the first, final, dilute solution outlet-generating reverse osmosis unit directed in series:
  (A) to the most permeate flow-direction reverse osmosis unit of the intermediate unit system;
  (B) through the first reverse osmosis unit of the first unit subsystem; and,
  (C) through the first, final, concentrate outlet-generating reverse osmosis unit; and, (b) low pressure side dilute solution outlet flow from the second final concentrate outlet-generating reverse osmosis unit directed in series:
  (i) through the first, final, concentrate outlet-generating reverse osmosis unit;
  (ii) through the third subsystem osmosis unit of the second unit subsystem;
  (iii) through the first subsystem reverse osmosis unit of the first unit subsystem;
  (iv) through the second subsystem reverse osmosis unit of the second unit subsystem;
  (v) through the most permeate flow-direction reverse osmosis unit of the intermediate reverse osmosis membrane unit system; and,
  (vi) through the first, final, dilute solution outlet-generating reverse osmosis unit.

Further, the system of FIG. 4 can be characterized as having an original solution feed being directed into the first subsystem reverse osmosis unit, of the first subsystem.

In addition, the process of FIG. 4 can be characterized as including an inlet flow feed to each of the reverse osmosis units of the intermediate reverse osmosis membrane unit system, which is the same for each selected unit, in solute concentration. By this it is not meant the same feed is directed to every unit, but rather to each selected unit a high pressure side inlet feed and the low pressure side inlet feed is the same, in solute concentration.

Further, a characterization of the assembly of FIG. 4 is that it is configured for conduct of a process wherein:

(a) inlet flow feed to the most permeate flow-direction reverse osmosis unit of the intermediate reverse osmosis membrane unit system comprises a combination of:
  (i) concentrate outlet flow from the first, final, dilute solution outlet-generating reverse osmosis unit; and,
  (ii) low pressure side dilute solution outlet flow from the second subsystem reverse osmosis unit, of the second unit subsystem;

(b) inlet flow to the second subsystem reverse osmosis unit of the second subsystem comprises a low pressure side dilute solution outlet flow from the first subsystem reverse osmosis unit of the first subsystem;

(c) inlet to the first subsystem reverse osmosis unit of the first unit subsystem comprises a combination of:
  (i) original solution;
  (ii) concentrate outflow from the most permeate flow-direction reverse osmosis unit of the intermediate reverse osmosis membrane unit system; and,
  (iii) low pressure side dilute solution outlet flow from the third subsystem reverse osmosis unit of the second unit subsystem;

(d) the third subsystem reverse osmosis unit of the second subsystem is operated with flow comprising a combination of:
  (i) concentrate outflow from the second subsystem reverse osmosis unit of the second unit subsystem; and,
  (ii) low pressure side dilute solution outlet flow from the second final concentrate-generating reverse osmosis unit; and, (e) the second, final, concentrate-generating reverse osmosis unit being operated with flow comprising low pressure side outlet flow from the first, final, concentrate-generating reverse osmosis unit; and,
  (ii) concentrate outflow from the first reverse osmosis unit of the first subsystem.

In a typical process in accord with the system of FIG. 4, flows consist essentially of flows characterized, and, again, the same flow, for each selected unit, is provided to the high pressure side and low pressure side.

J. Further Specific Characterizations of Equipment and Processes Relating to the System of FIG. 9A.

According to FIG. 9A, a process of conducting of reverse osmosis processing of an original stream is provided which includes a step of providing reverse osmosis unit system including at least: a first reverse osmosis unit having a reverse osmosis membrane arrangement, a high pressure side inlet feed, a low pressure side feed inlet, a high pressure side outlet and a low pressure side outlet; a second reverse osmosis unit having reverse osmosis membrane arrangement, a high pressure side feed inlet, a low pressure side feed inlet, a high pressure side outlet and a low pressure outlet; and, a third reverse osmosis unit having a reverse osmosis membrane arrangement, a high pressure side feed inlet, a high pressure side outlet and a low pressure side outlet. Of course the third reverse osmosis unit can also include a low pressure side feed inlet and the system can include still further units.

The process generally involves the reverse osmosis system with:
 (i) original solution feed into the high pressure side feed inlet of the first reverse osmosis unit;
 (ii) low pressure outlet flow from the first reverse osmosis directed into the second reverse osmosis unit of the high pressure side inlet feed;
 (iii) high pressure side outlet flow from the second reverse osmosis unit directed into low pressure side inlet feed of the first reverse osmosis unit;
 (iv) a low pressure side outlet from the second reverse osmosis unit directed into the high pressure side inlet of the third reverse osmosis unit;
 (v) no original solution feed into the low pressure side of the first reverse osmosis unit; and,
 (vi) no low pressure side outlet flow from the first reverse osmosis unit directed into the low pressure side inlet feed to the second reverse osmosis unit.

Conducting the process in the manner characterized above, provides for isolation of a flow loop involving the low pressure side of the first reverse osmosis unit and a high pressure side of the second reverse osmosis unit, to advantage. For example, the high pressure side inlet feed to the high pressure side inlet of the second reverse osmosis unit can be different in solute, from a low pressure side inlet feed to the second reverse osmosis unit. By "different solute" in this context, it is meant that a component of the solute in the high pressure side can be different from a component of the solute in the low pressure side. For example, a component can be present on the high pressure side which is absent on the low pressure side, or present in the low pressure side which is absent from the high pressure side, or overall solute composition can be different between the two with respect to composition and relative composition, not merely concentration. Also, high pressure side inlet feed to the high pressure side inlet of the second reverse osmosis unit can be different in at least one of solute and solvent from a low pressure side inlet feed to the second reverse osmosis unit. However, it should be noted that if initiated and used with different solvents, at some point in the process a solvent will tend to migrate across the membrane from the high pressure side toward the low pressure side.

Similar techniques can be used for other isolating of loops within the reverse osmosis unit system.

K. Further Specific Characterizations of Equipment and Processes Relating to the Systems of FIGS. 11-13

According to FIGS. 11-13, a process of conducting a reverse osmosis processing of an original stream is provided which include steps in which: the intermediate reverse osmosis membrane unit system is operated with multiple reverse osmosis membrane units; and, the intermediate reverse osmosis membrane unit system is operated with no pressure reduction, or pressure step-down step, conducted in liquid flow paths between any of the reverse osmosis membrane units in the intermediate reverse osmosis membrane unit system. This can lead to energy savings advantage as characterized above.

With respect to the specific example system of FIG. 12, the system is configured for, and the process is conducted with, a low pressure side outlet flow from at least one reverse osmosis membrane unit in the intermediate reverse osmosis membrane unit system being split into two streams: (a) a first stream which is directed into a low pressure side inlet stream of a next permeate flow direction reverse osmosis membrane unit; and, (b) a second stream which is pressurized and is then directed into a high pressure side outlet stream for the next upstream, concentrate flow direction, reverse osmosis unit. Indeed, a process is shown in FIG. 12 which these steps are conducted for more than one reverse osmosis membrane unit in the intermediate reverse osmosis membrane unit system.

In the variation of FIG. 13, the system is configured for, and the process is conducted with, a low pressure side outlet flow from at least one reverse osmosis membrane unit in the intermediate reverse osmosis membrane unit system being split into two streams: (a) first stream which is directed into a low pressure side inlet stream of the next permeate direction reverse osmosis membrane unit; and, (b) a second stream which is pressurized and is then directed into a high pressure side inlet stream for the next upstream concentrate flow-direction reverse osmosis membrane. Indeed, the process is shown in FIG. 13 in which these steps are conducted for more than one reverse osmosis membrane unit in the intermediate reverse osmosis system.

L. Further Comments

It is noted that a variety of systems and processes are characterized herein, for conduct of a cascading reverse osmosis process. The techniques can be applied in a variety of alternate processing equipment configurations, while obtaining advantage of the characterizations provided herein.

It is noted that a variety of specific equipment locations and configurations (pump locations, pressure reducer locations and line directions) are indicated in the figures. Alternate locations and configurations, for some applications, are feasible, while maintaining a practice of general processing techniques according to the present disclosure.

In the next section, a hypothetical example is provided, indicating an example of the utility of the principles according to the present disclosure.

VII. A Hypothetical Example (Using the System of FIG. 7)

This engineered example is provided to illustrate one of the many potential uses of the invention and to illustrate the advantages of this method compared to the existing conventional, prior art, methods. The example is based on the system of FIG. 7.

For this example assume a fruit juice is being processed to a high concentration suitable for the frozen concentrate market; and assume the incoming juice stream has a starting fructose sugar concentration of 17.36% by weight. 17.36% sugar by weight corresponds to a specific gravity of approximately 1.0505 and is a typical sugar concentration level for fresh pressed apple, or other juices.

For the example assume the juice will be processed at a fixed temperature of 68° F. through all stages in the process and the pressure drop in various the conduits carrying solution will be negligible.

For the example it has been assumed that each reverse osmosis (RO) unit will have a solution flow related pressure drop of 15 feet of water column on both the high pressure and low pressure sides of the membrane. It is also assumed that the efficiency of each pump is 87% and that each motor is 92.5% efficient. Each pressure letdown device is assumed to be a turbine style power regenerative device which will be used to assist in the pressurization function that is being provided by each pressurization pump.

Also, it is assumed that the efficiency for each pressure letdown device is 77% effectiveness at converting the available pressure differential and flow rate into usable power. The example also assumes a driving differential pressure across the membrane arrangement in each reverse osmosis (RO) unit at a level which is 40% higher than the difference in osmotic pressures that would be ideally required for the two solutions exiting the high and low pressure sides of the RO unit. This level of extra pressure is typical of conventional RO systems as a means of providing high permeate flux rates and to also overcome the concentration gradients which will inherently exist in the solutions near the membrane wall. This engineered example is described assuming a steady state, steady flow condition.

The solution (juice) to be processed enters the system 700 via conduit 701 at a concentration of 17.36% fructose by weight and is pressurized by pump 705 from an entering pressure in conduit 701 of zero Pounds per Square Inch Gage (PSIG) to a pressure of 678 PSIG at a flow rate of 1,210 pounds per minute (#/min) of solution in line 706. The solution comprises 210 #/min of solute (fructose) and 1000 #/min of solvent (water). The shaft power required at the assumed efficiencies would be 66 break horsepower (BHP). The solution is then conducted via conduit 706 to where it combines with flows of solution of the same concentration (17.36% concentration by weight) leaving reverse osmosis (RO) unit D and reverse osmosis (RO) unit B via conduits 780 and 742, respectively. The flow of solution from RO D in conduit 780, after pressurization at pump 781 contains 270 #/min of solute (fructose) and 1287 #/min of solvent (water). The flow of solution from RO B in conduit 742 contains 120 #/min of solute (fructose) and 573 #/min of solvent (water).

The combined flow of solution flows at a rate of 3,460 #/min at 17.36% concentration by weight to joint 707 where it splits off into two separate streams that carry solutions of equal concentration toward each side of a common membrane arrangement via conduits 708, 709. Conduit 708 conducts 55% of the solution flow to the high pressure side of reverse osmosis (RO) unit A. Conduit 704 conducts 45% of the solution flow to pressure letdown device 713 where it is then conducted via conduit 714 to the low pressure side of reverse osmosis (RO) unit A. At the assumed efficiencies pressure letdown device 713 would be expected to produce 46 BHP and be utilized in assistance of RO pump 771. Because the solution's concentration entering RO unit A on the high pressure side 715*x* of the membrane 715 is the same as the solution's concentration on the low pressure side 715*y* of the membrane 715, a flux of permeate/solvent will be established through the membrane 715 causing the solution concentration to rise in solute per unit of solvent on the high pressure side 715*x* of the membrane 715 as it travels through reverse osmosis (RO) unit A, while at the same time causing a fall in solution concentration (or a solution dilution with permeate/solvent) as it travels through the low pressure side 715*y* of reverse osmosis (RO) unit A. According to this engineered example the pressure on the high side 715*x* of reverse osmosis (RO) unit A will be 678 PSIG and the pressure on the low pressure side of 715*y* reverse osmosis (RO) unit A will be reduced, via pressure dropping device 713 to 133 PSIG. This results in a net differential pressure across the membrane 715 of 545 PSIG. The calculated permeate through the membrane 715 at the assumptions outlined in this engineered example is 704 #/min of solvent (water). This permeate is thus combined with the solution traveling through the low pressure side 715*y* of reverse osmosis (RO) unit A and exits unit A via conduit 770.

The solution exiting unit A via conduit 770 is now 11.94% fructose by weight and has a calculated osmotic pressure of 247 PSIG. The solution exiting unit A via conduit 720 is now 27.6% fructose by weight and has a calculated osmotic pressure of 636 PSIG. By conservation of mass flow, the solutions entering and exiting on either side the membrane 715 contain the same amount of fructose flow since only permeate is allowed to permeate through the membrane. The solution on the low pressure side 715*y* of the membrane 715 is thereby getting diluted as its total mass flow increases with the addition of the permeate through the membrane 715, while the solution on the high pressure side 715*x* is being concentrated as the total mass flow on that side of the membrane is decreasing as a result of the lost permeate/solvent through the membrane to the low pressure side 715*y*. The flow of solution exiting unit A via conduit 770 contains 270 #/min of solute and 1991 #/min of solvent. The flow solution exiting unit A via conduit 720 contains 330 #/min of solute and 869 #/min of solvent.

The solution of increased concentration leaving the high pressure side 715*x* of unit A is then conducted via conduit 720 towards unit B and continues as described in the paragraphs for unit B (FIG. 7). The decreased concentration solution leaving the low pressure side 715 of unit A is then conducted via conduit 770 to RO pump 771 as it travels towards unit D. Pump 771 conveys and pressurizes the solution from a pressure of 127 PSIG to a pressure of 520 PSIG requiring 71 shaft BHP.

Solution flows via conduit 773 from pump 771 to the high pressure side 775*x* of unit D at a concentration of 11.95% fructose by weight at a pressure of 520 PSIG. The pressure on the low pressure side of unit D for this example is assumed to be zero PSIG. The permeate exiting out of the system via conduit 778 is assumed to be pure solvent (water). The flow rate of permeate through the membrane 775, of unit D, is calculated based on a total mass flow balance of the system to be 704 #/min. At this rate of permeate at 778 out of the system 700; the concentration of solution exiting unit D via conduit 780 would be 17.36% by weight which matches the concentration of solution entering the system via conduits 701 and 706. In this engineered example the system is balanced such that the concentration of solutions mixing together from conduits 742, 706 and 780 to form the flow to joint 707 are all of the same concentration. The osmotic pressure of the solution exiting unit D via conduit 780 is calculated to be 371 PSIG. The pressure on this side of the membrane 775 is 520 PSIG (40% more than the calculated osmotic pressure). This pressure differential causes the desired flux of permeate/solvent through the membrane in unit D. The flow of solution exiting unit D via conduit 780 contains 270 #/min of solute and 1,287 #/min of solvent.

The solution of increased concentration leaving the high pressure side 775*x* of unit D is then conducted conduit 780 to 781 as it travels towards unit A. Pump 781 conveys and pressurizes the solution from a pressure of 513 PSIG in conduit 780 to a pressure of 678 PSIG downstream of the pump 781, requiring 21 shaft BHP. The solution travels via the depicted conduit towards unit A and continues as described in the paragraphs above for unit A, (FIG. 7).

The solutions from conduits 720 and 767 are of the same concentration (27.55% concentration by weight) leaving unit A and unit C via conduits 720 and 765, respectively. The flow of solution from unit A and unit C in these conduits is as described in the description of FIG. 7.

The combined flow of solution flows via conduit 725 at a rate of 1,751 #/min at 27.55% concentration by weight to where it splits off into two separate streams that carry solutions of equal concentration toward each side of a common membrane 735 via conduits 728, 727. Conduit 727 conducts 75% of the solution flow to the high pressure side 735*x* of unit B. Conduit 725 conducts 25% of the solution flow to pressure letdown device 730 where it is then conducted via conduit 731 to the low pressure side 735*y* of unit B. At the assumed efficiencies, pressure letdown device 730 would be expected to produce 15 BHP and be utilized in assistance of pump 741. Because the solution's concentration entering unit B on the high pressure side 735*x* of the membrane 735 is the same as the solution's concentration on the low pressure side 735*y* of the membrane 735, a flux of permeate/solvent will be established through the membrane 735 causing the solution concentration to rise in solute per unit of solvent on the high pressure side 735*x* of the membrane 735 as it travels through unit B, while at the same time causing a fall in solution concentration (or a solution dilution with permeate/solvent) as it travels through the low pressure side 735*y* of unit B. According to this engineered example the pressure on the high side 735*x* of unit B will be 672 PSIG and the pressure on the low pressure side 735*y* of unit B will be reduced, via pressure dropping device 730 to 13 PSIG. This results in a net differential pressure across the membrane 735 of 659 PSIG. The calculated permeate through the membrane 735 at the assumptions outlined in this engineered example is 256 #/min of solvent (water). This permeate is thus combined with the solution traveling through the low pressure side 735*y* of unit B and exits unit B via conduit 740. The solution exiting unit B via conduit 740 is now 17.36% fructose by weight and has a calculated osmotic pressure of 371 PSIG. The solution exiting unit B via conduit 745 is now 34.22% fructose by weight and has a calculated osmotic pressure of 841 PSIG. The flow of solution exiting unit B via conduit 740 contains 120 #/min of solute and 573 #/min of solvent. The flow solution exiting unit B via conduit 745 contains 362 #/min of solute and 696 #/min of solvent.

The solution of increased concentration leaving the high pressure side 735*x* of unit B is then conducted via conduit 745 towards unit C and continues as described below for FIG. 7. The decreased concentration solution leaving the low pressure side 735*y* of unit B is then conducted via conduit 740 to pump 741 as it travels towards unit A. Pump 741 conveys and pressurizes the solution from a pressure of 7 PSIG in conduit 740 to a pressure of 678 PSIG in conduit 742 requiring 37 shaft BHP.

The solution from unit B flows via conduit 745 at a rate of 1,058 #/min at 34.22% concentration by weight to where it splits off into two separate streams that carry solutions of equal concentration toward each side of a common membrane 755 via conduits 748 and 747. Conduit 747 conducts 58% of the solution flow to the high pressure side of unit C. Conduit 748 conducts 42% of the solution flow to pressure letdown device 747 where it is then conducted via conduit 750 to the low pressure side 755*y* of unit C. At the assumed efficiencies, pressure letdown device 747 would be expected to produce 16 BHP and be utilized in assistance of pump 766. Because the solution's concentration entering unit C on the high pressure side 755*x* of the membrane 755 is the same as the solution's concentration on the low pressure side 755*y* of the membrane 755, a flux of permeate/solvent will be established through the membrane 755 causing the solution concentration to rise in solute per unit of solvent on the high pressure side 755*x* of the membrane 755 as it travels through unit C, while at the same time causing a fall in solution concentration (or a solution dilution with permeate/solvent) as it travels through the low pressure side 755*y* of unit C.

According to this engineered example the pressure on the high side 755*x* of unit C will be 665 PSIG and the pressure on the low pressure side 755*y* of unit C will be reduced, via pressure dropping device 747 to 7 PSIG. This results in a net differential pressure across the membrane 755 of 658 PSIG. The calculated permeate through the membrane 755 at the assumptions outlined in this engineered example is 108 #/min of solvent (water). This permeate is thus combined with the solution traveling through the low pressure side of unit C and exits unit C via conduit 765. The solution exiting unit C via conduit 765 is now 27.55% fructose by weight and has a calculated osmotic pressure of 636 PSIG. The solution exiting unit C via conduit 760 is now 41.5% fructose by weight and has a calculated osmotic pressure of 1,107 PSIG. The flow of solution exiting unit C via conduit 765 contains 152 #/min of solute and 400 #/min of solvent. The flow solution exiting unit C via conduit 760 contains 210 #/min of solute and 296 #/min of solvent.

The solution of increased concentration leaving the high pressure side 755*x* of unit C is then conducted via conduit 760 to pressure letdown device 761 where it is then conducted via conduit 702 to the Concentrate Out exit of the system. At the assumed efficiencies, pressure letdown device 761 would be expected to produce 18 BHP and be utilized in assistance of pump 705. The decreased concentration solution leaving the low pressure side 755*y* of unit C is conducted via conduit 765 to pump 766 as it travels towards unit B. Pump 760 conveys and pressurizes the solution from a pressure of 0 PSIG in conduit 765 to a pressure of 672 PSIG in conduit 767 requiring 30 shaft BHP.

The results of this engineered indicate a total net power input requirement of 225 shaft BHP via reverse osmosis pumps 705, 771, 741, 766 and 781, and a total power generated via pressure letdown devices 713, 730, 747 and 761 of 95 shaft BHP for a net total system power input requirement of 130 shaft BHP. Using the assumed electrical motor efficiencies of 92.5% this equates to a total power input requirement of 105 kW (385,260 Btu/hr) to process a 17.36% solution by weight containing 210 #/min of solute (fructose) and 1,000 #/min of solvent (water) into two separate streams; one concentrated 702 stream at 41.5% concentration by weight containing 210 #/min of solute (fructose) and 296 #/min of solvent (water), and one stream 703 of solvent (water) flowing at a rate of 704 #/min (42,240 #/hour).

The outgoing system 700 concentrated solution is 41.5% fructose by weight. This would have a calculated osmotic pressure of 1,107 PSIG. Using the 40% extra pressure above the osmotic pressure to drive the flux through the membrane to accommodate some level of concentration gradient near the membrane walls would indicate a pressure required to achieve this final concentration of 1550 PSIG. The maximum working pressure achievable in presently available reverse osmosis membranes is 690 PSIG. Thus achieving this level of concentration through the utilization of the currently available prior art technology would not be possible without use of the present invention.

To further illustrate the utility of this process a comparison of energy use was made to that of a conventional prior art systems typically used in the juice concentrating industry. A single stage evaporator would typically utilize steam or some other heat source to drive an evaporation process whereby water would be evaporated from the juice leaving behind a concentrated juice product. The energy required for a typical single stage evaporator to evaporate 42,240 #/hour would be approximately 41,000,000 Btu/hr versus the 385,260 Btu/hr required in this engineered example, a savings of over 99%. Due to the high energy input of conventional single effect evaporation many processors utilize double, triple, or more effects of evaporation. It is generally accepted that a double effect evaporator will utilize approximately half the energy of a single effect evaporator and a triple effect evaporator will utilize approximately one third the energy of a single effect evaporator, and so on. The energy savings of the present system (FIG. 7) are so dramatic compared to the currently utilized multiple effect evaporation processes that even utilizing a triple effect evaporator would consume approximately 13,660,000 Btu/hr compared to the 385,260 Btu/hr consumed in this engineered example of the present disclosure would still represent a savings of approximately 97% in comparison, i.e. the process described above (FIG. 7) would consume only 3% of the energy required by the currently utilized prior art.

Similar energy use comparisons were also made against other evaporation processes such as Thermal Vapor Recompression (TVR) and Mechanical Vapor Recompression (MVR) processes. A typical single stage TVR processes utilizes steam driven thermal compressors and is able to evaporate approximately 1.5 more water than the steam consumed by the process. The process described above for FIG. 7 represents a 98.7% energy savings over the typical single stage TVR process. MVR processes can very a great deal; however, the inventor has knowledge of several MVR processes of similar scale to this engineered example in the fruit puree concentrating industry which consume approximately 1 horsepower per 50 #/hr of water evaporated. If such an MVR process were to be utilized to evaporate the 42,240 #/hr separated in this engineered example it would consume 844.8 horsepower as compared to the 130 horsepower of the present invention, a power consumption savings of 84.6%.

Savings of these magnitudes could be expected to represent a tremendous competitive advantage to juice processors and energy saving advantages for society as a whole.

What is claimed is:

1. A process for processing a solution; the process comprising:
   with a reverse osmosis system including:
   (a) a first solvent-generating reverse osmosis unit including: a high pressure side inlet; a high pressure side outlet; and, a low pressure side outlet; and,
   (b) an intermediate reverse osmosis unit system including at least a first intermediate reverse osmosis unit having: a high pressure side inlet; a low pressure side inlet; a high pressure side outlet; and, a low pressure side outlet;

operating the reverse osmosis system such that:
   (i) solution is directed into the high pressure side inlet of the first solvent-generating reverse osmosis unit;
   (ii) solvent is removed from the low pressure side outlet of the first solvent-generating reverse osmosis unit;
   (iii) there is no low pressure side inlet flow into the first solvent-generating unit;
   (iv) outlet flow from the high pressure side outlet of the first solvent-generating osmosis unit is directed into the high pressure side inlet of the first intermediate reverse osmosis unit;
   (v) the first intermediate reverse osmosis unit is operated with: a high pressure side inlet flow; a low pressure side inlet flow; a high pressure side outlet flow; and, a low pressure side outlet flow;
   (vi) flow into the high pressure side inlet of the first solvent-generating reverse osmosis unit comprises the low pressure side outlet flow from the first intermediate reverse osmosis unit;
   (vii) the high pressure side inlet flow to the first intermediate reverse osmosis unit comprises the outlet flow from the high pressure side outlet of the first solvent-generating reverse osmosis unit and solution that does not comprise the outlet flow from the high pressure side outlet of the first solvent-generating reverse osmosis unit; and
   (viii) the outlet flow from the high pressure side outlet of the first solvent-generating reverse osmosis unit and the solution that does not comprise the outlet flow from the high pressure side outlet of the first solvent-generating reverse osmosis unit are mixed prior to filtration in the intermediate reverse osmosis unit.

2. A process according to claim 1 wherein:
(a) the high pressure side inlet flow to the first intermediate reverse osmosis unit system comprises inlet feed to the reverse osmosis system.

3. A process according to claim 1 wherein:
(a) the solution that does not comprise the outlet flow from the high pressure side outlet of the first solvent-generating reverse osmosis unit comprises inlet feed to the reverse osmosis system.

4. A process according to claim 1 wherein:
the reverse osmosis system is such that:
   (a) the intermediate reverse osmosis unit system includes at least a second intermediate reverse osmosis unit having: a high pressure side inlet; a low pressure side inlet; a high pressure side outlet; and, a low pressure side outlet; and,
the operating is such that:
   (i) at least a portion of high pressure side outlet flow from the first intermediate reverse osmosis unit is directed into the high pressure side inlet of the second intermediate reverse osmosis unit; and,
   (ii) the solution that does not comprise the high pressure side outlet of the first solvent-generating reverse osmosis unit comprises at least a portion of low pressure side outlet flow from the second intermediate reverse osmosis unit.

5. A process according to claim 1 wherein:
the reverse osmosis system is such that:
   (a) the intermediate reverse osmosis unit system includes at least a second intermediate reverse osmosis unit having: a high pressure side inlet; a low pressure side inlet; a high pressure side outlet; and,
a low pressure side outlet; and, the operating is such that:
    (i) at least a portion of high pressure side outlet flow from the first intermediate reverse osmosis unit is directed into the high pressure side inlet of the second intermediate reverse osmosis unit; and,
    (ii) at least a portion of low pressure side outlet flow from the second intermediate reverse osmosis unit is directed into the low pressure side inlet of the first intermediate reverse osmosis unit.

6. A process according to claim 5 wherein:
the reverse osmosis system is such that:
    (a) the intermediate reverse osmosis unit system includes at least a third intermediate reverse osmosis unit having: a high pressure side inlet; a low pressure side inlet; a high pressure side outlet; and, a low pressure side outlet; and, the operating is such that:
    (i) at least a portion of high pressure side outlet flow from the second intermediate reverse osmosis unit is directed into the high pressure side inlet of the third intermediate reverse osmosis unit; and,
    (ii) at least a portion of low pressure side outlet flow from the third intermediate reverse osmosis unit is directed into the low pressure side inlet of the second intermediate reverse osmosis unit.

7. A process according to claim 1 wherein:
(a) no solution is directed into the first solvent-generating reverse osmosis unit that has not passed through a reverse osmosis unit and through a low pressure side outlet of a reverse osmosis unit.

8. A process according to claim 1 wherein:
the reverse osmosis system is such that:
(a) the intermediate reverse osmosis unit system includes at least a second intermediate reverse osmosis unit having: a high pressure side inlet; a low pressure side inlet; a high pressure side outlet; and, a low pressure side outlet; and,
(b) the intermediate reverse osmosis unit system includes at least a concentrate-generating reverse osmosis unit having: a high pressure side inlet; a low pressure side inlet; a high pressure side outlet; and, a low pressure side outlet; and,
operating the reverse osmosis unit system such that:
    (i) at least a portion of high pressure side outlet flow from the first intermediate reverse osmosis unit is directed into the high pressure side inlet of the second intermediate reverse osmosis unit; and,
    (ii) at least a portion of low pressure side outlet flow from the second intermediate reverse osmosis unit is directed into the low pressure side inlet of the first intermediate reverse osmosis unit;
    (iii) at least a portion of high pressure side outlet flow from the second intermediate reverse osmosis unit is directed into the high pressure side inlet of the concentrate-generating reverse osmosis unit;
    (iv) at least a portion of low pressure side outlet flow from the concentrate-generating reverse osmosis unit is directed into the low pressure side inlet of the second intermediate reverse osmosis unit; and
    (v) at least a portion of high pressure side outlet flow from the second intermediate reverse osmosis unit is directed into the low pressure side inlet of the concentrate-generating reverse osmosis unit.

9. A process according to claim 8 wherein:
(a) low pressure side outlet flow from the concentrate-generating reverse osmosis unit is directed into the intermediate reverse-osmosis unit system.

10. A process according to claim 1 wherein:
the reverse osmosis is such that:
    (a) the intermediate reverse osmosis unit system includes a second intermediate reverse osmosis unit, which includes: a high pressure side inlet; a high pressure side outlet; a low pressure side inlet; and, a low pressure side outlet; and,
    (b) the operation is such that the solution received from the high pressure side outlet of the second intermediate reverse osmosis unit is split into:
        (i) a first stream; and,
        (ii) a second stream.

11. A process according to claim 10 wherein:
(a) the first stream is directed into a low pressure side inlet of a reverse osmosis unit.

12. A process according to claim 10 wherein:
(a) the second stream is directed into a high pressure side inlet of the reverse osmosis unit.

13. A process for processing a solution; the process comprising:
with a reverse osmosis system including:
    (a) a first solvent-generating reverse osmosis unit including: a high pressure side inlet; a high pressure side outlet; and, a low pressure side outlet; and,
    (b) an intermediate reverse osmosis unit system including at least a first intermediate reverse osmosis unit having: a high pressure side inlet; a low pressure side inlet; a high pressure side outlet; and, a low pressure side outlet;
    (c) the intermediate reverse osmosis unit system includes at least a second intermediate reverse osmosis unit having: a high pressure side inlet; a low pressure side inlet; a high pressure side outlet; and, a low pressure side outlet; and,
operating the reverse osmosis unit system such that:
    (i) solution is directed into the high pressure side inlet of the first solvent-generating reverse osmosis unit;
    (ii) solvent is removed from the low pressure side outlet of the first solvent-generating reverse osmosis unit;
    (iii) there is no low pressure side inlet flow into the first solvent-generating unit;
    (iv) outlet flow from the high pressure side outlet of the first solvent-generating osmosis unit is directed into the high pressure side inlet of the first intermediate reverse osmosis unit;
    (v) flow into the high pressure side inlet of the first solvent-generating reverse osmosis unit comprises low pressure side outlet flow from the intermediate reverse osmosis unit system;
    (vi) the first intermediate reverse osmosis unit is operated with: a high pressure side inlet flow; a low pressure side inlet flow; a high pressure side outlet flow; and, a low pressure side outlet flow;
    (vii) the second intermediate reverse osmosis unit is operated with: a high pressure side inlet flow; a low pressure side inlet flow; a high pressure side outlet flow; and, a low pressure side outlet flow;
    (viii) no solution is directed into the first solvent-generating reverse osmosis unit that has not passed through a reverse osmosis unit and through a low pressure side outlet of a reverse osmosis unit;

(ix) at least a portion of high pressure side outlet flow from the first intermediate reverse osmosis unit is directed into the high pressure side inlet of the second intermediate reverse osmosis unit;

(x) at least a portion of low pressure side outlet flow from the second intermediate reverse osmosis unit is directed into the low pressure side inlet of the first intermediate reverse osmosis unit;

(xi) the high pressure side inlet flow to the first intermediate reverse osmosis unit comprises the outlet flow from the high pressure side outlet of the first solvent-generating reverse osmosis unit and solution that does not comprise the outlet flow from the high pressure side outlet of the first solvent-generating reverse osmosis unit; and (xii) the outlet flow from the high pressure side outlet of the first solvent-generating reverse osmosis unit and the solution that does not comprise the outlet flow from the high pressure side outlet of the first solvent-generating reverse osmosis unit are mixed prior to filtration in the first intermediate reverse osmosis unit.

14. A process according to claim 13 wherein:
(a) the high pressure side inlet flow to the first intermediate reverse osmosis unit system comprises inlet feed to the reverse osmosis system.

15. A process for processing a solution; the process comprising:
with a reverse osmosis system including:
(a) a first solvent-generating reverse osmosis unit including: a high pressure side inlet; a high pressure side outlet; and, a low pressure side outlet; and,
(b) an intermediate reverse osmosis unit system including at least a first intermediate reverse osmosis unit having: a high pressure side inlet; a low pressure side inlet; a high pressure side outlet; and, a low pressure side outlet;
(c) the intermediate reverse osmosis unit system includes at least a second intermediate reverse osmosis unit having: a high pressure side inlet; a low pressure side inlet; a high pressure side outlet; and, a low pressure side outlet; and,
operating the reverse osmosis unit system such that:
(i) solution is directed into the high pressure side inlet of the first solvent-generating reverse osmosis unit;
(ii) solvent is removed from the low pressure side outlet of the first solvent-generating reverse osmosis unit;
(iii) there is no low pressure side inlet flow into the first solvent-generating unit;
(iv) outlet flow from the high pressure side outlet of the first solvent-generating osmosis unit is directed into the high pressure side inlet of the first intermediate reverse osmosis unit;

(v) flow into the high pressure side inlet of the first solvent-generating reverse osmosis unit comprises low pressure side outlet flow from the intermediate reverse osmosis unit system;

(vi) the first intermediate reverse osmosis unit is operated with: a high pressure side inlet flow; a low pressure side inlet flow; a high pressure side outlet flow; and, a low pressure side outlet flow;

(vii) the second intermediate reverse osmosis unit is operated with: a high pressure side inlet flow; a low pressure side inlet flow; a high pressure side outlet flow; and, a low pressure side outlet flow;

(viii) no solution is directed into the first solvent-generating reverse osmosis unit that has not passed through a reverse osmosis unit and through a low pressure side outlet of a reverse osmosis unit;

(ix) at least a portion of high pressure side outlet flow from the first intermediate reverse osmosis unit is directed into the high pressure side inlet of the second intermediate reverse osmosis unit;

(x) at least a portion of low pressure side outlet flow from the second intermediate reverse osmosis unit is directed into the low pressure side inlet of the first intermediate reverse osmosis unit; and (xi) the operation is such that solution received from the high pressure side outlet of a selected reverse osmosis unit in the intermediate reverse osmosis unit system is split into:
(A) a first stream which is directed into a low pressure side inlet of a reverse osmosis unit;
(B) a second stream directed into a high pressure side inlet of a reverse osmosis unit;

(xii) the high pressure side inlet flow to the first intermediate reverse osmosis unit comprises the outlet flow from the high pressure side outlet of the first solvent-generating reverse osmosis unit and solution that does not comprise the outlet flow from the high pressure side outlet of the first solvent-generating reverse osmosis unit; and (xiii) the outlet flow from the high pressure side outlet of the first solvent-generating reverse osmosis unit and the solution that does not comprise the outlet flow from the high pressure side outlet of the first solvent-generating reverse osmosis unit are mixed prior to filtration in the first intermediate reverse osmosis unit.

16. A process according to claim 15 wherein:
(a) the high pressure side inlet flow to the first intermediate reverse osmosis unit system comprises inlet feed to the reverse osmosis system.

17. A process according to claim 15 wherein:
(a) flow into the high pressure side inlet of the first solvent-generating reverse osmosis unit comprises the low pressure side outlet flow from the first intermediate reverse osmosis unit.

\* \* \* \* \*